(12) United States Patent
Jin et al.

(10) Patent No.: US 11,644,552 B2
(45) Date of Patent: May 9, 2023

(54) ELECTRONIC DEVICE INCLUDING LIGHT SOURCE AND TOF SENSOR, AND LIDAR SYSTEM

(71) Applicant: SAMSUNG ELECTRONICS CO., LTD., Suwon-si (KR)

(72) Inventors: Younggu Jin, Suwon-si (KR); Min-Sun Keel, Seoul (KR); Daeyun Kim, Asan-si (KR); Youngchan Kim, Seongnam-si (KR)

(73) Assignee: SAMSUNG ELECTRONICS CO., LTD.

( * ) Notice: Subject to any disclaimer, the term of this patent is extended or adjusted under 35 U.S.C. 154(b) by 486 days.

(21) Appl. No.: 16/921,060

(22) Filed: Jul. 6, 2020

(65) Prior Publication Data

US 2021/0199781 A1 Jul. 1, 2021

(30) Foreign Application Priority Data

Dec. 27, 2019 (KR) .......................... 10-2019-0176379

(51) Int. Cl.
| | |
|---|---|
| *G01S 7/48* | (2006.01) |
| *G01S 7/486* | (2020.01) |
| *G01S 17/894* | (2020.01) |
| *G01S 7/481* | (2006.01) |
| *G01S 7/4863* | (2020.01) |
| *G01S 17/18* | (2020.01) |

(52) U.S. Cl.
CPC .......... *G01S 7/4868* (2013.01); *G01S 7/4815* (2013.01); *G01S 7/4863* (2013.01); *G01S 17/18* (2020.01); *G01S 17/894* (2020.01)

(58) Field of Classification Search
USPC ...................................................... 356/5.03
See application file for complete search history.

(56) References Cited

U.S. PATENT DOCUMENTS

| | | | |
|---|---|---|---|
| 7,060,957 B2 | 6/2006 | Lange et al. | |
| 8,482,722 B2 * | 7/2013 | Min ........................ | G01S 17/36 356/5.1 |
| 8,953,152 B2 * | 2/2015 | Min ........................ | G01S 7/4816 356/6 |
| 9,258,502 B2 * | 2/2016 | Lee ........................ | G01S 7/4863 |
| 9,502,458 B2 * | 11/2016 | Parmesan ............. | G01S 7/4863 |
| 9,568,607 B2 | 2/2017 | Bae et al. | |

(Continued)

FOREIGN PATENT DOCUMENTS

DE 102013111021 A1 * 4/2014 ............. G01S 17/08

*Primary Examiner* — James R Hulka
(74) *Attorney, Agent, or Firm* — Fish & Richardson P.C.

(57) ABSTRACT

An electronic device includes a time of flight (ToF) sensor including a pixel array, a light source that emits light signals, and an optical device that projects the light signals to areas of an object which respectively correspond to a plurality of pixel blocks including pixels of the pixel array. Each of the pixels includes a plurality of taps each including a photo transistor, a first transfer transistor connected with the photo transistor, a storage element connected with the first transfer transistor, a second transfer transistor connected with the storage element, a floating diffusion area connected with the second transfer transistor, and a readout circuit connected with the floating diffusion area. An overflow transistor is disposed adjacent to the photo transistor and connected with a power supply voltage.

20 Claims, 51 Drawing Sheets

(56) References Cited

U.S. PATENT DOCUMENTS

| | | | |
|---|---|---|---|
| 9,621,868 B2* | 4/2017 | Kim | H04N 13/15 |
| 9,786,252 B2* | 10/2017 | Shin | G01S 17/89 |
| 10,021,284 B2 | 7/2018 | Wang | |
| 10,171,790 B2* | 1/2019 | Kim | H04N 13/254 |
| 10,861,886 B2* | 12/2020 | Jin | G01S 7/4863 |
| 10,901,090 B2* | 1/2021 | Van Der Tempel | G01S 7/493 |
| 11,265,498 B2* | 3/2022 | Jin | H01L 27/14601 |
| 2004/0008394 A1* | 1/2004 | Lange | G01S 17/10 |
| | | | 359/237 |
| 2011/0051119 A1* | 3/2011 | Min | G01S 7/491 |
| | | | 356/5.1 |
| 2012/0062705 A1 | 3/2012 | Ovsiannikov et al. | |
| 2012/0134598 A1* | 5/2012 | Ovsiannikov | G01S 7/4816 |
| | | | 382/217 |
| 2012/0242975 A1* | 9/2012 | Min | G01S 17/894 |
| | | | 356/5.03 |
| 2014/0071180 A1* | 3/2014 | Shin | G01S 7/497 |
| | | | 345/690 |
| 2014/0104391 A1* | 4/2014 | Kim | H04N 13/10 |
| | | | 348/46 |
| 2014/0166858 A1* | 6/2014 | Lee | G01S 7/4863 |
| | | | 250/214.1 |
| 2015/0130904 A1* | 5/2015 | Bae | G01S 7/4915 |
| | | | 348/46 |
| 2016/0268331 A1* | 9/2016 | Parmesan | H04N 5/37455 |
| 2017/0064235 A1* | 3/2017 | Wang | H04N 13/133 |
| 2017/0123067 A1 | 5/2017 | Van Der Tempel | |
| 2017/0180698 A1* | 6/2017 | Kim | H04N 13/106 |
| 2019/0212419 A1 | 7/2019 | Jeong et al. | |
| 2020/0029047 A1 | 1/2020 | Jin | |
| 2020/0111823 A1* | 4/2020 | Jin | G01S 17/894 |
| 2020/0295060 A1* | 9/2020 | Ben Shem | G01S 17/10 |
| 2020/0403022 A1* | 12/2020 | Jin | H01L 27/14612 |

\* cited by examiner

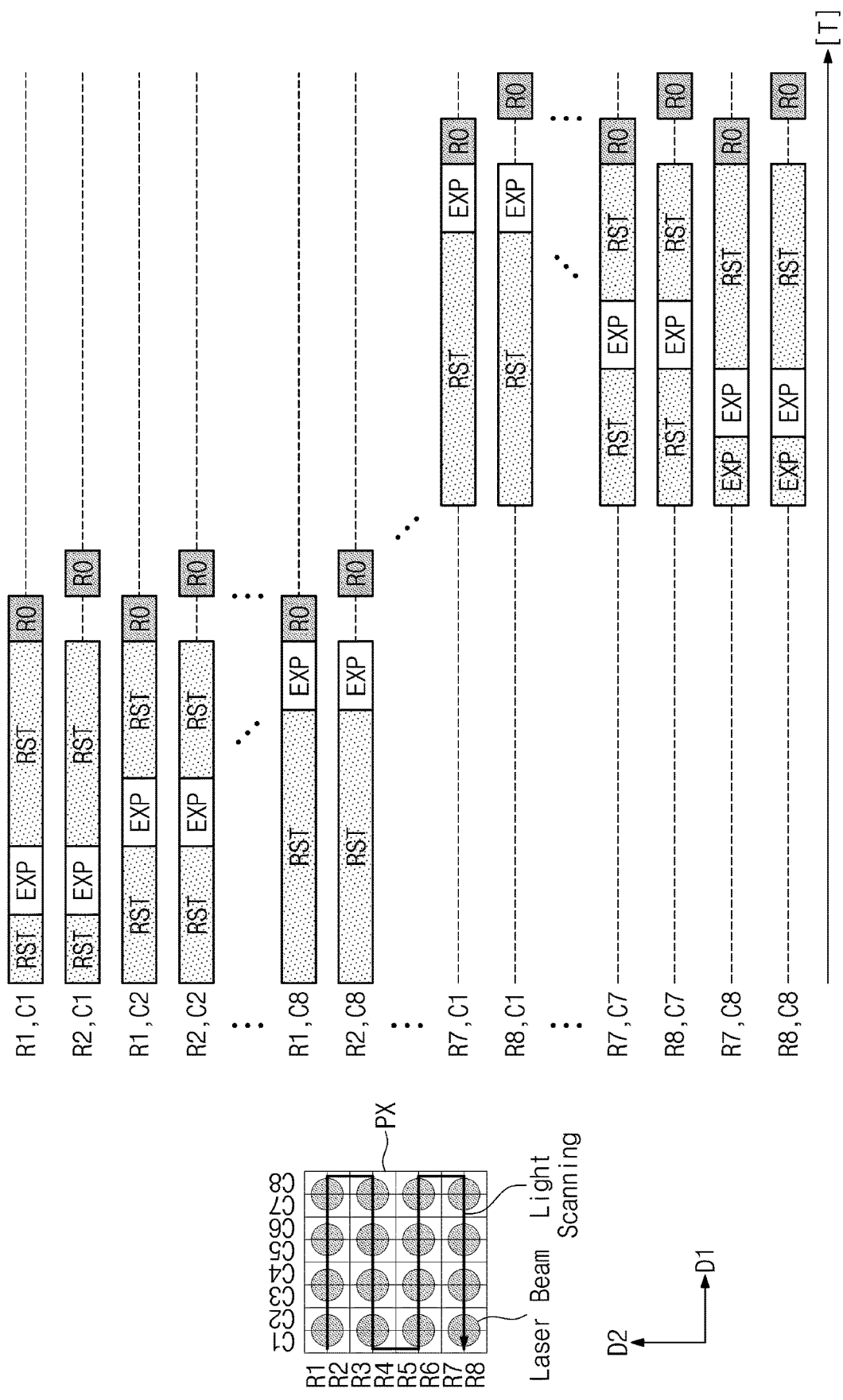

ELECTRONIC DEVICE INCLUDING LIGHT SOURCE AND TOF SENSOR, AND LIDAR SYSTEM

CROSS-REFERENCE TO RELATED APPLICATIONS

A claim for priority under 35 U.S.C. § 119 is made to Korean Patent Application No. 10-2019-0176379 filed on Dec. 27, 2019, in the Korean Intellectual Property Office, the entire content of which is hereby incorporated by reference.

BACKGROUND

The present inventive concepts herein relate to electronic devices including a light source and a time of flight (ToF) sensor, and a LIDAR system.

Currently, light detection and ranging (LIDAR) (called Lidar, LiDAR, or LADAR) is used in various fields such as for example autonomous driving, security, sensors, and surveillance. An electronic device in which LIDAR systems are implemented may include a time of flight (ToF) sensor, whereby a light source may emit a light signal to an object and the light signal may be reflected from the object. The ToF sensor may calculate a distance between a depth sensor and the object by measuring an arrival time of the light signal that is emitted from the light source and is then reflected from the object. A distance that the LIDAR system is capable of sensing may be limited due to limited power of an electronic device including both the light source and the ToF sensor.

SUMMARY

The present inventive concepts herein relate to an electronic device including a light source and a ToF sensor, and an LIDAR system.

Embodiments of the inventive concepts provide an electronic device including a time of flight (ToF) sensor including a pixel array; a light source configured to emit light signals; and an optical device configured to project the light signals to areas of an object, the areas respectively correspond to a plurality of pixel blocks including pixels of the pixel array. Each of the pixels includes a plurality of taps each including a photo transistor, a first transfer transistor connected with the photo transistor, a storage element connected with the first transfer transistor, a second transfer transistor connected with the storage element, a floating diffusion area connected with the second transfer transistor, and a readout circuit connected with the floating diffusion area, and an overflow transistor disposed adjacent to the photo transistor and connected with a power supply voltage, the overflow transistor configured to remove charges from the photo transistor.

Embodiments of the inventive concepts also provide an electronic device including a time of flight (ToF) sensor including a pixel array; a light source configured to emit a first light signal and a second light signal; and an optical device configured to project the first light signal to a first area of an object corresponding to a first pixel block of the pixel array and to project the second light signal to a second area of the object corresponding to a second pixel block of the pixel array. Pixels of the first pixel block are arranged in a first direction, pixels of the second pixel block are arranged in the first direction, and the first and second pixel blocks are arranged in a second direction. Each of the pixels includes a plurality taps including a photo transistor, a first transfer transistor connected with the photo transistor, a storage element connected with the first transfer transistor, a second transfer transistor connected with the storage element, a floating diffusion area connected with the second transfer transistor, and a readout circuit connected with the floating diffusion area; and an overflow transistor disposed adjacent to the photo transistor and connected with a power supply voltage, the overflow transistor configured to remove charges from the photo transistor.

Embodiments of the inventive concepts further provide a light detection and ranging (LIDAR) system including a light source configured to emit light signals; an optical device configured to control projection directions of the light signals and to scan an object with the light signals having the controlled projection directions; a time of flight (ToF) sensor including a pixel array including a plurality of pixel blocks demodulating the light signals reflected from the object based on a direction of the scanning. Each of the pixels of the plurality of pixel blocks includes a plurality taps each including a photo transistor, a first transfer transistor connected with the photo transistor, a storage element connected with the first transfer transistor, a second transfer transistor connected with the storage element, a floating diffusion area connected with the second transfer transistor, and a readout circuit connected with the floating diffusion area; and an overflow transistor disposed adjacent to the photo transistor and connected with a power supply voltage, the overflow transistor configured to remove charges from the photo transistor.

Embodiments of the inventive concepts still further provide an electronic device including a time of flight (ToF) sensor including a pixel array; a light source configured to emit light signals; and an optical device configured to project the light signals to areas of an object, which respectively correspond to a plurality of pixel blocks including pixels of the pixel array. Each of the pixels includes a plurality of taps each including a photo transistor, a floating diffusion area, and a readout circuit connected with the floating diffusion area; and an overflow transistor disposed adjacent to the photo transistor and connected with a power supply voltage, the overflow transistor configured to remove charges from the photo transistor. The ToF sensor includes a first driver disposed in a first direction from the pixel array, and configured to control the overflow transistor; and a second driver disposed in a second direction from the pixel array, and configured to control a readout operation of the readout circuit.

Embodiments of the inventive concepts also provide an electronic device including a light source configured to emit light signals; and a semiconductor package module comprising a first semiconductor chip and a second semiconductor chip mounted under the first semiconductor chip. The first semiconductor chip comprising a time of flight (ToF) sensor including a pixel array. Each pixel of the pixel array includes a plurality of taps each including a photo transistor, a first transfer transistor connected with the photo transistor, a storage element connected with the first transfer transistor, a second transfer transistor connected with the storage element, a floating diffusion area connected with the second transfer transistor, and a readout circuit connected with the floating diffusion area; and an overflow transistor disposed adjacent to the photo transistor and connected with a power supply voltage. The second semiconductor chip comprising a first driver configured to control the overflow transistor to remove charges from the photo transistor and a second driver configured to control a readout operation of the readout circuit. The electronic device further includes an optical device configured to project the light signals to areas of an object, the areas respectively correspond to a plurality of pixel blocks of the pixel array.

BRIEF DESCRIPTION OF THE FIGURES

The above and other objects and features of the inventive concepts will become apparent in view of the following detailed description of exemplary embodiments with reference to the accompanying drawings.

FIGS. 11A, 11B, 11C, 11D, 11E and 11F illustrate examples of two-dimensional light scanning and pixel array scanning in a row direction and a column direction, which are performed by an electronic device of FIG. 1.

DETAILED DESCRIPTION

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1:
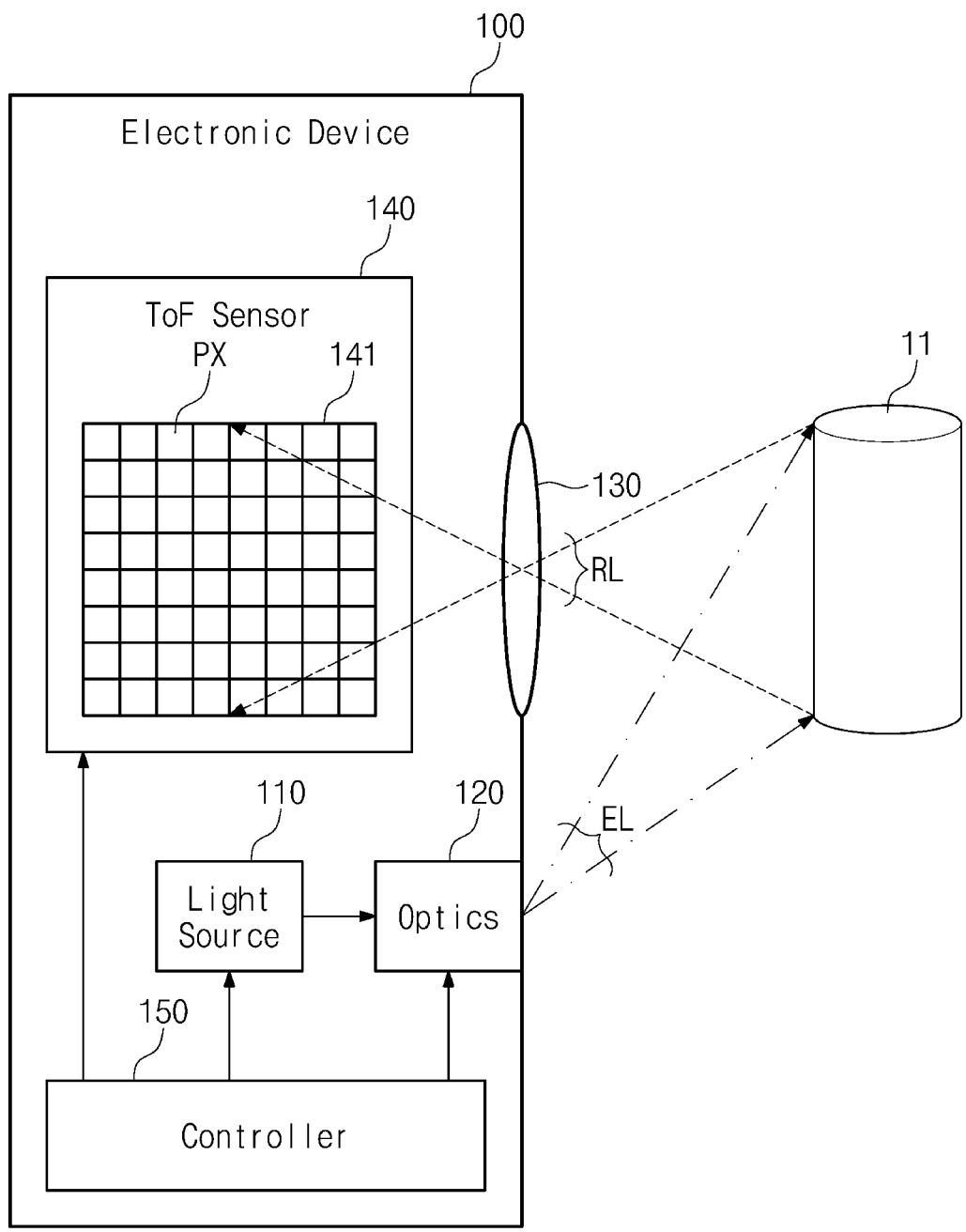
FIG. 1 illustrates a light detection and ranging (LIDAR) system according to an embodiment of the inventive concepts.

FIG. 1 illustrates a light detection and ranging (LIDAR) system according to an embodiment of the inventive concepts. A LIDAR system 10 may include an object 11 (or referred as to a "subject" or a "target") and an electronic device 100. For example, the LIDAR system 10 may be implemented at the electronic device 100, and the electronic device 100 may be referred to as a "LIDAR device". The electronic device 100 may emit a light signal EL to the object 11 based on a time of flight (ToF) technology, may sense a light signal RL reflected from the object 11, and may sense a distance between the electronic device 100 and the object 11. The electronic device 100 may include a light source 110, an optical device (optics) 120, a lens part 130, a ToF sensor 140, and a controller 150.

The light source 110 may emit the light signal EL. Under control of the controller 150, the light source 110 may emit the light signal EL (ON) or may not emit the light signal EL (OFF). For example, the light signal EL may be in the form of a square wave (pulse) or in the form of a sine wave. The light signal EL may be a signal in a band that is not perceived by a user and may be, but is not limited to, laser light, a laser pulse, infrared light, microwave, a light wave, an ultrasonic wave, etc. For example, the light source 110 may be a laser light source or may include a light emitting diode (LED), a laser diode (LD), an organic LED (OLED), an edge emitter laser, a vertical cavity surface emitting laser (VCSEL), a distributed feedback laser, etc. The optical device 120 may control or adjust a projection direction of the (emitted) light signal EL under control of the controller 150. For example, the optical device 120 may support a one-dimensional or a two-dimensional scanning function with regard to the object 11. The light signal EL generated from the light source 110 may be emitted to the object 11 through the optical device 120 or may be reflected by the optical device 120 so as to be emitted to the object 11. The lens part 130 may collect the light signal RL reflected from the object 11. The light signal RL may be incident onto the lens part 130 and may be provided to pixels PX of the ToF sensor 140 through the lens part 130. For example, the lens part 130 is illustrated as a single lens, but may be an optical system including a plurality of lenses. The ToF sensor 140 may be referred to as a "ToF sensor chip", an "image sensor (chip)" or a "depth sensor (chip)". The ToF sensor 140 may include a pixel array 141 including the pixels PX. The pixels PX may be referred to as "ToF pixels" and may convert the light signal RL reflected from the object 11 into an electrical signal. Due to a distance between the electronic device 100 and the object 11, the light signal RL incident onto the pixel array 141 may be delayed with respect to the light signal EL. For example, a time difference or a phase difference may exist between the light signals EL and RL, and an electrical signal converted by the pixels PX may indicate the disparity or the phase difference. The controller 150 may control the light source 110, the optical device 120, and the ToF sensor 140. The controller 150 may synchronize the light source 110, the optical device 120, and the ToF sensor 140 and may provide the light source 110, the optical device 120, and the ToF sensor 140 with control signals for controlling the light source 110, the optical device 120, and the ToF sensor 140. The controller 150 may include a clock generator that generates a clock signal. Like the example of FIG. 1, the controller 150 may be disposed or implemented within the electronic device 100 to be independent of the ToF sensor 140. Unlike the example of FIG. 1, in other embodiments the controller 150 may be included or embedded in the ToF sensor 140. In still further embodiments the controller 150 may not be included in the electronic device 100 (i.e., may be outside the electronic device 100) and may communicate with the electronic device 100. The components 110 to 150 of the electronic device 100 may be individually implemented, or at least a part thereof may be integrally implemented.

According to an embodiment of the inventive concepts, the controller 150 may control the light source 110 and the optical device 120 to modulate the light signal EL or to control a frequency, a phase, a strength, an on/off, a projection direction, etc. of the light signal EL. For example, the object 11 may be divided into a plurality of areas each corresponding to some pixels PX of the pixels PX. Under control of the controller 150, the light source 110 and the optical device 120 may project light signals EL to the plurality of areas of the object 11 corresponding to some pixels PX sequentially (in regular sequence) to scan the object 11. Some pixels PX of the pixel array 141 of the ToF sensor 140 may demodulate the light signals RL reflected from the object 11 based on a scanning direction. As the scanning progresses, some pixels PX corresponding to any other area of the object 11 from among the pixels may also demodulate the light signals RL. Compared to the case of using a flash-type light source, the electronic device 100 may sense a relatively distant object 11 using limited power through an operation, in which the light source 110 and the optical device 120 scan the object 11, and a demodulation operation of the ToF sensor 140 is based on a scanning direction. Compared to the case of using the flash-type light source, the electronic device 100 may perform the scanning operation on the object 11 based on some pixels PX of the pixels PX, thus reducing a leakage current of the pixels PX and removing a shading phenomenon according to a position of the pixels PX.

Figure 2A:
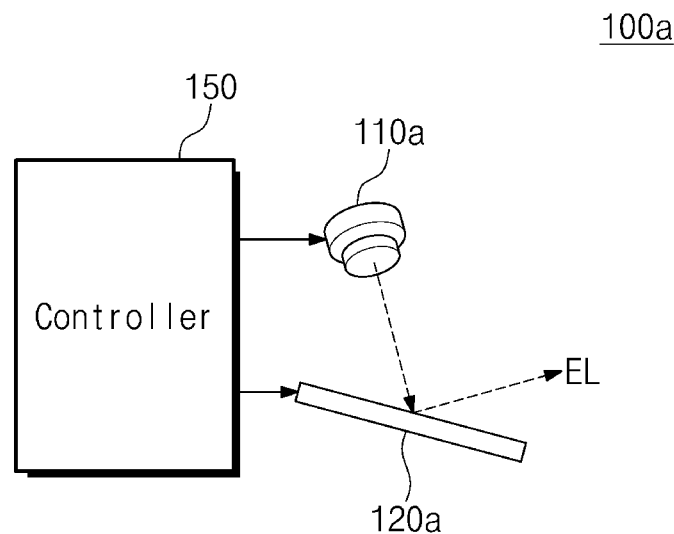
FIGS. 2A, 2B and 2C illustrate examples of a light source and an optical device of an electronic device of FIG. 1.
Figure 2B:
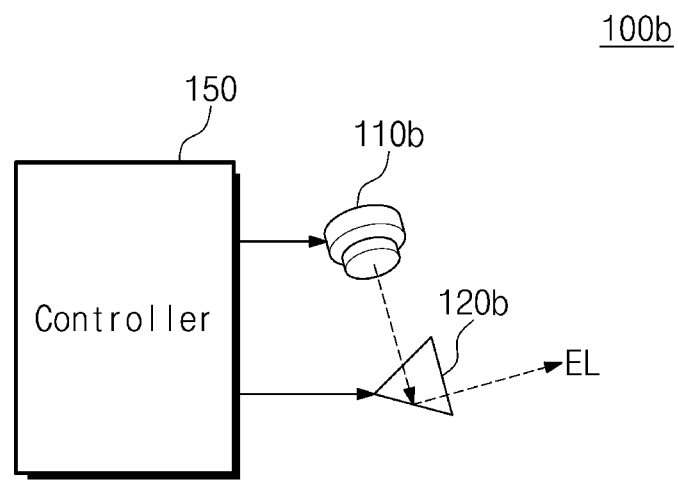
Figure 2C:
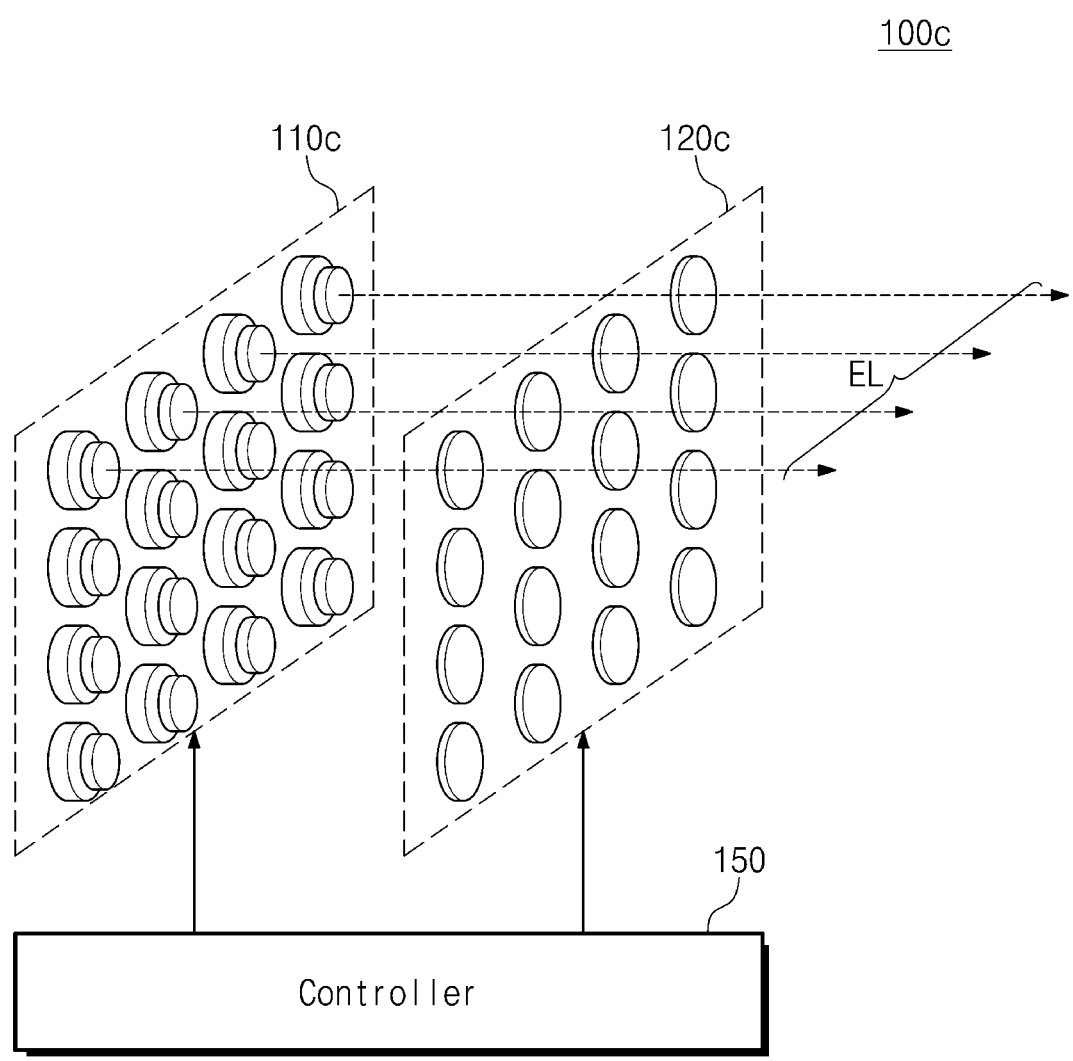

FIGS. 2A, 2B and 2C illustrate examples of a light source and an optical device of an electronic device of FIG. 1. Referring to FIG. 2A, in the electronic device 100a, a light source 110a may for example be one of a VCSEL, an edge emitter laser, and an LED, and an optical device 120a may be a micro-electro-mechanical system (MEMS) mirror. Referring to FIG. 2B, in the electronic device 100b, a light source 110b may for example be one of a VCSEL, an edge emitter laser, and an LED, and an optical device 120b may be a rotating prism. Referring to FIG. 2C, in the electronic device 100c, a light source 110c may for example be a VCSEL array including a plurality of VCSELs, and an optical device 120c may be a projection optical device. Under control of the controller 150, some VCSELs of the VCSEL array may be turned on, and the remaining VCSELs thereof may be turned off; and as this operation is repeated, the object 11 may be scanned. For example, the electronic device 100c may further include a vibrating actuator. The vibrating actuator may vibrate the VCSEL array or the projection optical device under control the controller 150; and as this operation is repeated, the object 11 may be scanned.

Figure 3A:
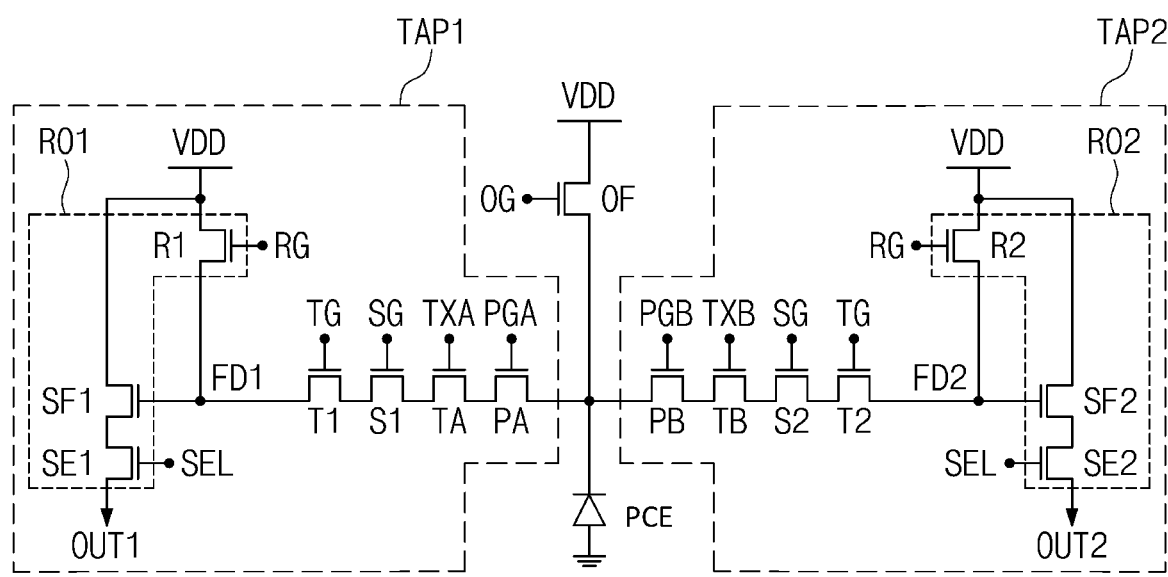
FIGS. 3A and 3B illustrate circuit diagrams of a pixel of FIG. 1.
Figure 3B:
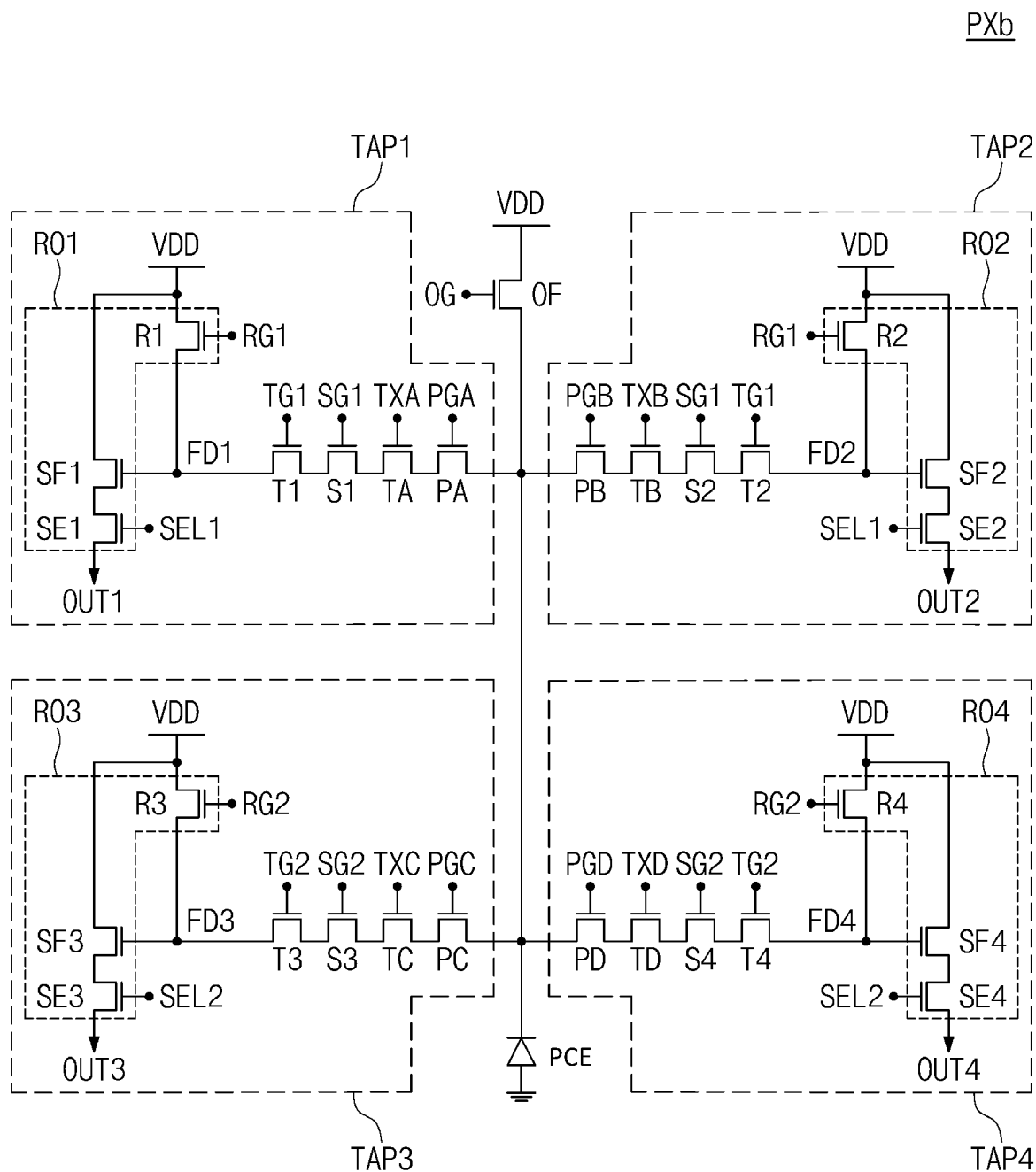

FIGS. 3A and 3B illustrate circuit diagrams of a pixel of FIG. 1. The pixel PX may include two or more taps. Each of pixels PXa and PXb may be an example of each pixel PX. The pixel PXa in FIG. 3A may include a photoelectric conversion element PCE, taps TAP1 to TAP2, and an overflow transistor OF. A photo diode, a photo transistor, a photo gate, a pinned photo diode, or a combination thereof may be used as the photoelectric conversion element PCE. Below, a description will be given whereby the photoelectric conversion element PCE is a photo diode. The photoelectric conversion element PCE may generate and integrate charges corresponding to the light signal RL. The charges generated by the photoelectric conversion element PCE may be distributed into the photo transistors PA and PB. The amounts of charges distributed and stored by the photo transistors PA and PB may be determined depending on phase differences between photo gate signals PGA and PGB and the light signal EL. For example, the photoelectric conversion element PCE may be implemented in the substrate where the pixel PXa is implemented, so as to overlap the photo transistors PA and PB in a plan view. The photoelectric conversion element PCE may be connected between first ends of the photo transistors PA and PB and a ground voltage GND. The photoelectric conversion element PCE may be shared by a plurality of taps (e.g., 2 in FIG. 3A) of the one pixel PXa.

The tap TAP1 may include the photo transistor PA, a transfer transistor TA, a storage transistor S1, a transfer transistor T1, a floating diffusion area FD1, and a readout circuit RO1. The readout circuit RO1 may include a reset transistor R1, a source follower transistor SF1, and a selection transistor SEE The first end (e.g., a drain or a source) of the photo transistor PA may be connected with the photoelectric conversion element PCE and a first end of the overflow transistor OF. The photo transistor PA may integrate charges based on a photo gate signal PGA. Charges may be generated by the light signal RL incident onto the pixel PXa. The photo gate signal PGA may be a modulation signal, the phase of which is identical to or different from a phase of the light signal EL. The photo gate signal PGA may be activated (or enabled) during an exposure (or integration) interval (or period) in which the light signal EL is emitted and the light signal RL is incident onto the pixel PXa and may be deactivated (or disabled) in the remaining time other than the exposure interval.

The transfer transistor TA may be connected between a second end of the photo transistor PA and a first end of the storage transistor S1. The transfer transistor TA may electrically connect the second end of the photo transistor PA and the first end of the storage transistor S1 during the exposure interval based on a transfer gate signal TXA such that charges integrated by the photo transistor PA are transferred to the storage transistor S1, and may prevent the charges integrated by the photo transistor PA from being transferred to the storage transistor S1 during the remaining time other than the exposure interval based on the transfer gate signal TXA.

The storage transistor S1 may be connected between the transfer transistors TA and T1 and may store charges integrated by the photo transistor PA based on a storage gate signal SG. The charges integrated by the photo transistor PA may not be immediately transferred to the floating diffusion area FD1. For example, the tap TAP1 may include a storage diode instead of the storage transistor S1. A first end of the storage diode may be connected with the second end of the photo transistor PA and a first end of the transfer transistor T1, and a second end of the storage diode may be connected with one of a power supply voltage VDD and the ground voltage GND. As another example, the tap TAP1 may include both the storage transistor S1 and the storage diode. Each of the storage transistor S1, the storage diode, and a combination of the storage transistor S1 and the storage diode may be referred to as a "storage element".

The transfer transistor T1 may be connected between a second end of the storage transistor S1 and the floating diffusion area FD1. The transfer transistor T1 may transfer charges stored in the storage transistor S1 to the floating diffusion area FD1 based on a transfer gate signal TG.

In the example illustrated in FIG. 3A the tap TAP1 includes all the transistors TA, S1, and T1. Unlike the example illustrated in FIG. 3A, in other embodiments the tap TAP1 may include only a part of the transistors TA and T1 and the storage element S1, or may not include all of the transistors TA and T1 and the storage element S1.

The reset transistor R1 may be connected between the floating diffusion area FD1 and the power supply voltage VDD. The reset transistor R1 may electrically connect the floating diffusion area FD1 and the power supply voltage VDD based on a reset gate signal RG and may drive a voltage level of the floating diffusion area FD1 with the power supply voltage VDD. As such, the reset transistor R1 may reset the floating diffusion area FD1 such that charges stored in the floating diffusion region FD1 are removed or discharged. The source follower transistor SF1 may be connected between the power supply voltage VDD and the selection transistor SEE A gate of the source follower transistor SF1 may be connected with the floating diffusion area FD1. The source follower transistor SF1 may output an output signal OUT1 based on a voltage level of the floating diffusion area FD1. The selection transistor SE1 may be connected between the source follower transistor SF1 and an output line. The selection transistor SE1 may output the output signal OUT1 to the output line based on a selection signal SEL.

The tap TAP2 may include the photo transistor PB, a transfer transistor TB, a storage transistor S2, a transfer transistor T2, a floating diffusion area FD2, and a readout circuit RO2. The readout circuit RO2 may include a reset transistor R2, a source follower transistor SF2, and a selection transistor SE2. A configuration and an operation of the tap TAP2 may be substantially identical to the configuration and the operation of the tap TAP1 except that the photo transistor PB of the tap TAP2 receives a photo gate signal PGB. The photo gate signals PGA and PGB may be activated during the exposure interval and may be deactivated in the remaining time other than the exposure interval. The photo gate signal PGA/PGB may be a modulation signal, the phase of which is identical to or different from a phase of the light signal EL. Phases of the photo gate signals PGA and PGB may be different. The taps TAP1 and TAP2 may output the output signals OUT1 and OUT2 based on the photo gate signals PGA and PGB. For example, the output signals OUT1 and OUT2 may indicate a distance between the electronic device 100 and the object 11. For example, the reset gate signal RG, the transfer gate signal TG, and the selection signal SEL may be applied in common to the taps TAP1 and TAP2. As illustrated in FIG. 3A, the transfer gate signals TXA and TXB may be respectively applied to the transfer transistors TA and TB of the taps TAP1 and TAP2. Unlike illustrated in FIG. 3A, in other embodiments a transfer gate signal TX may be applied in common to the transfer transistors TA and TB of the taps TAP1 and TAP2.

The overflow transistor OF may be connected with the power supply voltage VDD and may be disposed adjacent to the photo transistors PA and PB. In the remaining time other than the exposure interval, the photoelectric conversion element PCE or the photo transistors PA and PB may integrate charges due to an external light. Based on an overflow gate signal OG, the overflow transistor OF may remove charges integrated by the photoelectric conversion element PCE or the photo transistors PA and PB in the remaining time other than the exposure interval or may discharge the charges to the power supply voltage VDD. For example, the overflow transistor OF may be divided into transistors as much as the number of taps TAP1 and TAP2.

The pixel PXb in FIG. 3B may include the photoelectric conversion element PCE, taps TAP1 to TAP4, and the overflow transistor OF. The following description will be focused on differences between the pixels PXb and PXa. Charges generated by the photoelectric conversion element PCE may be distributed into photo transistors PA to PD. The amounts of charges distributed and stored by the photo transistors PA to PD may be determined depending on phase differences between photo gate signals PGA to PGD and the light signal EL.

The taps TAP1 and TAP2 of the pixel PXb may be substantially identical to the taps TAP1 and TAP2 of the pixel PXa. The tap TAP3 may include a photo transistor PC, a transfer transistor TC, a storage transistor S3, a transfer transistor T3, a floating diffusion area FD3, and a readout circuit RO3. The readout circuit RO3 may include a reset transistor R3, a source follower transistor SF3, and a selection transistor SE3. The tap TAP4 may include a photo transistor PD, a transfer transistor TD, a storage transistor S4, a transfer transistor T4, a floating diffusion area FD4, and a readout circuit RO4. The readout circuit RO4 may include a reset transistor R4, a source follower transistor SF4, and a selection transistor SE4. The taps TAP3 and TAP4 may be implemented to be substantially identical to the taps TAP1 and TAP2 and may operate substantially identical to the taps TAP1 and TAP2.

The photo gate signals PGA to PGD may be activated during the exposure interval and may be deactivated in the remaining time other than the exposure interval. Phases of the photo gate signals PGA to PGD may be different. The taps TAP1 to TAP4 may output the output signals OUT1 to OUT4 based on the photo gate signals PGA to PGD. For example, the output signals OUT1 to OUT4 may indicate a distance between the electronic device 100 and the object 11. As illustrated in FIG. 3B, the reset gate signal RG1, the transfer gate signal TG1, and the select signal SEL1 may be applied in common to the taps TAP1 and TAP2, and the reset gate signal RG2, the transfer gate signal TG2, and the select signal SEL2 may be applied in common to the taps TAP3 and TAP4. Unlike the example illustrated in FIG. 3B, in other embodiments the reset gate signal RG, the transfer gate signal TG, and the selection signal SEL may be applied in common to the taps TAP1 to TAP4. As illustrated in FIG. 3B, the transfer gate signals TXA and TXB may be respectively applied to the transfer transistors TA and TB of the taps TAP1 and TAP2, and the transfer gate signals TXC and TXD may be respectively applied to the transfer transistors TC and TD of the taps TAP3 and TAP4. Unlike the example illustrated in FIG. 3B, in other embodiments the transfer gate signal TX may be applied in common to the transfer transistors TA to TD of the taps TAP1 to TAP4.

For example, although not shown, the taps TAP1 and TAP3 may output the output signals OUT1 and OUT3 through one output line, and the taps TAP2 and TAP4 may output the output signals OUT2 and OUT4 through another output line. When the selection signal SEL1 is activated, the taps TAP1 and TAP2 may respectively output the output signals OUT1 and OUT2. Next, when the selection signal SEL2 is activated, the taps TAP3 and TAP4 may respectively output the output signals OUT3 and OUT4 through the respective output lines which the output signals OUT1 and OUT2 are transferred. As another example, the taps TAP1 and TAP3 may respectively output the output signals OUT1 and OUT3 through two output lines, and the taps TAP2 and TAP4 may respectively output the output signals OUT2 and OUT4 through two other output lines.

The description is given as all the transistors of the pixels PXa/PXb are implemented with NMOS transistors, but in other embodiments the transistors of the pixels PXa/PXb may be implemented with PMOS transistors, or a combination of NMOS transistors and PMOS transistors. A kind(s) of the transistors of the pixels PXa/PXb is not limited to the examples illustrated in FIGS. 3A and 3B.

Figure 4A:
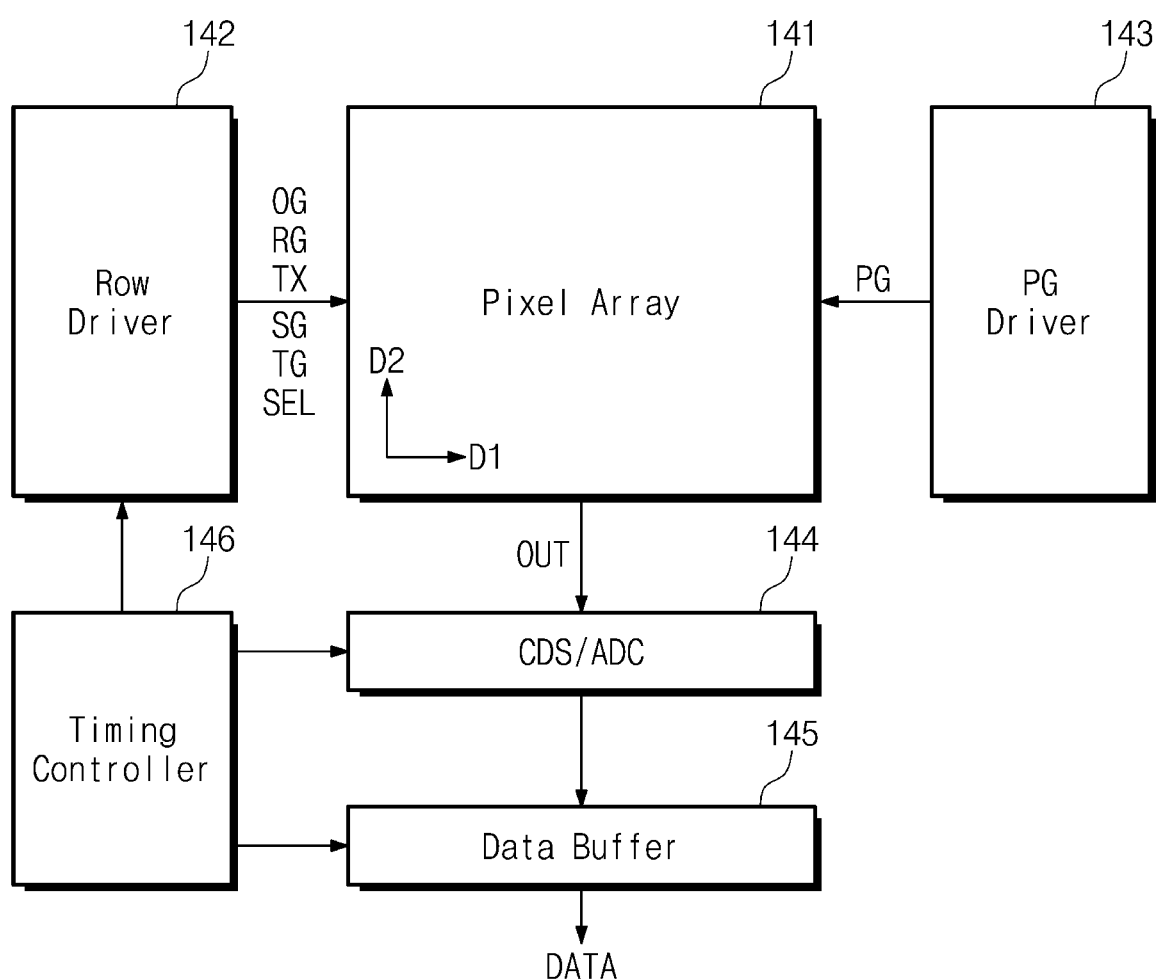
FIGS. 4A, 4B, 4C and 4D illustrate block diagrams of a ToF sensor of FIG. 1.
Figure 4B:
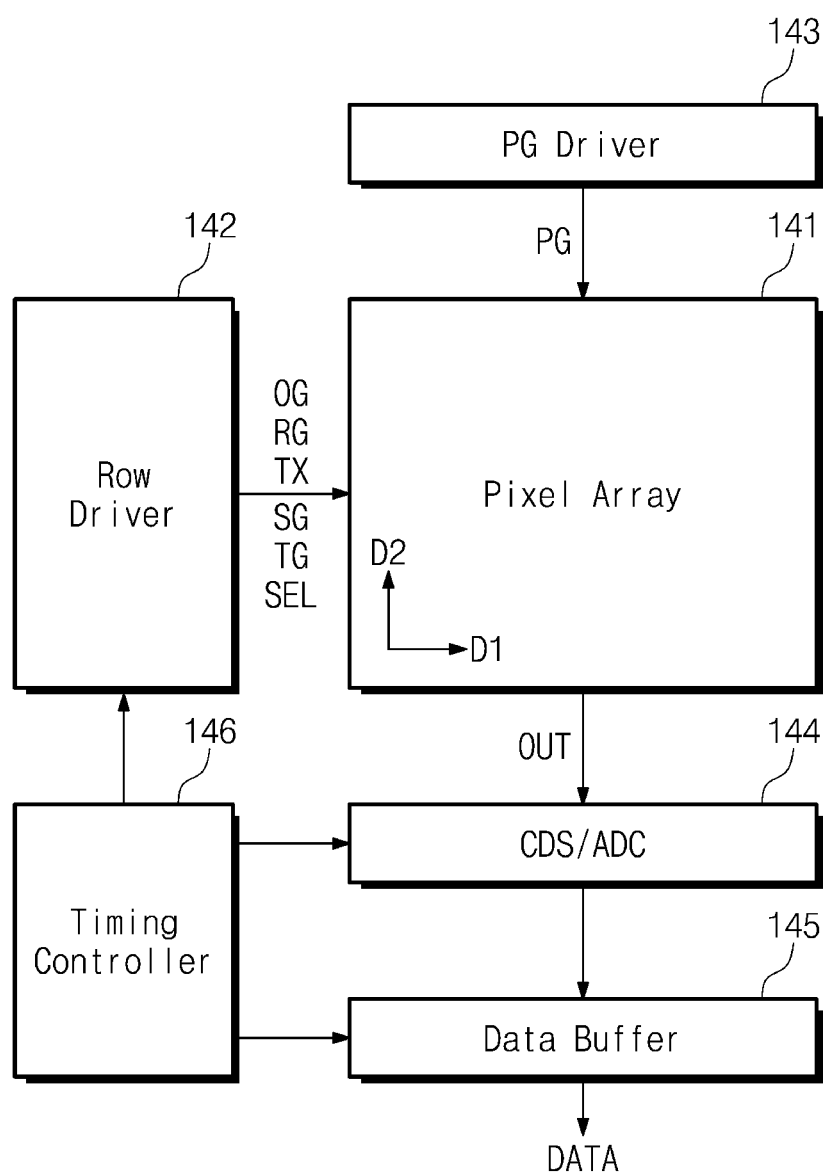

FIGS. 4A and 4B illustrate block diagrams of a ToF sensor of FIG. 1. Each of ToF sensors 140a and 140b may be one example of the ToF sensor 140. Each of the ToF sensors 140a and 140b may include the pixel array 141, a row driver 142, a photo gate (PG) driver 143, an analog processing circuit 144 (CDS/ADC), a data buffer 145, and a timing controller 146.

The pixel array 141 may include the pixels PX of FIG. 1 arranged in a row direction D1 (or a first direction) and a column direction D2 (or a second direction), which are perpendicular to each other. The pixel array 141 may be implemented on a silicon (or semiconductor) substrate. The pixels PX may integrate, store, transfer, or remove charges based on control signals OG, RG, TX, SG, TG, SEL, and PG provided from the row driver 142 and the photo gate driver 143.

The row driver 142 may control the pixel array 141 under control of the timing controller 146. The row driver 142 may transfer the control signals OG, RG, TX, SG, TG, and SEL to the pixels PX in the row direction D1. Wires through which the control signals OG, RG, TX, SG, TG, and SEL are transferred, which are connected with the pixels PX, are formed in the row direction D1 and may be disposed on/over the pixel array 141. The control signals OG, RG, TX, SG, TG, and SEL may be the control signals OG, RG, TX, SG, TG, and SEL (with number being omitted) illustrated in FIGS. 3A and 3B. The row driver 142 may control the pixels PX of the pixel array 141 in units of a row in a rolling mode or may control all the pixels PX of the pixel array 141 at the same time in a global mode.

The photo gate driver 143 may transfer the control signals PG to the pixel array 141 under control of the timing controller 146. The control signals PG may be the control signals PG (with a number being omitted) illustrated in FIGS. 3A and 3B. The photo gate driver 143 of the ToF sensor 140a in FIG. 4A may transfer the control signals PG to the pixels PX in the row direction D1. The row driver 142 and the photo gate driver 143 may be respectively disposed along the row direction D1 to be adjacent to the pixel array 141. The pixel array 141 may be interposed between the row driver 142 and the photo gate driver 143. Unlike the example illustrated in FIG. 4A, in other embodiments the photo gate driver 143 may be included in the row driver 142.

The photo gate driver 143 of the ToF sensor 140b in FIG. 4B may transfer the control signals PG to the pixels PX in the column direction D2. The photo gate driver 143 and the analog processing circuit 144 may be respectively disposed along the column direction D2 to be adjacent to the pixel array 141. The pixel array 141 may be interposed between the photo gate driver 143 and the analog processing circuit 144. Unlike the example illustrated in FIG. 4B, in other embodiments the photo gate driver 143 may be included in the analog processing circuit 144. Wires through which the control signals PG are transferred, which are connected with the pixels PX, and are formed in the row direction D1 or the column direction D2 may be disposed on/over the pixel array 141.

The analog processing circuit 144 in FIGS. 4A and 4B may receive, sample, and hold output signals (alternatively referred to as an "image signal" or a "depth signal") (refer to OUT1 and OUT2/OUT1 to OUT4 of FIGS. 3A and 3B) output from the pixel array 141 in the column direction D2. The analog processing circuit 144 may control output lines, which are connected with the pixels PX of the pixel array 141, through which the output signals OUT1 and OUT2/OUT1 to OUT4 are transferred, and which are formed in the column direction D2. The analog processing circuit 144 may perform a correlated double sampling (CDS) operation on an output signal and may remove a noise included in the output signal. The analog processing circuit 144 may perform an analog-to-digital conversion operation in which an analog signal is converted into a digital signal. The analog processing circuit 144 may generate data (or image data or depth data) by using the digital signal. The analog processing circuit 144 may be referred to as a "data processing circuit". The analog processing circuit 144 may provide the image data to the data buffer 145. The data buffer 145 may store the data transferred from the analog processing circuit 144. The data buffer 145 may output data "DATA" to the outside of the ToF sensor 140a/140b (e.g., to an internal component of the electronic device 100 or to the outside of the electronic device 100).

The timing controller 146 may control the components 141 to 145 of the ToF sensor 140a/140b. The timing controller 146 may control the components 141 to 145 of the ToF sensor 140a/140b under control of the controller 150. The timing controller 146 may control the row driver 142 and the photo gate driver 143 based on modulation information or phase information of the light signal EL. As described above, unlike the example illustrated in FIG. 1, in other embodiments the controller 150 may be embedded in the ToF sensor 140. In this case, the timing controller 146 may include the controller 150 or may perform a function of the controller 150. For example, the timing controller 146 (or the controller 150) may synchronize the pixel array 141, the row driver 142, the photo gate driver 143, the light source 110, and the optical device 120.

Figure 4C:
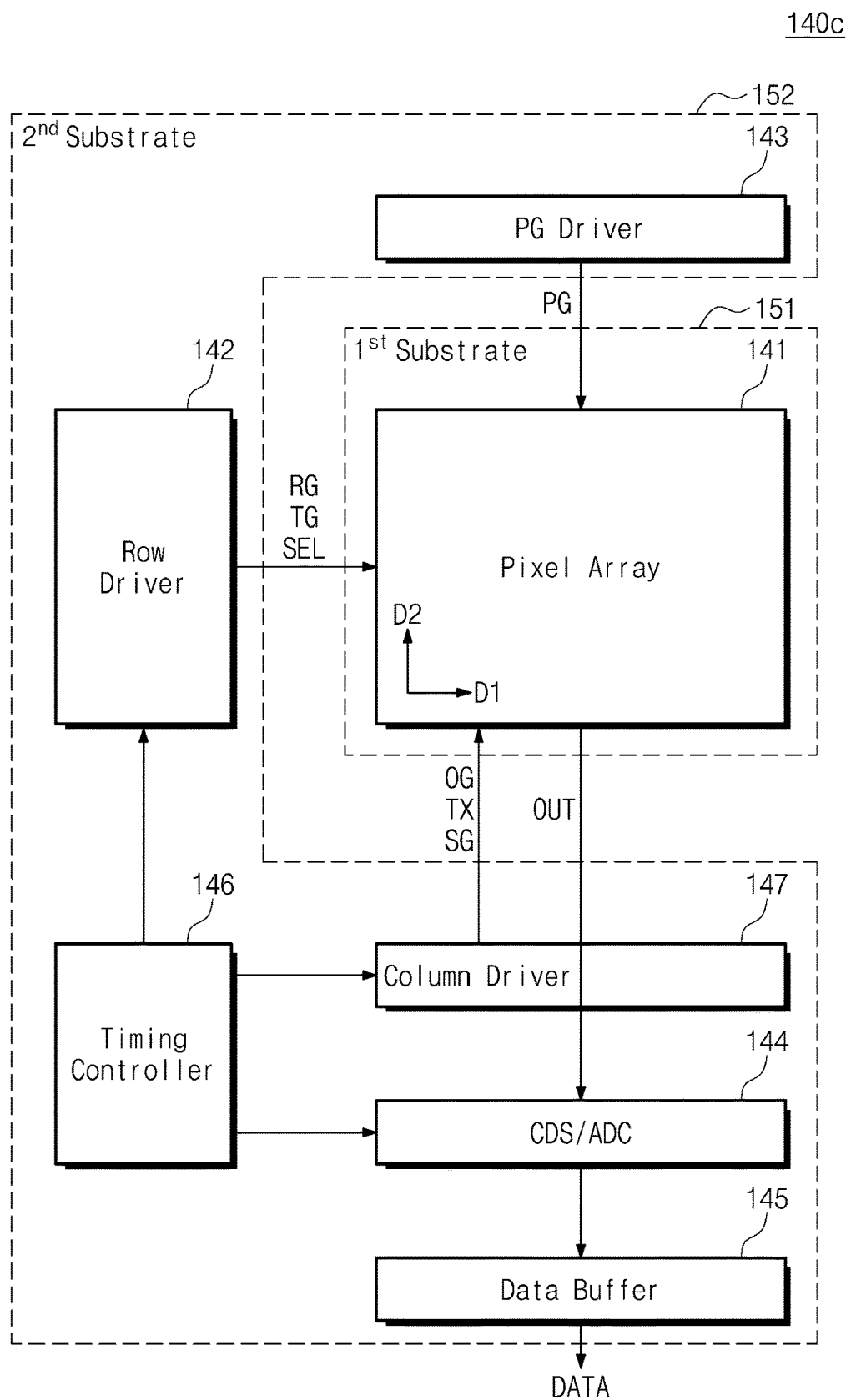
Figure 4D:
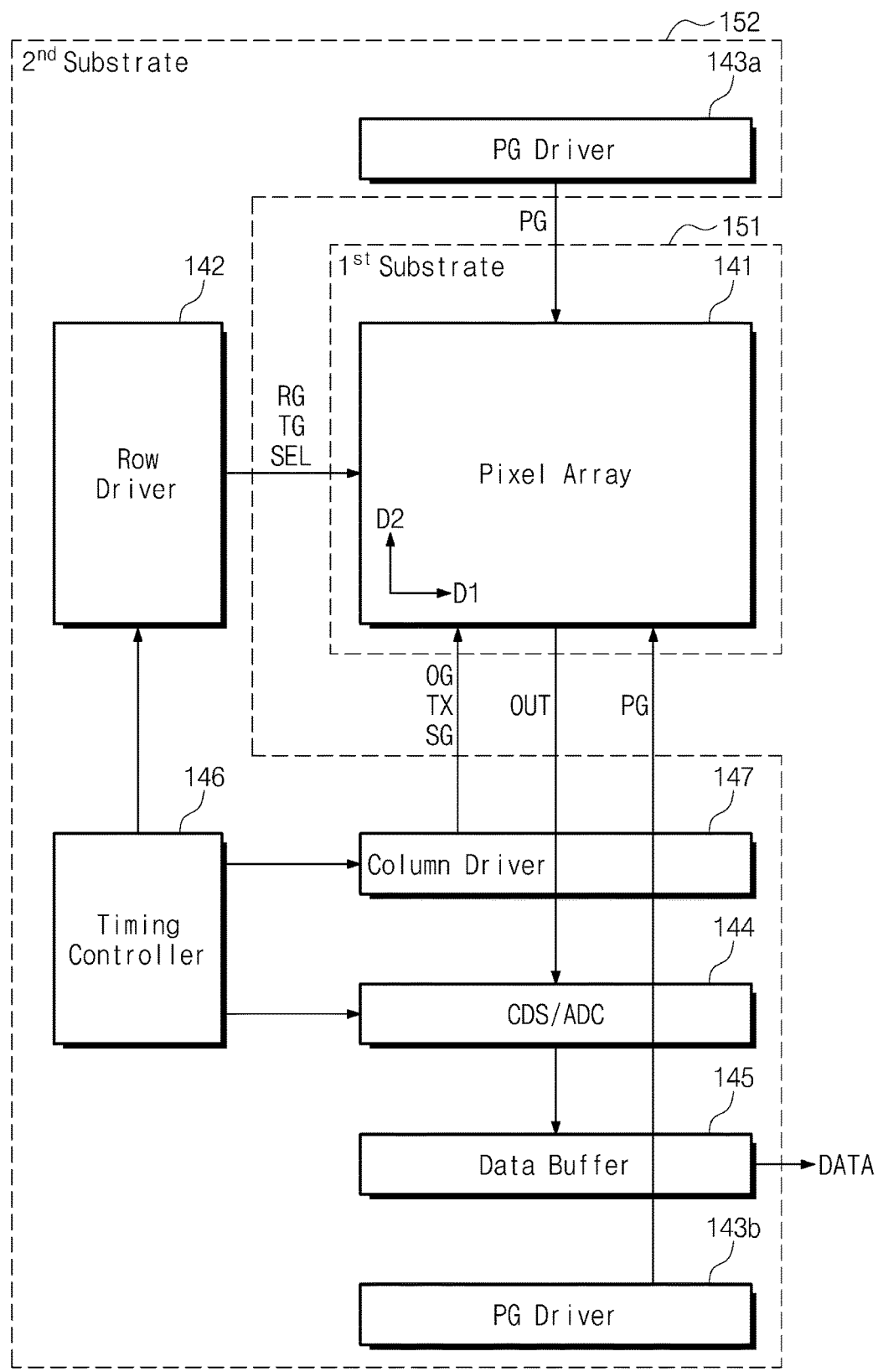

FIGS. 4C and 4D illustrate block diagrams of a ToF sensor of FIG. 1. Each of ToF sensors 140c and 140d may be one example of the ToF sensor 140. The description hereinafter will focus on differences between the ToF sensors 140c and 140d of FIGS. 4C and 4D and the ToF sensors 140a and 140b of FIGS. 4A and 4B, and the differences between the ToF sensors 140c and 140d.

Compared to the ToF sensors 140a and 140b, each of the ToF sensors 140c and 140d may further include a column driver 147. The column driver 147 may control the pixel array 141 under control of the timing controller 146. The column driver 147 may transfer the control signals OG, TX, and SG to the pixels PX in the column direction D2. For example, wires through which the control signals OG, TX, and SG are transferred, which are connected with the pixels PX, are formed in the column direction D2 and may be disposed on/over the pixel array 141. In this case, the row driver 142 may transfer the control signals RG, TG, and SEL to the pixels PX in the row direction D1. For example, wires through which the control signals RG, TG, and SEL are transferred, which are connected with the pixels PX, are formed in the row direction D1 and may be disposed on/over the pixel array 141. Compared to the ToF sensors 140a and 140b, because each of the ToF sensors 140c and 140d further includes the column driver 147, a direction in which the photo gate signal PG is driven may be identical to a direction in which the overflow gate signal OG, the transfer gate signal TX, and the storage gate signal SG are driven.

Compared to the ToF sensor 140c of FIG. 4C, the ToF sensor 140d of FIG. 4D may include photo gate drivers 143a and 143b disposed on opposite sides of the pixel array 141 with respect to the column direction D2. The photo gate drivers 143a and 143b may transfer the photo gate signals PG to the pixel array 141 in opposite directions and together. An operation of each of the photo gate drivers 143a and 143b may be substantially identical to the operation of the photo gate driver 143. Compared to the ToF sensors 140a to 140c including the photo gate driver 143, the ToF sensor 140d including the photo gate drivers 143a and 143b may solve the following issues: an RC delay due to resistance and capacitance components of wires through which the control signals PG are transferred and distribution of the photo gate signals PG in the column direction D2.

In embodiments, although not shown the components 141 to 147 of the ToF sensor 140c/140d may be implemented and disposed on one substrate. Alternatively, referring to FIGS. 4C and 4D, in other embodiments the pixel array 141 of the components 141 to 147 of the ToF sensors 140c/140d may be implemented on a first substrate 151, and the remaining components 142 to 147 thereof may be implemented and disposed on a second substrate 152. For example, the first substrate 151 may be stacked on/over the second substrate 152. For example, compared to the case where all the components 141 to 147 of the ToF sensor 140c/140d are disposed on one substrate, when the components 141 to 147 of the ToF sensor 140c/140d are disposed on two or more substrates 151 and 152, the complexity of wires through which the control signals OG, TX, and SG and the output signals OUT are transferred may relatively decrease.

Figure 5A:
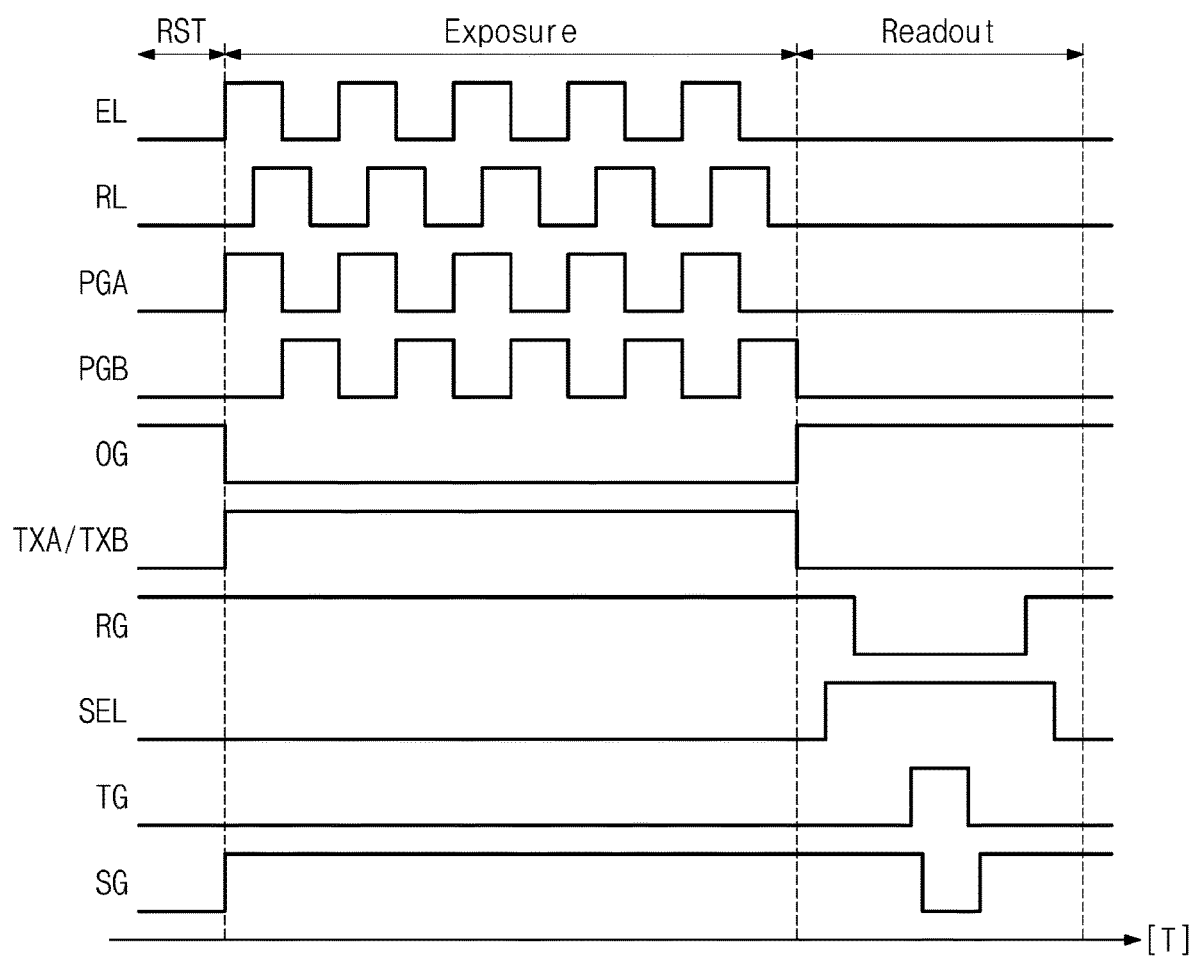
FIGS. 5A and 5B illustrate timing diagrams of light signals and control signals applied to a pixel of FIG. 3A.
Figure 5B:
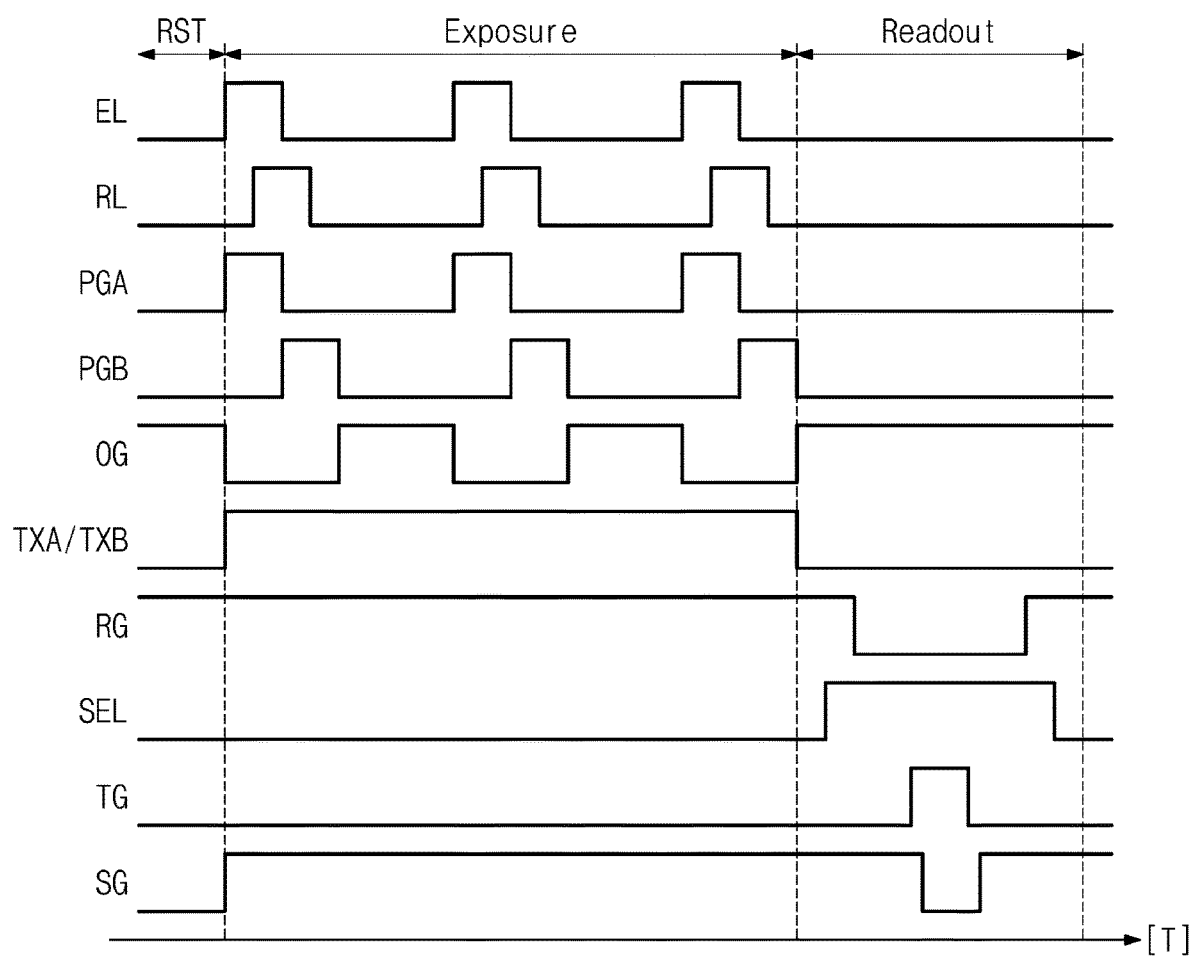

FIGS. 5A and 5B illustrate timing diagrams of light signals and control signals applied to a pixel of FIG. 3A. Each of the timing diagrams of FIGS. 5A and 5B may include a reset (RST) interval, an exposure interval, and a readout interval, which are repeated.

During the reset interval, the overflow gate signal OG and the reset gate signal RG may be activated. Based on the activated overflow gate signal OG, the overflow transistor OF may remove charges integrated by the photoelectric conversion element PCE or the photo transistors PA and PB, or may discharge the charges to the power supply voltage VDD. The reset transistors R1 and R2 may reset the floating diffusion areas FD1 and FD2 based on the reset gate signal RG. All the remaining control signals PGA, PGB, TXA, TXB, SEL, TG, and SG may be deactivated, the light signal EL may not be emitted, and the light signal RL may not be incident onto the pixel PXa.

During the exposure interval, the light signal EL may be emitted to the object 11 (see FIG. 1), and the light signal RL may be incident onto the pixel PXa. The light signal EL of FIG. 5A may be modulated to be similar to a continuous wave by the controller 150. For example, a duty ratio of an ON state and an OFF state of the light signal EL may be approximately 50%. For example, an interval where the light signal EL has a relatively high level may indicate an ON interval where the light signal EL is emitted to the object 11, and an interval where the light signal EL has a relatively low level may indicate an OFF interval where the light signal EL is not emitted to the object 11. The light signal EL of FIG. 5B may be modulated to be similar to a gating signal (or a pulsed signal) by the controller 150. For example, a duty ratio of an ON and an OFF of the light signal EL in FIG. 5B may be less than approximately 50%.

During the exposure interval, the photo gate signals PGA and PGB may be synchronized with the light signal EL. The photo gate signal PGA may have a phase identical to that of the light signal EL. The photo gate signal PGB may have a phase different from that of the light signal EL. The photo gate signal PGA may be activated during an interval where the light signal EL has a relatively high level and may be deactivated during an interval where the light signal EL has a relatively low level. The photo gate signal PGB may be deactivated during an interval where the light signal EL has a relatively high level and may be activated during an interval where the light signal EL has a relatively low level. In FIGS. 5A and 5B, phase differences (e.g., 0 degree and 180 degrees) between the light signal EL, the photo gate signal PGA, and the photo gate signal PGB are only exemplary. The photo transistors PA and PB may respectively integrate charges based on the photo gate signals PGA and PGB.

Referring to FIG. 5A, during the exposure interval, the overflow gate signal OG may be deactivated. Referring to FIG. 5B, during the exposure interval, the overflow gate signal OG may be deactivated during an interval where the light signal EL and the photo gate signals PGA and PGB are activated, and may be activated during an interval where the light signal EL and the photo gate signals PGA and PGB are deactivated. Compared to the case of FIG. 5A, in FIG. 5B the controller 150 may perform a gating operation for stopping an object scanning operation and a demodulation operation of the ToF sensor 140 during a partial interval of the exposure interval, by activating the overflow gate signal OG and deactivating the light signal EL and the photo gate signals PGA and PGB, during the partial interval of the exposure interval. Compared to the case of FIG. 5A, in FIG. 5B the ToF sensor 140 may be relatively less exposed to an external light during the exposure interval.

During the exposure interval, the transfer gate signal TXA/TXB and the storage gate signal SG may be activated. The transfer transistors TA and TB may transfer charges integrated by the respective photo transistors PA and PB to the storage transistors S1 and S2, based on the activated transfer gate signals TXA and TXB. The respective storage transistors S1 and S2 may store the charges transferred through the transfer transistors TA and TB based on the activated storage gate signal SG.

During the readout interval, the light signal EL may not be emitted to the object 11 and may be deactivated. The overflow gate signal OG may again be activated, and the transfer gate signal TXA/TXB may again be deactivated. The selection signal SEL may be activated, and the reset gate signal RG may be deactivated. In the readout interval, before the transfer gate signal TG is activated, the output signals OUT1 and OUT2 of the pixel PXa may have reset levels, and the analog processing circuit 144 may receive and sample the output signals OUT1 and OUT2 having the reset levels. During the readout interval, the transfer gate signal TG may be activated and may then be deactivated. Also, the storage gate signal SG may be deactivated and may then be activated. The transfer transistors T1 and T2 may transfer charges stored in the storage transistors S1 and S2 to the floating diffusion areas FD1 and FD2 based on the activated transfer gate signal TG. The storage transistors S1 and S2 will not store charges based on the deactivated storage gate signal SG. In the readout interval, as the transfer gate signal TG is activated and is then deactivated, and the storage gate signal SG is deactivated and is then activated, the output signals OUT1 and OUT2 of the pixel PXa may have signal levels different from the reset levels, and the analog processing circuit 144 (see FIGS. 4A-4D) may receive and sample the output signals OUT1 and OUT2 having the signal levels. As described above, the analog processing circuit 144 may perform the CDS operation and the ADC operation on the reset levels and the signal levels. Afterwards, when the reset gate signal RG is again activated and the selection signal SEL is again deactivated, the readout operation and the readout interval associated with the pixel PXa may be terminated.

The timing diagrams of the pixel PXa are exemplified in FIGS. 5A and 5B. The control signals PGA, PGB, OG, TXA, TXB, RG, SEL, TG, and SG of FIGS. 5A and 5B, which are applied to the pixel PXa, may be applied to other pixels, and operations of the other pixels may be substantially identical to the operation of the pixel PXa. For example, the pixel PXa and the other pixels may be arranged in the pixel array 141 along the row direction D1 or a row line. The pixel PXa and the other pixels may operate together (or at the same time) in response to the control signals PGA, PGB, OG, TXA, TXB, RG, SEL, TG, and SG applied in common thereto.

Figure 6A:
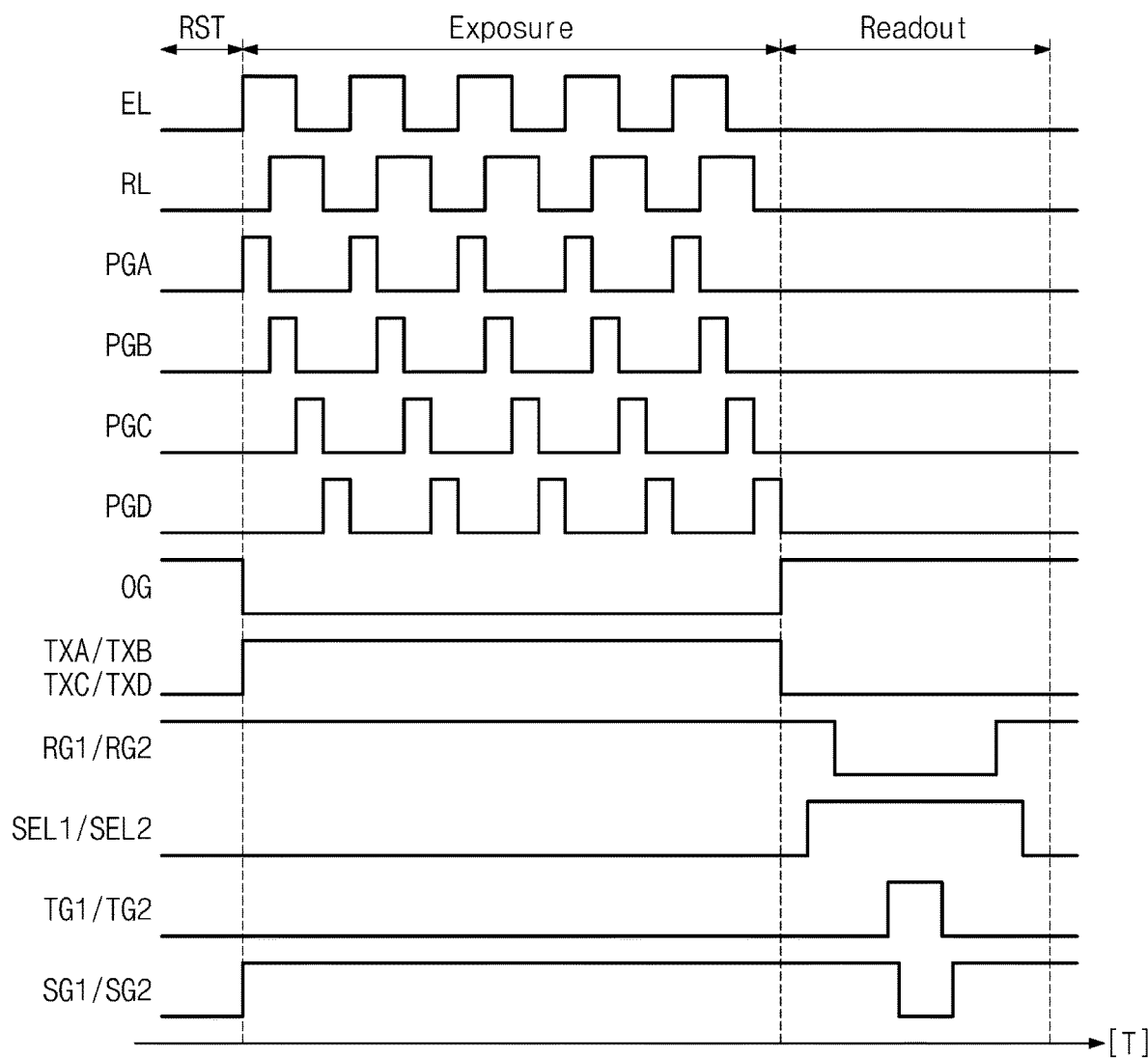
FIGS. 6A and 6B illustrate timing diagrams of light signals and control signals applied to a pixel of FIG. 3B.
Figure 6B:
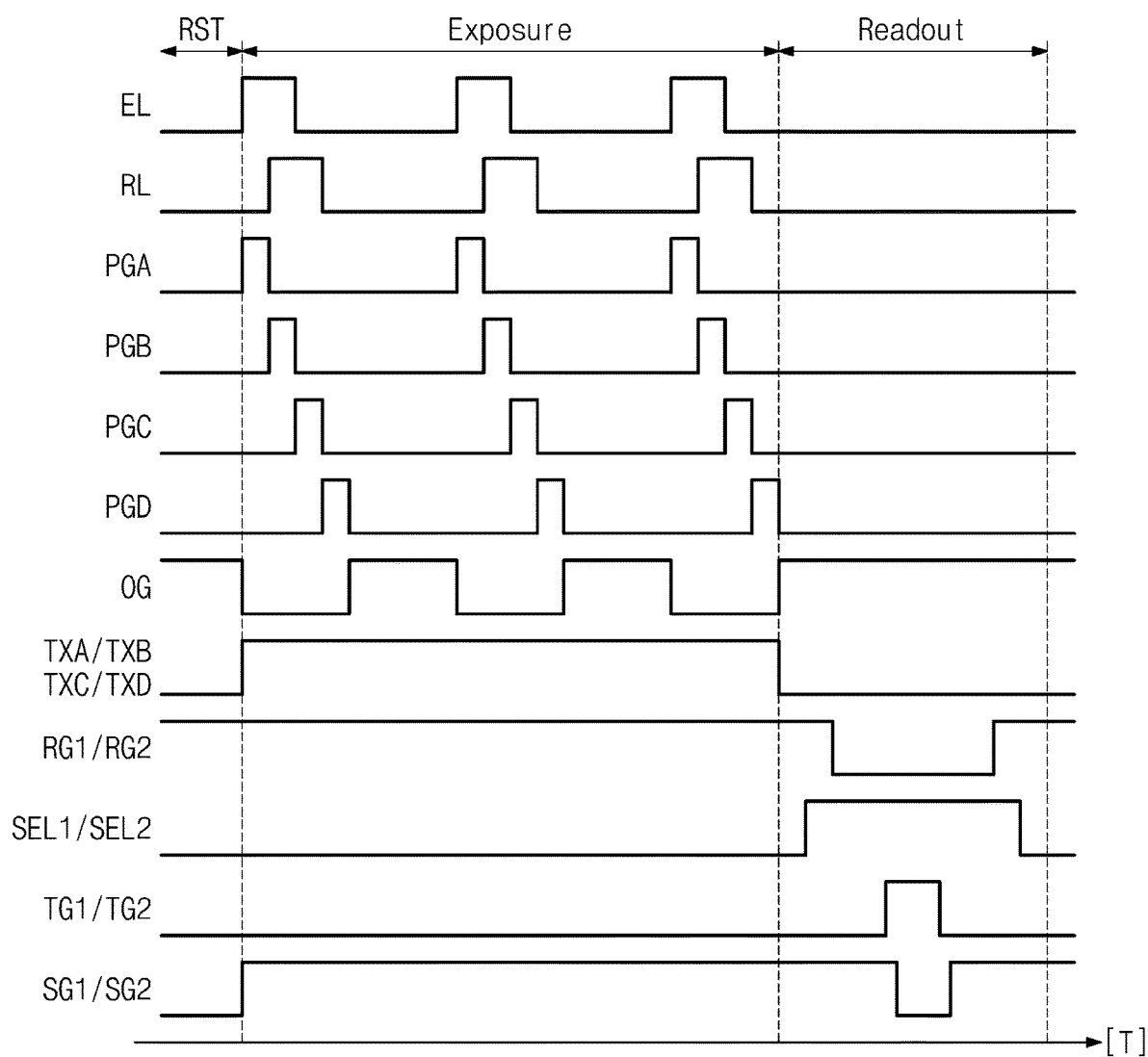

FIGS. 6A and 6B illustrate timing diagrams of light signals and control signals applied to a pixel of FIG. 3B. Each of the timing diagrams of FIGS. 6A and 6B may include the reset (RST) interval, the exposure interval, and the readout interval, which are repeated. The light signals EL and RL of FIGS. 6A and 6B may be substantially identical to the light signals EL and RL of FIGS. 5A and 5B, respectively. Each of control signals OG, TXA, TXB, TXC, TXD, RG1, RG2, SEL1, SEL2, TG1, TG2, SG1, and SG2 of FIGS. 6A and 6B may be substantially identical to a control signal having a similar name from among the control signals OG, TXA, TXB, RG, SEL, TG, and SG of FIGS. 5A and 5B. The differences between the timing diagrams of FIGS. 6A and 6B and the timing diagrams of FIGS. 5A and 5B will be mainly described hereinafter.

Compared to the pixel PXa of FIG. 3A, because the pixel PXb of FIG. 3B includes four taps TAP1 to TAP4, the four photo gate signals PGA to PGD may be applied to the pixel PXb. As in the photo gate signals PGA and PGB, the photo gate signals PGA to PGD may have different phases (e.g., 0 degree, 90 degrees, 180 degrees, and 270 degrees) and may not overlap each other in terms of time.

For example, the pixel PXb may output the output signals OUT1 to OUT4 to the analog processing circuit 144 through four output lines. The control signals OG, TXA, TXB, TXC, TXD, RG1, RG2, SEL1, SEL2, TG1, TG2, SG1, and SG2 may be applied to the pixel PXb during one readout interval as illustrated in FIGS. 6A and 6B. During one readout interval, the pixel PXb may output the output signals OUT1 to OUT4 having reset levels and may output the output signals OUT1 to OUT4 having signal levels.

As another example, the pixel PXb may output the output signals OUT1 to OUT4 to the analog processing circuit 144 through two output lines. The control signals OG, TXA, TXB, RG1, SEL1, TG1, and SG1 may be applied to the pixel PXb during one readout interval as illustrated in FIGS. 6A and 6B, the control signals TXC, TXD, SEL2, and TG2 may be deactivated, and the control signals RG2 and SG2 may be activated. During the one readout interval, the pixel PXb may output the output signals OUT1 and OUT2 having reset levels and may output the output signals OUT1 and OUT2 having signal levels. As in the example illustrated in FIGS. 6A and 6B, the control signals OG, TXC, TXD, RG2, SEL2, TG2, and SG2 may be applied to the pixel PXb during another readout interval following the above-described readout interval, the control signals TXA, TXB, SEL1, and TG1 may be deactivated, and the control signals RG1 and SG1 may be activated. During the another readout interval, the pixel PXb may output the output signals OUT3 and OUT4 having reset levels and may output the output signals OUT3 and OUT4 having signal levels. With regard to the output signals OUT1 to OUT4 of the pixel PXb, the readout interval illustrated in FIGS. 6A and 6B may be repeated two times, and the order of reading the output signals OUT1 to OUT4 is not limited to the above example.

FIGS. 7A to 7I illustrate examples of one-dimensional light scanning and pixel array scanning in a column direction, which are performed by an electronic device of FIG. 1. An example is illustrated as the pixel array 141 includes 4×4 pixels PX or 8×4 pixels PX arranged in the row direction D1 and the column direction D2, but the number of pixels PX of the pixel array 141 is not limited to the above examples. The pixel PX of FIGS. 7A to 7I may be one of the pixels PXa and PXb of FIGS. 3A and 3B. The photo gate driver 143 of the ToF sensor 140a of FIG. 4A may transfer the photo gate signals PGA and PGB/PGA to PGD, to the pixel PX of FIGS. 7A to 7I in the row direction D1. A direction of light scanning may correspond to a direction in which the light signal RL is incident sequentially onto pixel blocks PB. The light scanning direction may be the column direction D2 and may correspond to one dimension. Pixel array scanning means a series of operations in which the pixels PX of the pixel array 141 sequentially demodulate the light signals RL based on the light scanning direction. By controlling the light source 110 and the optical device 120, the controller 150 may project the light signal EL sequentially to the plurality of areas of the object 11 to scan the object 11. A direction in which the photo gate signals PGA and PGB/PGA to PGD, are transferred may correspond to the light scanning direction. For example, the directions may be different and may be perpendicular to each other.

Referring to FIGS. 7A to 7D, the pixel block PB may include the pixels PX arranged at each of rows R1 to R4, that is, at one row (alternatively referred to as a "line"). Only one pixel block PB is illustrated in FIGS. 7A to 7D, but the pixel array 141 may be divided into a plurality of pixel blocks PB. In the case of FIGS. 7A to 7D, 4×4 pixels PX may be divided into a plurality of pixel blocks PB each including 1×4 pixels PX. For example, the pixels PX of the pixel block PB may be disposed at the same row and different columns C1 to C4. Referring to FIGS. 7E to 7I, the pixel block PB may include the pixels PX arranged at a plurality of rows R1 to R4/R5 to R8. For example, the pixels PX of the pixel block PB may be disposed at different rows R1 to R4/R5 to R8 and different columns C1 to C4. In the case of FIGS. 7E to 7I, 8×4 pixels PX may be divided into a plurality of pixel blocks PB each including 4×4 pixels PX. In any case, the pixel block PB may be a unit of dividing the pixel array 141 and may include the pixels PX arranged at one or more rows, and the pixels PX of the pixel block PB may be exposed to the light signals RL together.

Figure 7A:
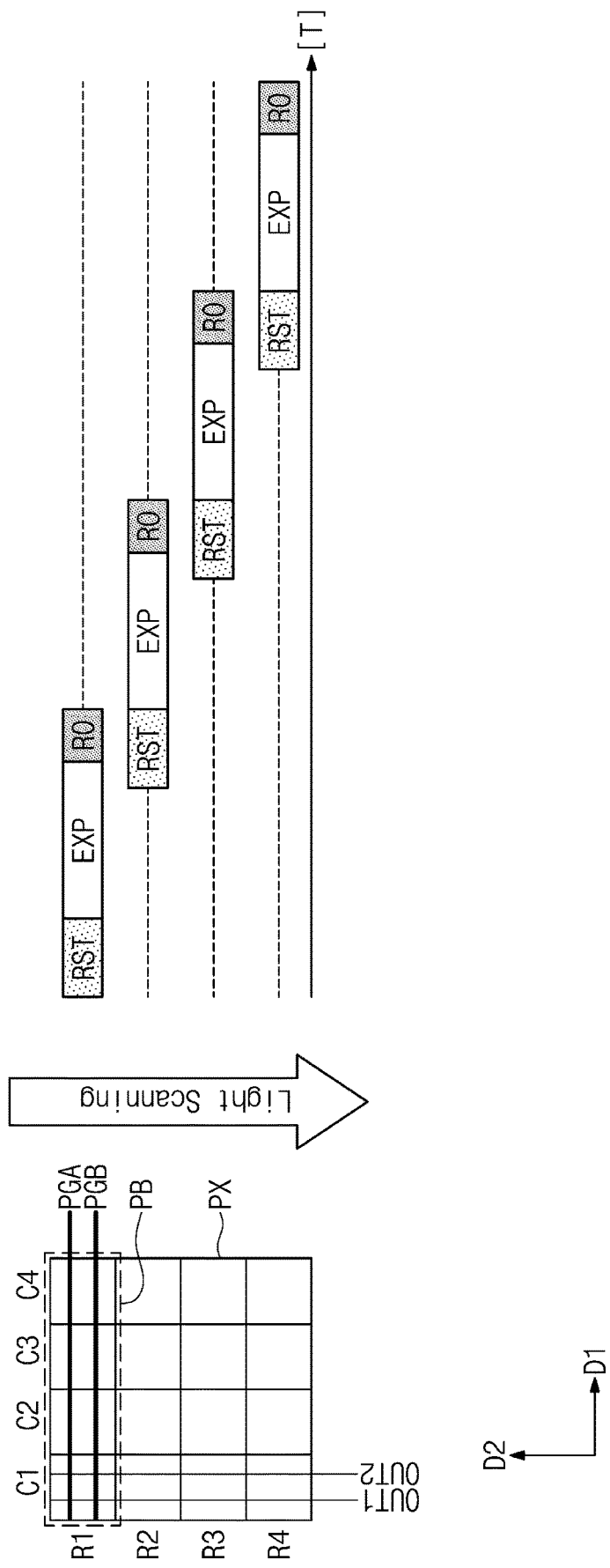
FIGS. 7A, 7B, 7C, 7D, 7E, 7F, 7G, 7H and 7I illustrate examples of one-dimensional light scanning and pixel array scanning in a column direction, which are performed by an electronic device of FIG. 1.

Referring to FIG. 7A, the light signal RL may be incident sequentially onto the pixels PX arranged at row R1, the pixels PX arranged at row R2, the pixels PX arranged at row R3, and the pixels PX arranged at row R4. Depending on a direction (e.g., the column direction D2) of light scanning that is performed by the controller 150, the components 142 to 146 may control (or drive) the pixels PX of the pixel array 141 in units of a row (or in units of a pixel block) over time. First of all, the pixels PX arranged at row R1 may be reset during a reset interval RST, may be exposed to the light signal RL to integrate charges during an exposure interval EXP, and may output the output signals OUT1 and OUT2/OUT1 to OUT4 during a readout interval RO. The operations of the pixel PX in the reset interval RST, the exposure interval EXP, and the readout interval RO are described with reference to FIGS. 5A to 6B. Next, the pixels PX arranged at row R2 may be reset during a reset interval RST, may be exposed to the light signal RL to integrate charges during an exposure interval EXP, and may output the output signals OUT1 and OUT2/OUT1 to OUT4 during a readout interval RO. The readout interval RO of the pixels PX arranged at row R1 and the reset interval RST of the pixels PX arranged at row R2 may overlap each other, the exposure interval EXP of the pixels PX arranged at row R2 may be placed after the readout interval RO of the pixels PX arranged at row R1, and the readout interval RO of the pixels PX arranged at row R1 may be placed between the exposure intervals EXP of the pixels PX arranged at row R1 and row R2. The readout interval RO of the pixels PX arranged at row R2 may be placed after the exposure interval EXP of the pixels PX arranged at row R2. The pixels PX arranged at row R3 and row R4 may sequentially operate to be substantially identical to the pixels PX arranged at row R1 and row R2. The pixels PX arranged at row R1, the pixels PX arranged at row R2, the pixels PX arranged at row R3, and the pixels PX arranged at row R4 may sequentially demodulate the light signals RL along a scanning direction in which the light signals RL are incident.

Figure 7B:
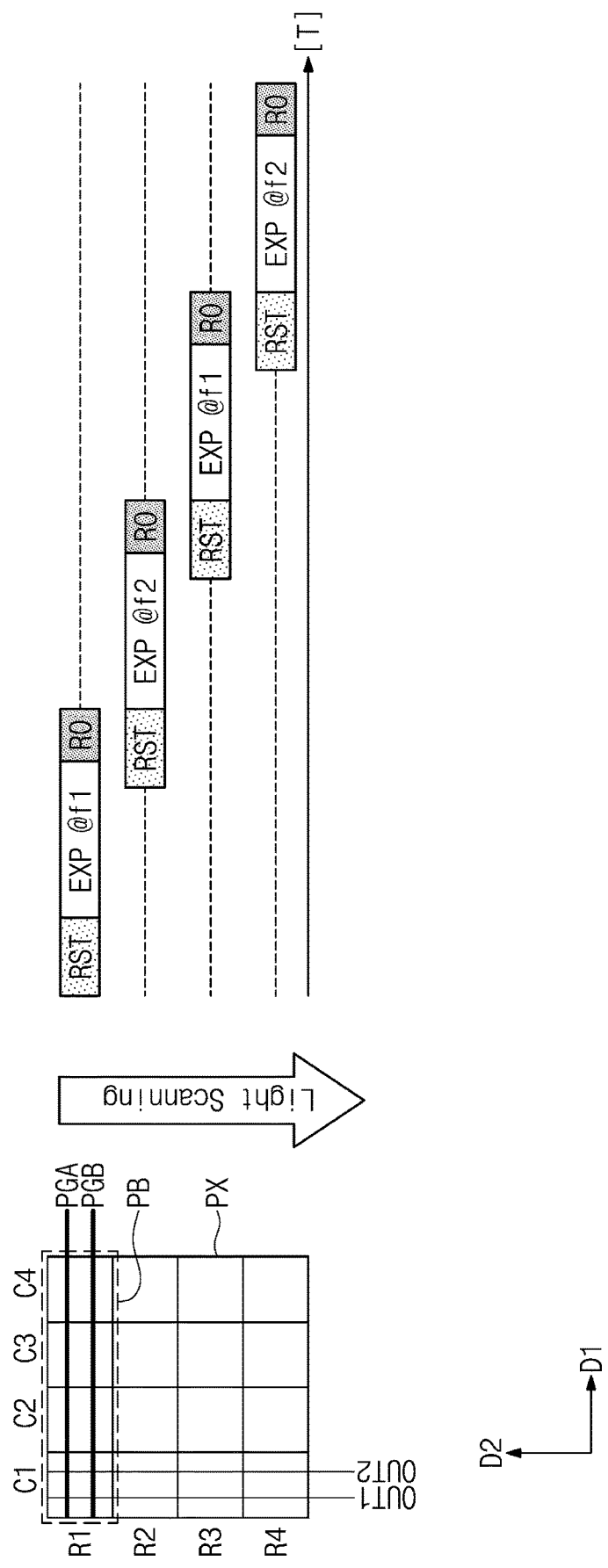

Referring to FIG. 7B, frequencies of the photo gate signals PGA and PGB/PGA to PGD applied to the pixels PX arranged at rows R1 and R3 during the exposure intervals EXP may be f1 (e.g., approximately 80 MHz), and frequencies of the photo gate signals PGA and PGB/PGA to PGD applied to the pixels PX arranged at rows R2 and R4 during the exposure intervals EXP may be f2 (e.g., approximately 100 MHz). For example, some of frequencies of the photo gate signals PGA and PGB/PGA to PGD applied to the pixels PX arranged at row R1 to row R4 may be equal, and the others thereof may be different. Alternatively, in other embodiments the frequencies of the photo gate signals PGA and PGB/PGA to PGD may be different. The photo gate driver 143 may differently adjust (or set) frequencies of the photo gate signals PGA and PGB/PGA to PGD depending on row R1 to row R4. Accordingly, compared to the case where frequencies of the photo gate signals PGA and PGB/PGA to PGD are equal regardless of row R1 to row R4, the ToF sensor 140 may alleviate the burden on multi-frame depth sensing in which the pixel array 141 operates several times and may increase a sensing distance.

Figure 7C:
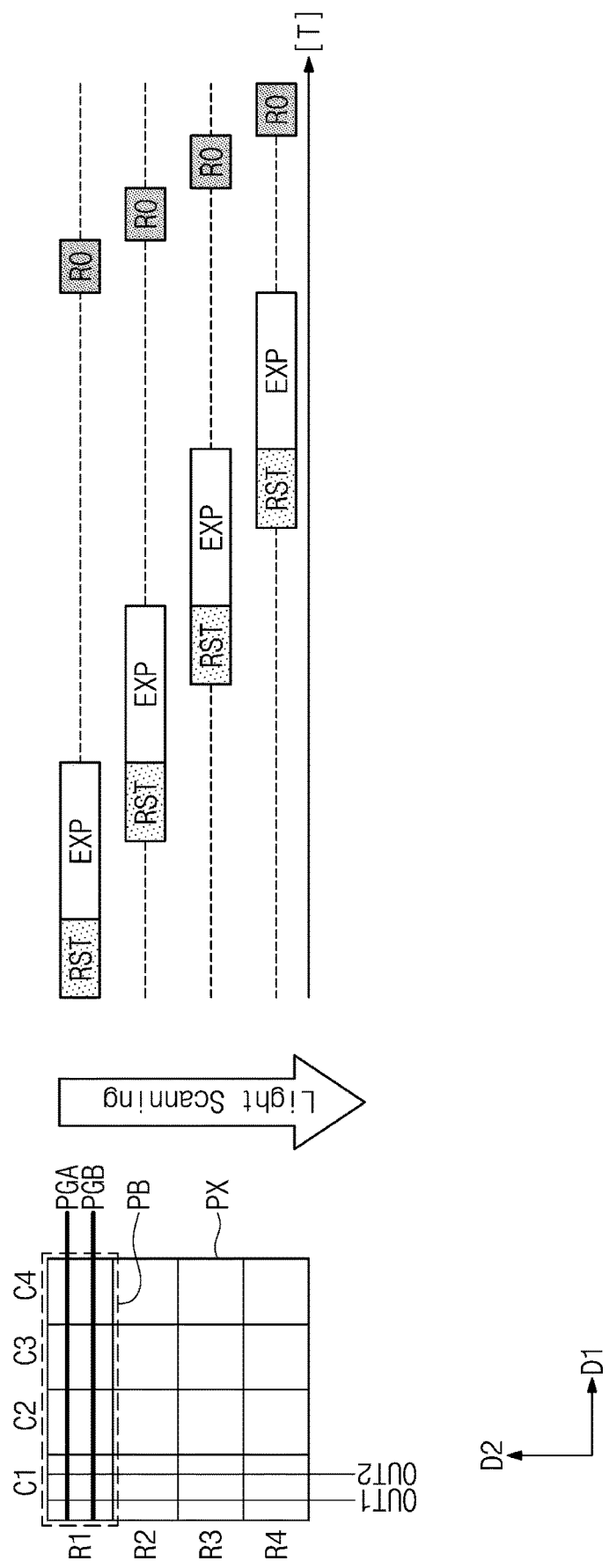

Referring to FIG. 7C, unlike the normal readout operation of FIG. 7A, in other embodiments the pixels PX of the pixel array 141 may perform a rolling readout operation. The pixels PX arranged at row R1 may be reset during the reset interval RST and may be exposed to the light signal RL to integrate charges during the exposure interval EXP. The reset interval RST of the pixels PX arranged at row R2 may overlap the exposure interval EXP of the pixels PX arranged at row R1. The pixels PX arranged at row R3 and row R4 may perform the reset operation and the exposure operation to be substantially identical to the pixels PX arranged at row R1 and row R2. When the exposure interval of all the pixels PX of the pixel array 141 end, the readout operation of all the pixels PX of the pixel array 141 may be initiated. The pixels PX arranged at row R1 to row R4 may sequentially output the output signals OUT1 and OUT2/OUT1 to OUT4 during the readout intervals RO. The readout interval RO of the pixels PX arranged at row R1 may be placed after the exposure interval EXP of the pixels PX arranged at row R4. The readout interval RO of the pixels PX arranged at row R2 may be placed after the readout interval RO of the pixels PX arranged at row R1. The readout intervals RO of the pixels PX arranged at row R1 to row R4 may be sequential.

Figure 7D:
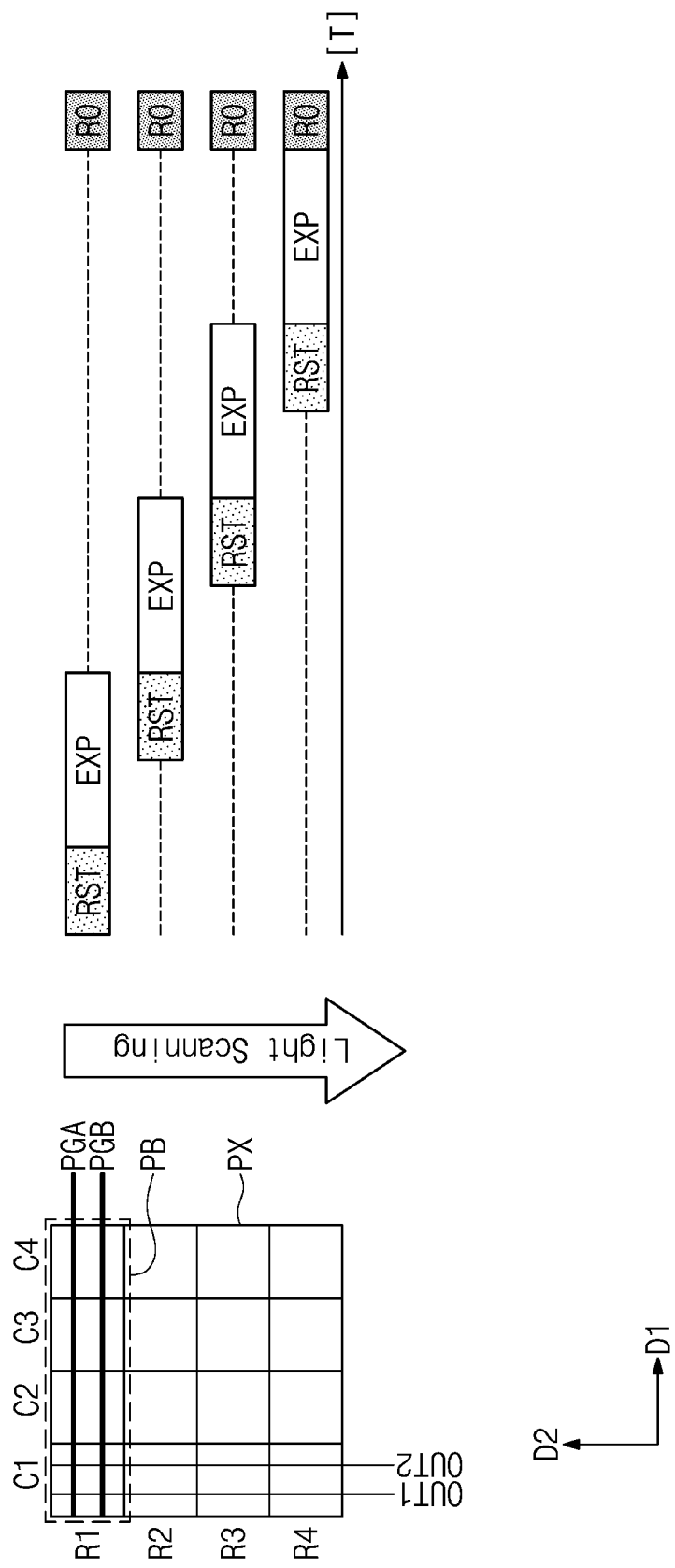

Referring to FIG. 7D, unlike FIG. 7C, in other embodiments the pixels PX of the pixel array 141 may perform a global readout operation. The readout intervals RO of the pixels PX arranged at row R1 to row R4 may overlap each other. The pixels PX arranged at row R1 to row R4 may simultaneously output the output signals OUT1 and OUT2/OUT1 to OUT4 during the readout intervals RO overlapping each other. In the case of FIG. 7D, the analog processing circuit 144 may be disposed in the ToF sensor 140 to overlap the pixel array 141 in a direction perpendicular to the row direction D1 and the column direction D2. A substrate where the pixel array 141 is implemented may be three-dimensionally stacked on/over a substrate where the analog processing circuit 144 is implemented. As described with reference to FIG. 7B, also, the photo gate driver 143 to which the timing diagrams of FIGS. 7C and 7D are applied may differently adjust frequencies of the photo gate signals PGA and PGB/PGA to PGD depending on row R1 to row R4.

Figure 7E:
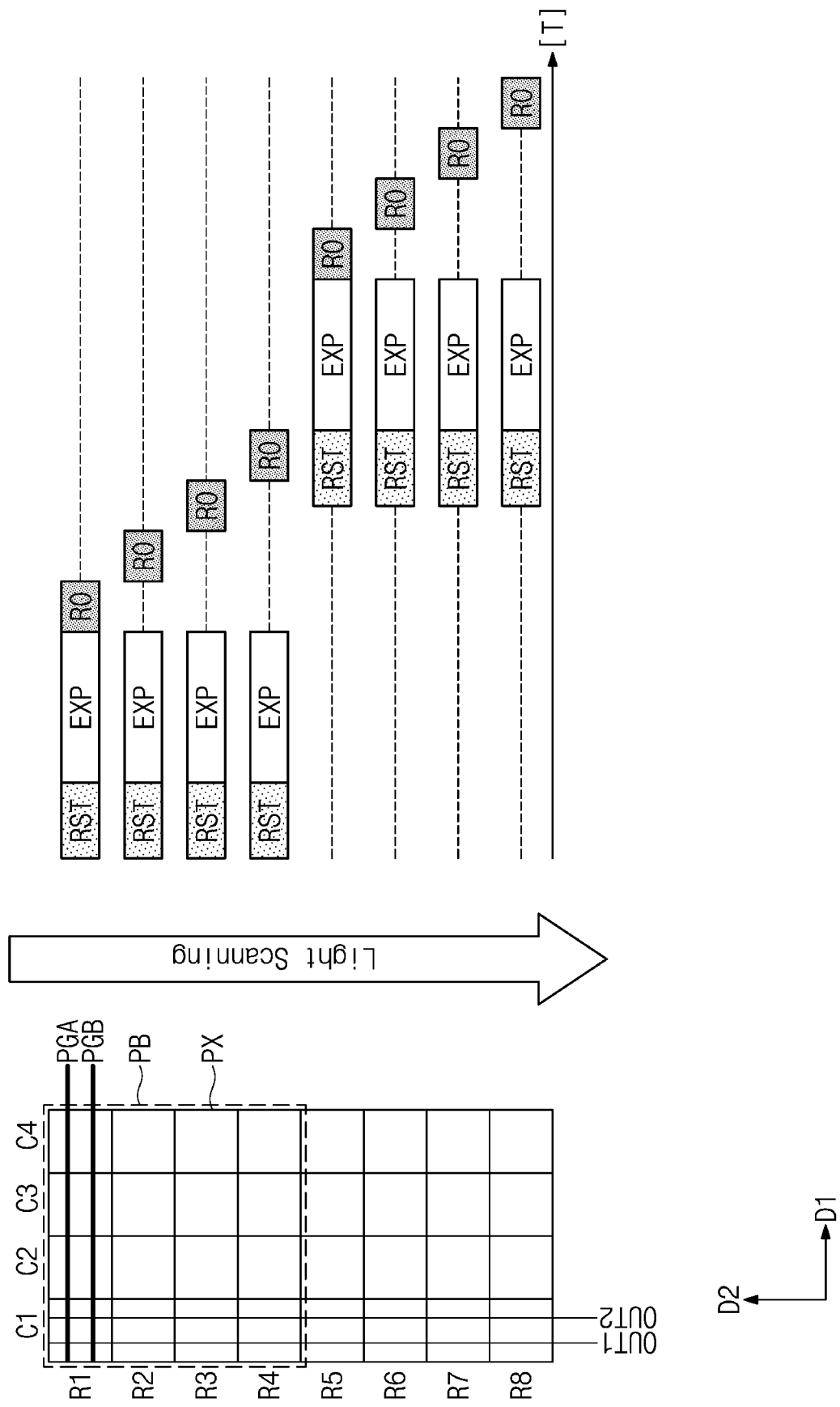

Referring to FIG. 7E, depending on a direction of light scanning that is performed by the controller 150, the components 142 to 146 may control the pixels PX of the pixel array 141 in units of a plurality of rows (or in units of a pixel block) over time. The pixels PX arranged at row R1 to row R4 of the pixel block PB may be reset during the reset interval RST and may be exposed to the light signal RL to integrate charges during the exposure interval EXP. After the exposure interval EXP, as in the case of FIG. 7C, the pixels PX arranged at row R1 to row R4 may sequentially output the output signals OUT1 and OUT2/OUT1 to OUT4 during the readout intervals RO. Next, the pixels PX arranged at row R5 to row R8 of the next pixel block PB may be reset during the reset interval RST and may be exposed to the light signal RL to integrate charges during the exposure interval EXP. After the exposure interval EXP, as in the case of FIG. 7C, the pixels PX arranged at row R5 to row R8 may sequentially output the output signals OUT1 and OUT2/OUT1 to OUT4 during the readout intervals RO. The readout intervals RO of the pixels PX arranged at row R1 to row R4 and the reset intervals RST of the pixels PX arranged at row R5 to row R8 may overlap each other, the exposure interval EXP of the pixels PX arranged at row R5 to row R8 may be placed after the readout intervals RO of the pixels PX arranged at row R1 to row R4, and the readout intervals RO of the pixels PX arranged at row R1 to row R4 may be placed between the exposure interval EXP of the pixels PX arranged at row R1 to row R4 and the exposure interval EXP of the pixels PX arranged at row R5 to row R8.

Figure 7F:
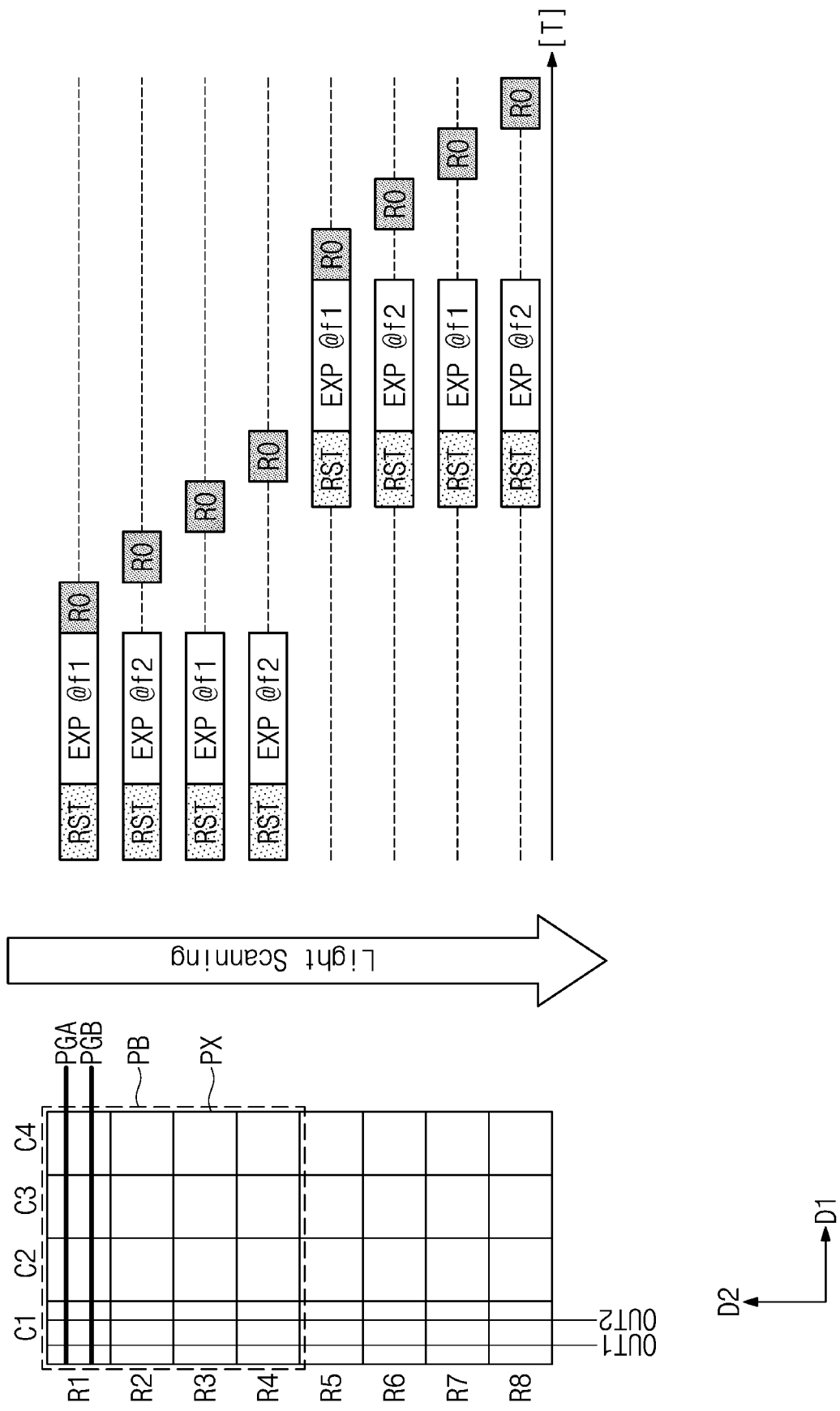

The timing diagram of FIG. 7F may be substantially identical to the timing diagram of FIG. 7E except that the photo gate driver 143 may differently adjust frequencies of the photo gate signals PGA and PGB/PGA to PGD depending on row R1 to row R4 as described with reference to FIG. 7B.

Figure 7G:
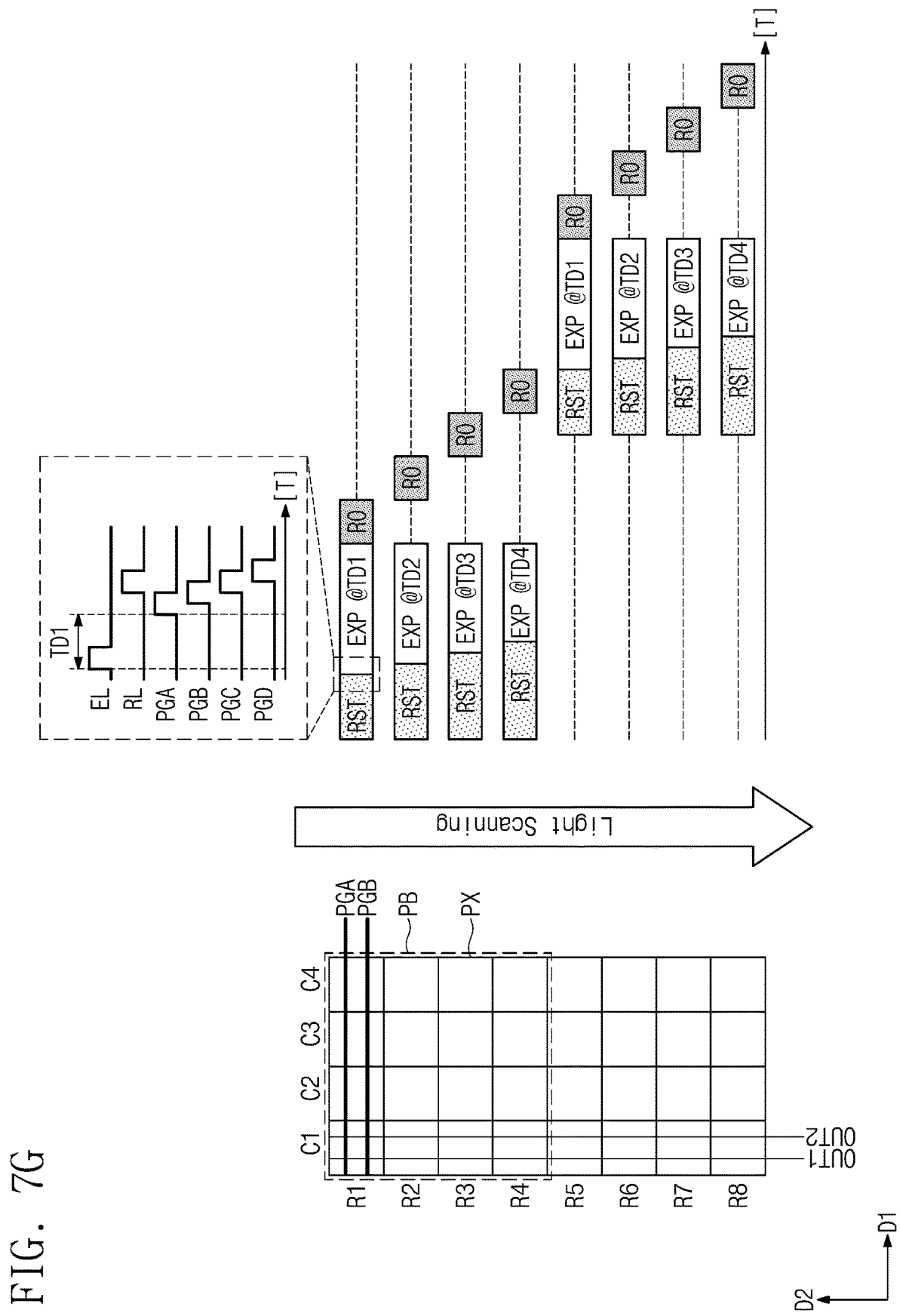

Referring to FIG. 7G, the photo gate driver 143 may allow the photo gate signals PGA to PGB/PGA to PGD to be differently delayed with respect to the light signal EL depending on row R1 to row R4 in the pixel block PB. For example, a time difference between the light signal EL emitted to the object 11 and the photo gate signals PGA transferred to the pixels PX during the exposure interval EXP may be set to values TD1 to TD4 (e.g., 0 ns, 100 ns, 200 ns, 300 ns) depending on row R1 to row R4. For example, the time difference between when a (first) light signal EL is emitted to the object 11 and the photo gate signal PGA for the row R1 is transferred may be TD1 (e.g., 0 ns), the time difference between when a (second) light signal EL is emitted to the object 11 and the photo gate signal PGA for the row R2 is transferred may be TD2 (e.g., 100 ns), the time difference between when a (third) light signal EL is emitted to the object 11 and the photo gate signal PGA for the row R3 is transferred may be TD3 (e.g., 200 ns), and the time difference between when a (fourth) light signal EL is emitted to the object 11 and the photo gate signal PGA for the row R4 is transferred may be TD4 (e.g., 300 ns). Unlike the example illustrated in FIG. 7G, in other embodiments some of the time differences between the light signal EL and the photo gate signals PGA may be equal. Also, time differences between the light signal EL and the photo gate signals PGA may vary depending on the pixel block PB.

Figure 7H:
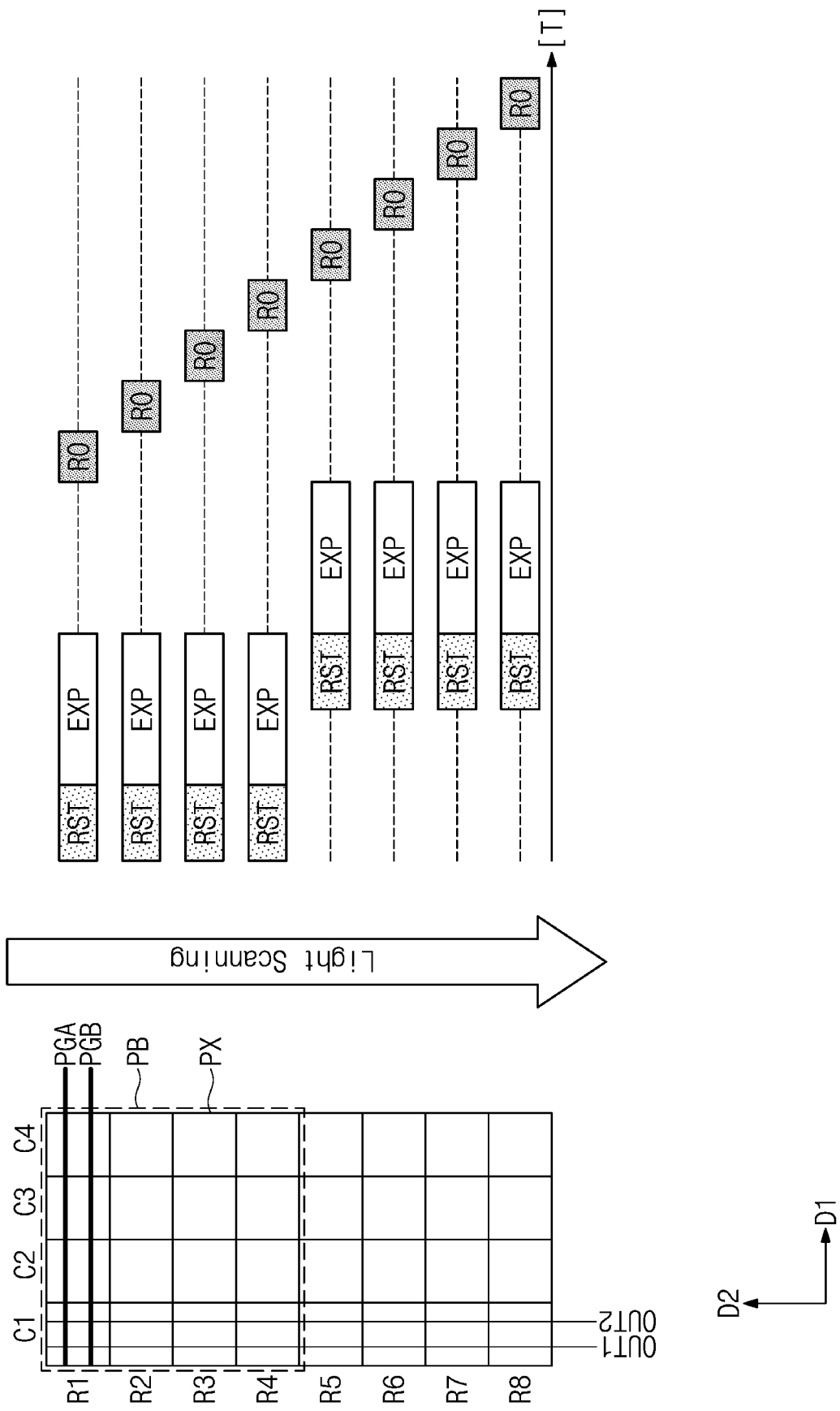

Referring to FIG. 7H, unlike FIG. 7E and as in FIG. 7C, in other embodiments the pixels PX of the pixel array 141 may perform the rolling readout operation. The pixels PX arranged at row R1 to row R4 may be reset during the reset interval RST and may be exposed to the light signal RL to integrate charges during the exposure interval EXP. The reset interval RST of the pixels PX arranged at row R5 to row R8 may overlap the exposure interval EXP of the pixels PX arranged at row R1 to row R4. When the exposure interval of all the pixels PX of the pixel array 141 end, the readout operation of all the pixels PX of the pixel array 141 may be initiated to occur sequentially.

Figure 7I:
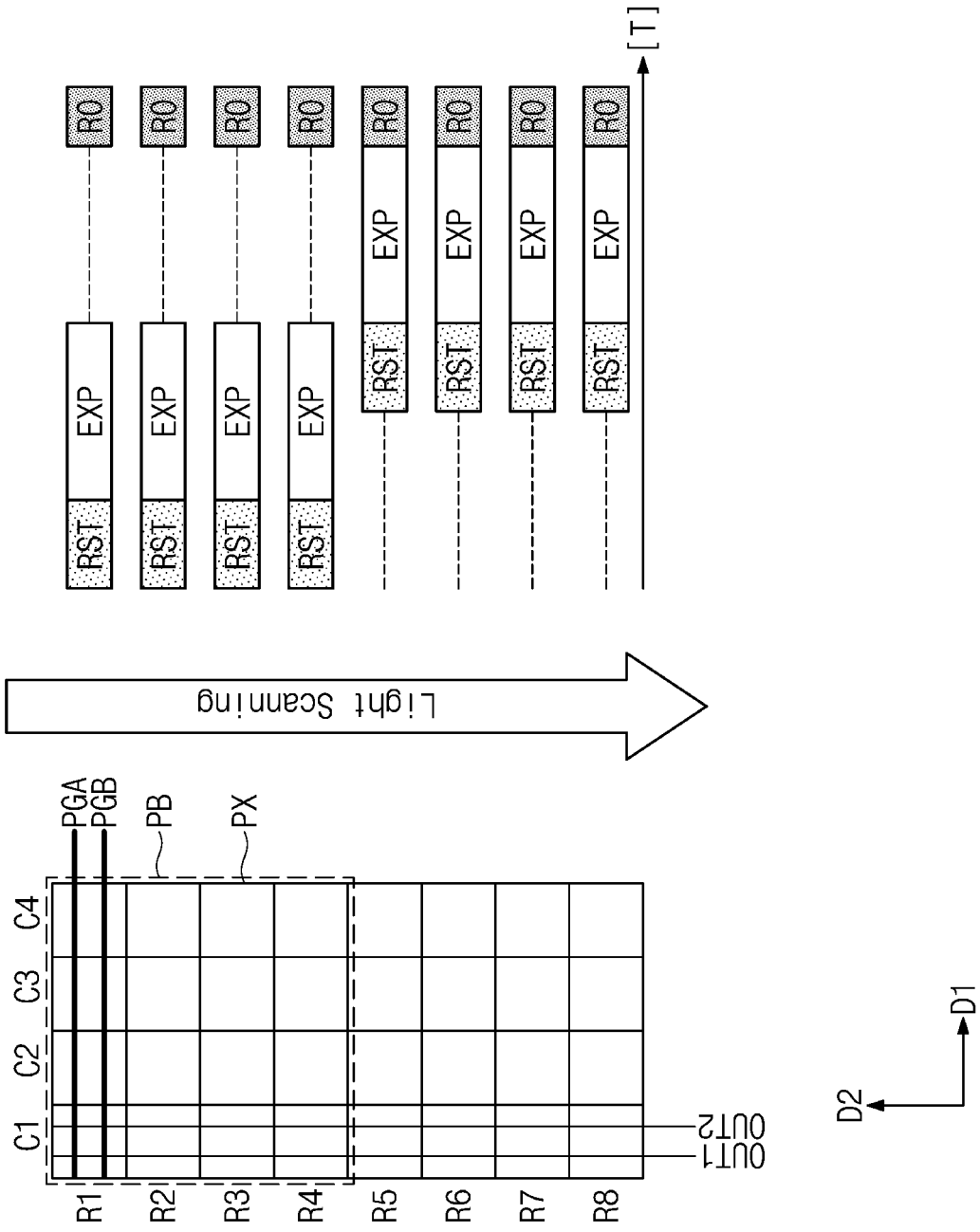

Referring to FIG. 7I, unlike FIG. 7H and as in FIG. 7D, in other embodiments the pixels PX of the pixel array 141 may perform the global readout operation. The pixels PX arranged at row R1 to row R8 may simultaneously output the output signals OUT1 and OUT2/OUT1 to OUT4 during the readout intervals RO overlapping each other. Also, as in FIG. 7F or FIG. 7G, depending on row R1 to row R4 in the pixel block PB, the photo gate driver 143 to which the timing diagrams of FIGS. 7H and 7I are applied may differently adjust frequencies of the photo gate signals PGA and PGB/PGA to PGD, or may allow the photo gate signals PGA and PGB/PGA to PGD to be differently delayed with respect to the light signal EL.

Figure 8A:
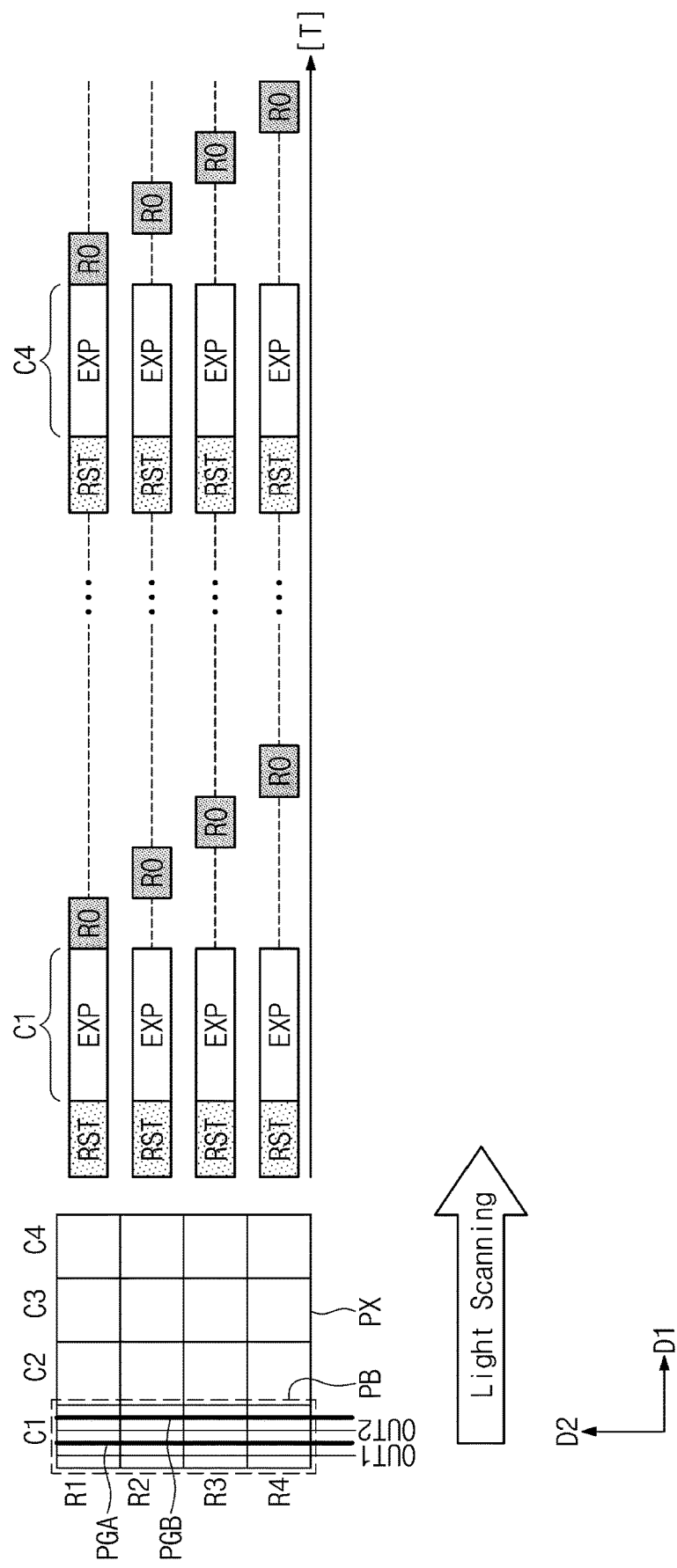
FIGS. 8A, 8B and 8C illustrate examples of one-dimensional light scanning and pixel array scanning in a row direction, which are performed by an electronic device of FIG. 1.
Figure 8B:
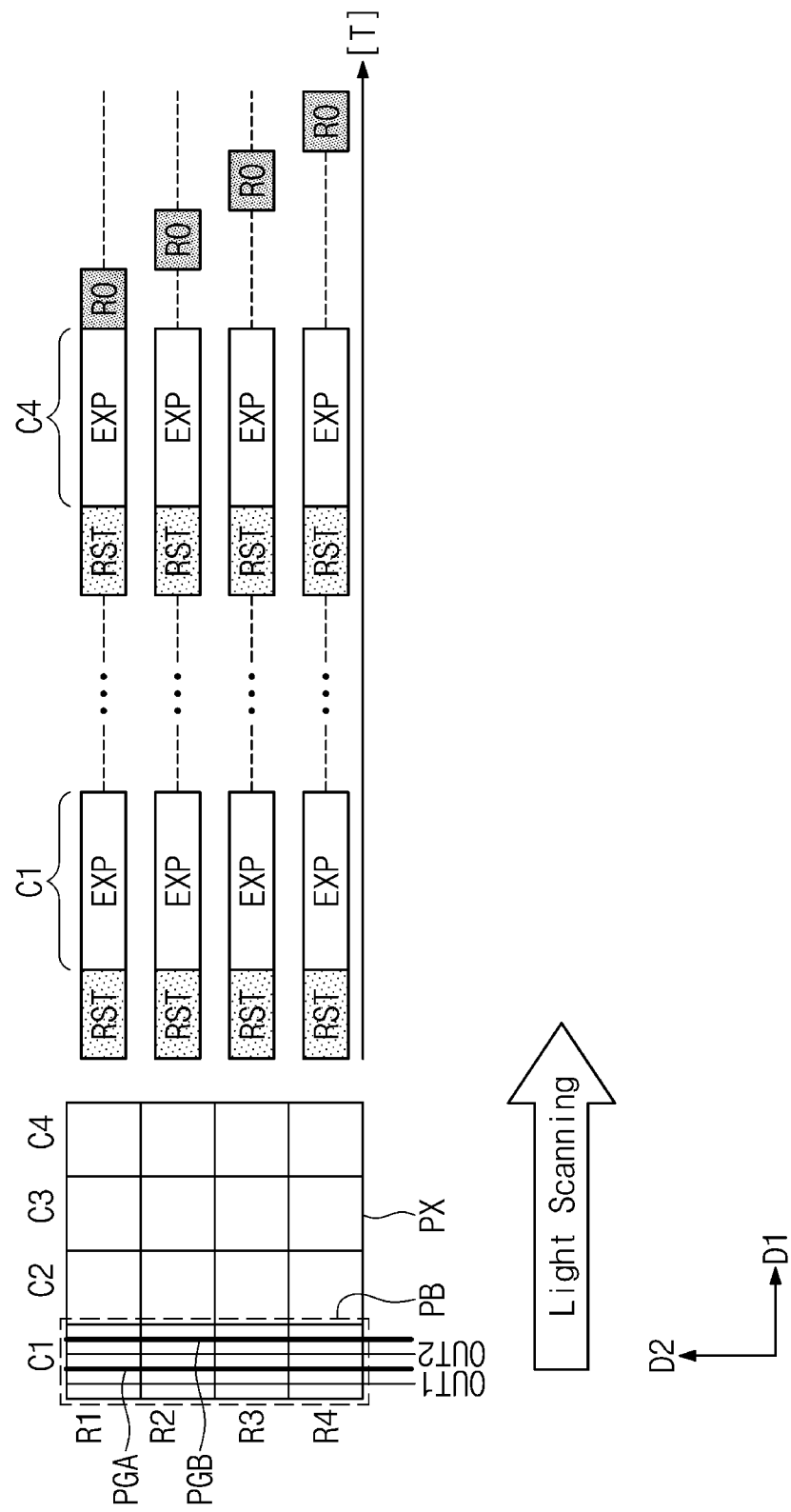
Figure 8C:
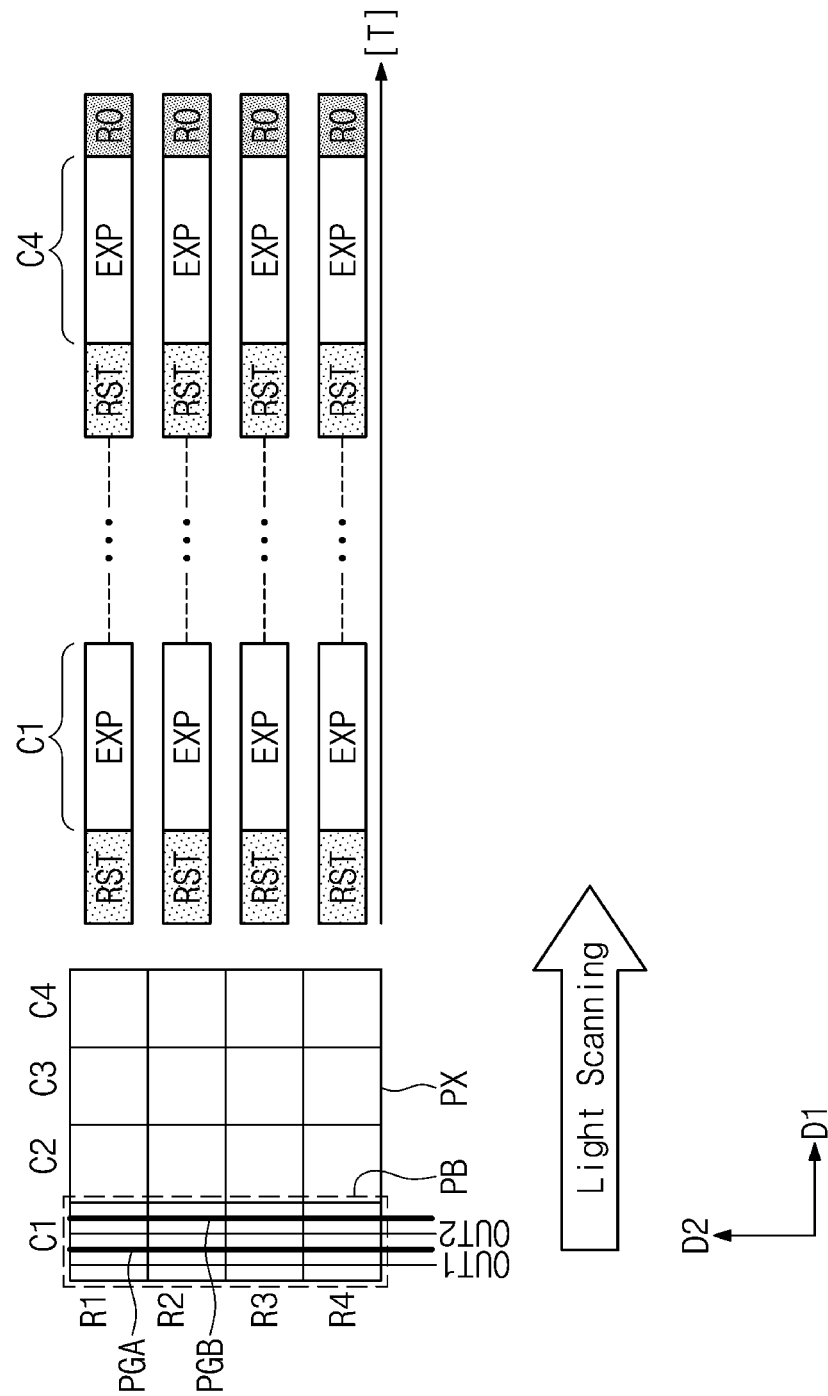

FIGS. 8A to 8C illustrate examples of one-dimensional light scanning and pixel array scanning in a row direction, which are performed by an electronic device of FIG. 1. The differences between the timing diagrams FIGS. 8A to 8C and the timing diagrams of FIGS. 7A to 7I will be mainly described hereinafter. The photo gate driver 143 of the ToF sensor 140*b* of FIG. 4B may transfer the photo gate signals PGA and PGB/PGA to PGD to the pixel PX of FIGS. 8A to 8C in the column direction D2. The light scanning direction may be in the row direction D1, different from the column direction D2 described with reference to FIGS. 7A to 7I and may correspond to one dimension. The light signal RL may be incident sequentially to the pixel blocks PB in the row direction D1 being the light scanning direction. A direction in which the photo gate signals PGA and PGB/PGA to PGD are transferred may correspond to the light scanning direction. For example, the directions may be different and may be perpendicular to each other. Referring to FIGS. 8A to 8C, the pixel block PB may include the pixels PX arranged at each of columns C1 to C4, that is, at one column (alternatively referred to as a "line"). For example, the pixels PX of the pixel block PB may be disposed at the same column and different rows R1 to R4. Unlike the examples illustrated in FIGS. 8A to 8C, in other embodiments the pixel block PB may include pixels arranged at a plurality of columns. For example, the pixels PX of the pixel block PB may be disposed at different rows R1 to R4 and different columns C1 to C4. In any case, the pixel block PB may include the pixels PX arranged at one or more columns, and the pixels PX of the pixel block PB may be exposed to the light signals RL together.

Referring to FIG. 8A, the pixels PX arranged at column C1 may be reset during the reset interval RST, may be exposed to the light signal RL to integrate charges during the exposure interval EXP, and may output the output signals OUT1 and OUT2/OUT1 to OUT4 during the readout intervals RO. As in FIG. 7C, the pixels PX arranged at column C1 may sequentially output the output signals OUT1 and OUT2/OUT1 to OUT4 during the plurality of readout intervals RO. The readout interval RO of the pixel PX disposed at row R1 and column C1 may be placed after the exposure interval EXP of the pixels PX arranged at column C1. The readout interval RO of the pixel PX disposed at row R2 and column C1 may be placed after the readout interval RO of the pixel PX arranged at row R1 and column C1. The reset interval RST of the pixels PX disposed at column C2 may be placed after the readout intervals RO of the pixels PX arranged at column C1. The pixels PX arranged at column C2 to column C4 may sequentially operate to be substantially identical to the pixels PX arranged at column C1.

Referring to FIG. 8B, unlike the normal readout operation of FIG. 8A, in other embodiments the pixels PX of the pixel array 141 may perform the rolling readout operation. The pixels PX arranged at column C1 may be reset during the reset interval RST and may be exposed to the light signal RL to integrate charges during the exposure interval EXP. After the exposure interval EXP of the pixels PX arranged at column C1, the pixels PX arranged at column C2 may be reset during the reset interval RST and may be exposed to the light signal RL to integrate charges during the exposure interval EXP. As in the above description, the pixels PX arranged at column C3 and column C4 may be reset and may be exposed to the light signal RL to integrate charges. When the exposure interval of all the pixels PX of the pixel array 141 end, the readout operation of all the pixels PX of the pixel array 141 may be sequentially initiated. In some cases, a reset operation of each column may be performed only through an operation of controlling the overflow gate signal OG except for the reset gate signal RG. A global reset operation may be performed immediately before an exposure operation of the whole pixel array, and only a reset operation using the overflow gate signal OG may be performed for each column. As in FIG. 7C, the pixels PX arranged at column C1 to column C4 may sequentially output the output signals OUT1 and OUT2/OUT1 to OUT4 during the readout intervals RO.

Referring to FIG. 8C, unlike FIG. 8B and as in FIG. 7D, in other embodiments the pixels PX of the pixel array 141 may perform the global readout operation. The pixels PX arranged at column C1 to column C4 may simultaneously output the output signals OUT1 and OUT2/OUT1 to OUT4 during the readout intervals RO overlapping each other.

In an embodiment, as described with reference to FIG. 7B, the photo gate driver 143 to which the timing diagrams of FIGS. 8A to 8C are applied may differently adjust frequencies of the photo gate signals PGA and PGB/PGA to PGD depending on row R1 to row R4. In another embodiment, as in FIG. 7G, the photo gate driver 143 to which the timing diagrams of FIGS. 8A to 8C are applied may allow the photo gate signals PGA to PGB/PGA to PGD to be differently delayed with respect to the light signal EL depending on row R1 to row R4.

FIGS. 9A to 9F illustrate examples of two-dimensional light scanning and pixel array scanning in a row direction and a column direction, which are performed by an electronic device of FIG. 1. In FIGS. 7A to 8C, the controller 150 controls the light source 110 and the optical device 120 to perform one-dimensional light scanning. In FIGS. 9A to 9F, under control of the controller 150, the light source 110 and the optical device 120 may perform light scanning in two dimensions of the row direction D1 and the column direction D2. Shading portions on the pixels PX may indicate laser beams of the light signal RL. Laser beams may be sequentially incident onto the pixels PX at the R1-th row and the C1-th column, the R1-th row and the C2-th column, the R1-th row and the C3-th column, and the R1-th row and the C4-th column, and laser beams of the light signal RL may then be sequentially incident onto the pixels PX at the R2-th row and the C4-th column, the R2-th row and the C3-th column, the R2-th row and the C2-th column, and the R2-th row and the C1-th column. As in the above description, laser beams may be sequentially incident onto the remaining pixels PX. For example, the light scanning direction may be a serpentine direction. Although not illustrated, the pixels PX arranged at each of row R1 to row R4 may constitute the pixel block described above.

Figure 9A:
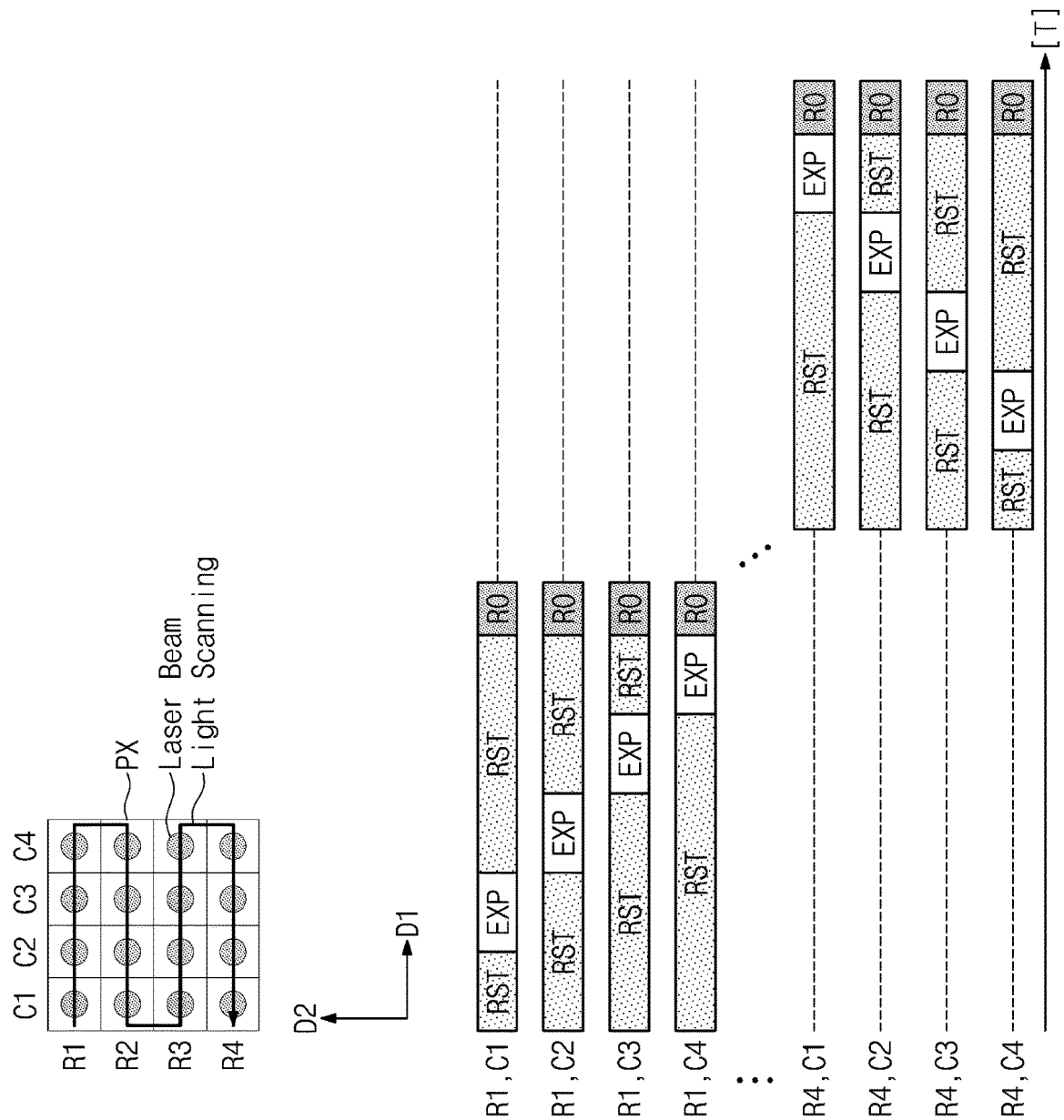
FIGS. 9A, 9B, 9C, 9D, 9E and 9F illustrate examples of two-dimensional light scanning and pixel array scanning in a row direction and a column direction, which are performed by an electronic device of FIG. 1.

Referring to FIG. 9A, depending on a direction of light scanning that is performed by the controller 150, the components 142 to 146 may control the pixels PX of the pixel array 141. The pixels PX at the R1-th row and the C1-th column, the R1-th row and the C2-th column, the R1-th row and the C3-th column, and the R1-th row and the C4-th column may be reset during the reset interval RST, may be sequentially exposed to laser beams to integrate charges during the exposure intervals EXP, and may output the output signals OUT1 and OUT2/OUT1 to OUT4 during the readout intervals RO. For example, the exposure intervals EXP of the pixels PX at the R1-th row and the C1-th column, the R1-th row and the C2-th column, the R1-th row and the C3-th column, and the R1-th row and the C4-th column may not overlap each other and may be placed sequentially along the light scanning direction. As in the pixels PX at the R1-th row and the C1-th column, the R1-th row and the C2-th column, the R1-th row and the C3-th column, and the R1-th row and the C4-th column, the remaining pixels PX may perform reset, exposure, and readout operations. However, because the light scanning direction is the serpentine direction, light scanning directions of pixels PX disposed at adjacent rows may be opposite to each other, and directions in which demodulation operations of the pixels PX are performed may be opposite to each other. For example, the exposure intervals EXP of the pixels PX at the R4-th row and the C4-th column, the R4-th row and the C3-th column, the R4-th row and the C2-th column, and the R4-th row and the C1-th column may not overlap each other and may be placed sequentially along a direction that is opposite to the light scanning direction of row R1.

Figure 9B:
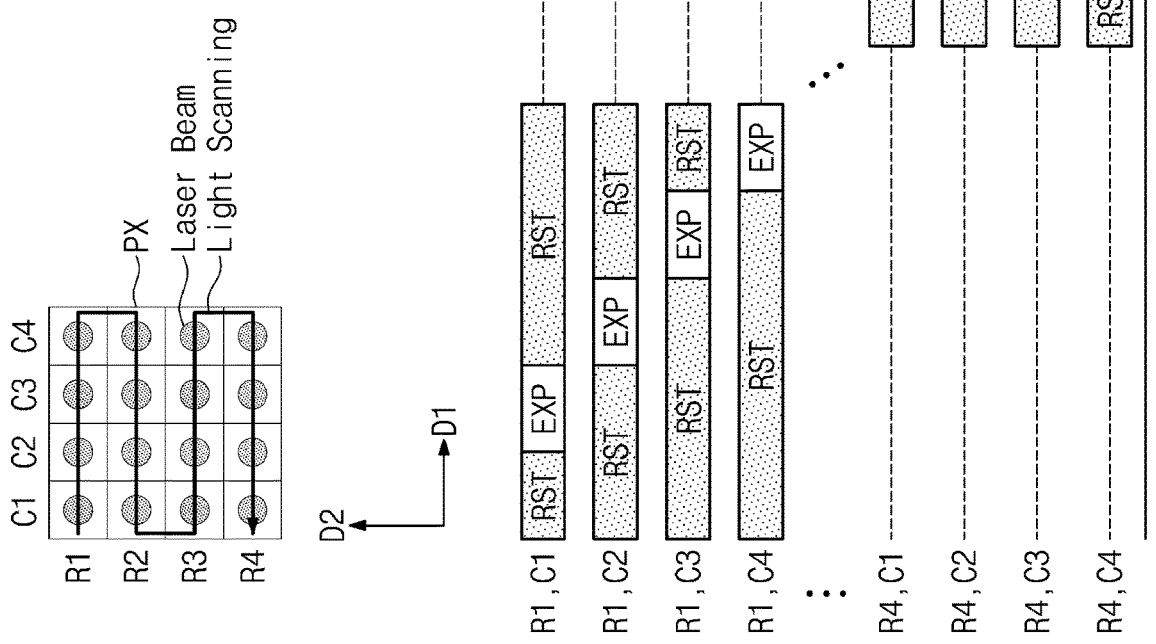

Referring to FIG. 9B, unlike the normal readout operation of FIG. 9A, the pixels PX of the pixel array 141 may perform the rolling readout operation. When the exposure interval of all the pixels PX of the pixel array 141 end, the readout operation of all the pixels PX of the pixel array 141 may be initiated. As in FIG. 7C, the pixels PX arranged at row R1 to row R4 may sequentially output the output signals OUT1 and OUT2/OUT1 to OUT4 during the readout intervals RO.

Figure 9C:
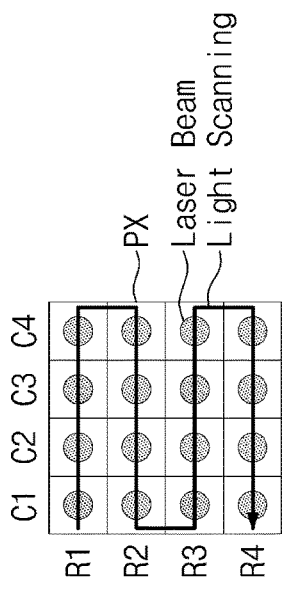
Figure 9C:
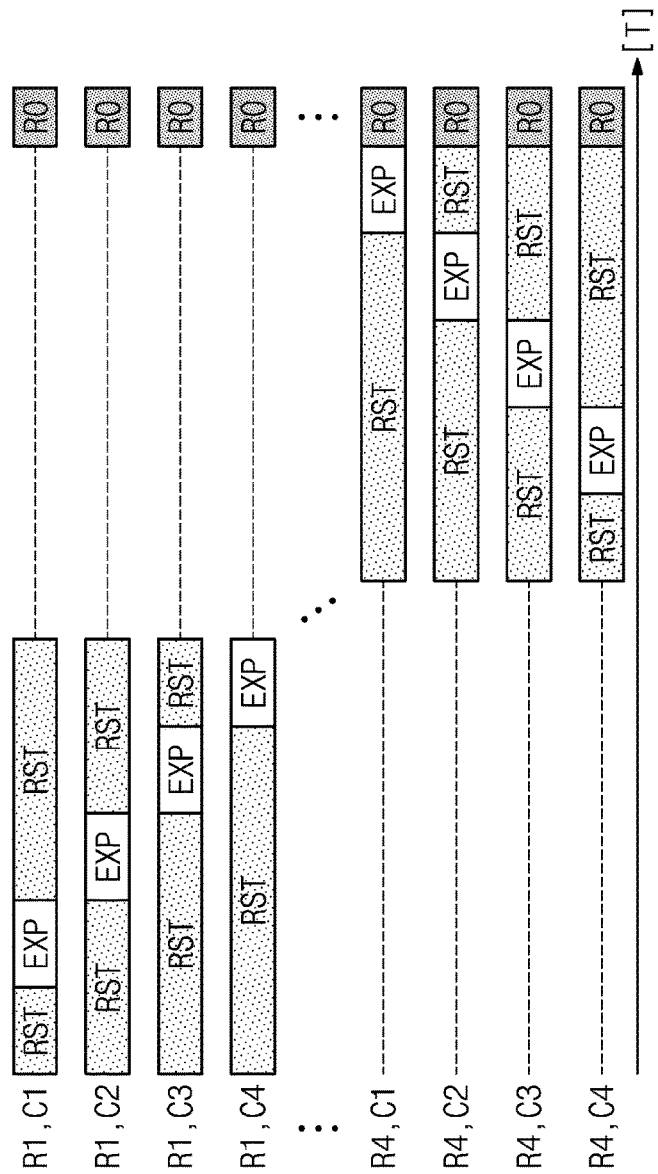

Referring to FIG. 9C, unlike FIG. 9B, the pixels PX of the pixel array 141 may perform the global readout operation. The readout intervals RO of the pixels PX arranged at row R1 to row R4 may overlap each other. As in FIG. 7D, the pixels PX arranged at row R1 to row R4 may simultaneously output the output signals OUT1 and OUT2/OUT1 to OUT4 during the readout intervals RO overlapping each other.

Referring to FIGS. 9A to 9C, exposure intervals of the pixels PX may not overlap each other. For example, the ToF sensor 140a/140b may further include an overflow gate driver (not shown) that transfers the overflow gate signals OG to the pixel array 141 in the column direction D2. As another example, an overflow gate driver that transfers the overflow gate signals OG to the pixel array 141 in the row direction D1 may be integrated into the photo gate driver 143 of the ToF sensor 140b. In the case where the overflow gate signals OG are transferred in the column direction D2, even though the photo gate signals are transferred in either the row direction D1 or the column direction D2, it is not an issue.

Figure 9D:
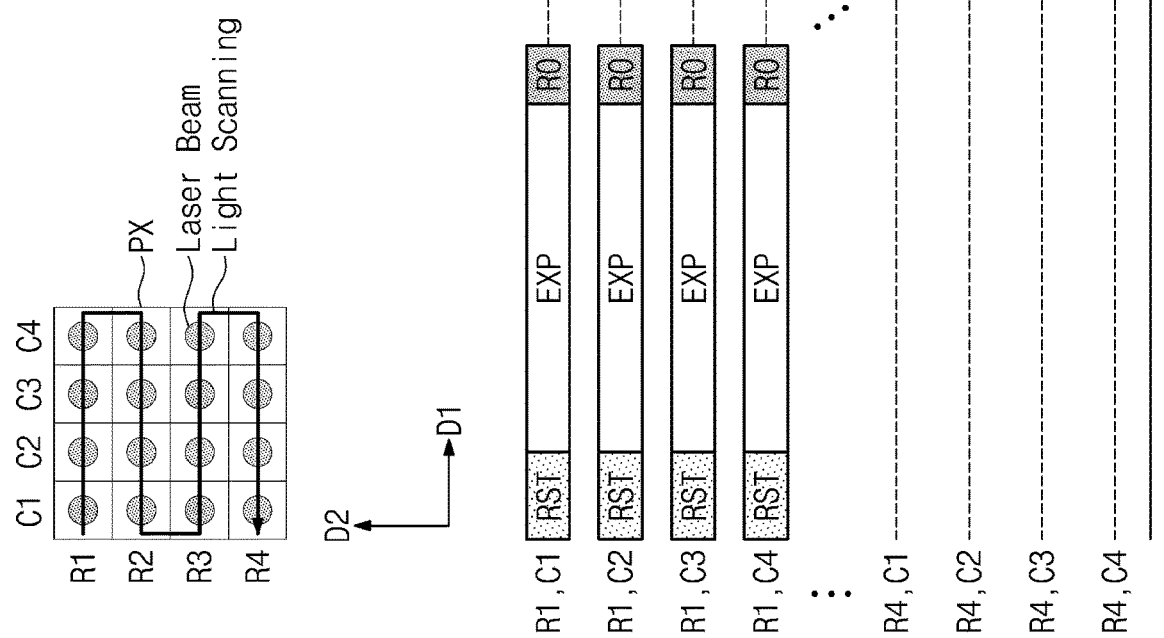
Figure 9E:
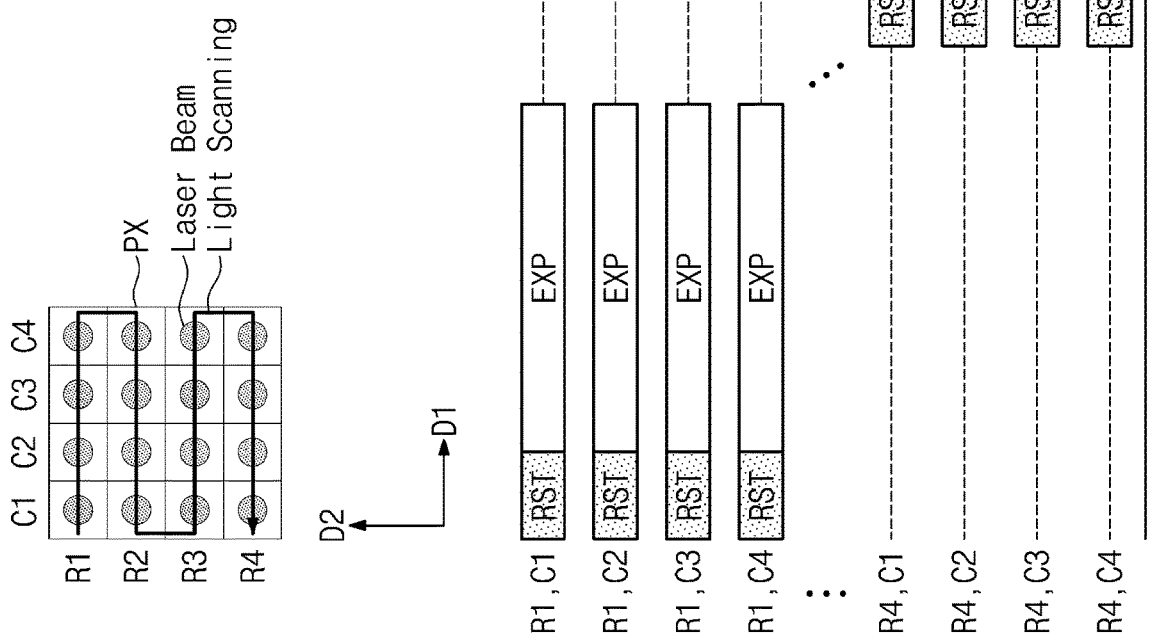
Figure 9F:
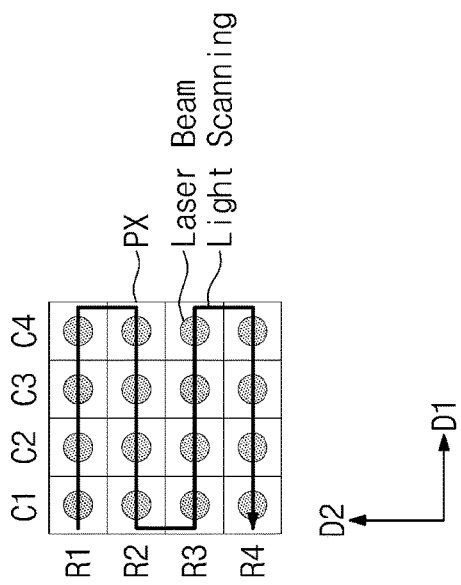
Figure 9F:
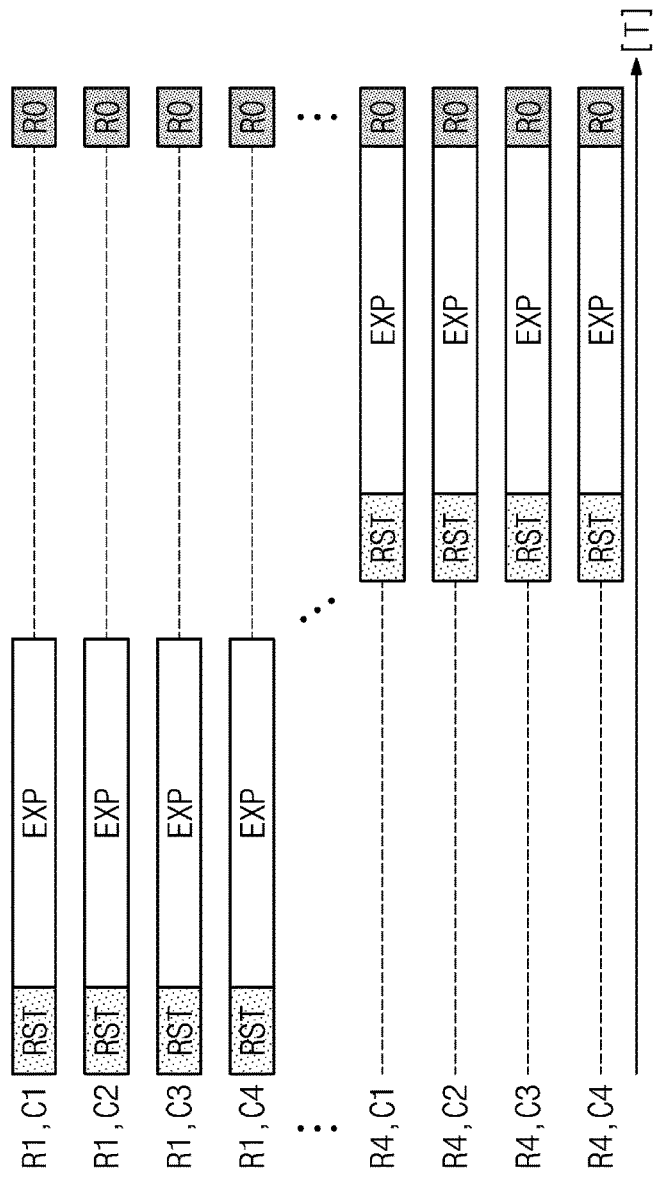

Referring to FIGS. 9D to 9F, exposure intervals of the pixels PX arranged at the same row R1/R2/R3/R4 may overlap each other. Except for the above-described difference, the timing diagrams of FIGS. 9D to 9F may be similar to the timing diagrams of FIGS. 9A to 9C, respectively. For example, the photo gate driver 142 of the ToF sensor 140a/140b may transfer the overflow gate signals OG to the pixels PX in the row direction R1.

FIGS. 10A to 10F illustrate examples of two-dimensional light scanning and pixel array scanning in a row direction and a column direction, which are performed by an electronic device of FIG. 1. The controller 150 may control the light source 110 and the optical device 120 to perform light scanning in two dimensions of the row direction D1 and the column direction D2. Laser beams may be sequentially incident onto the pixels PX at the R1-th row and the C1-th column, the R1-th row and the C2-th column, the R1-th row and the C3-th column, and the R1-th row and the C4-th column, and laser beams may then be sequentially incident onto the pixels PX at the R2-th row and the C1-th column, the R2-th row and the C2-th column, the R2-th row and the C3-th column, and the R2-th row and the C4-th column. As in the above description, laser beams may be sequentially incident onto the remaining pixels PX. For example, the light scanning direction may be a zigzag direction, not the serpentine direction described with reference to FIGS. 9A to 9F.

Figure 10A:
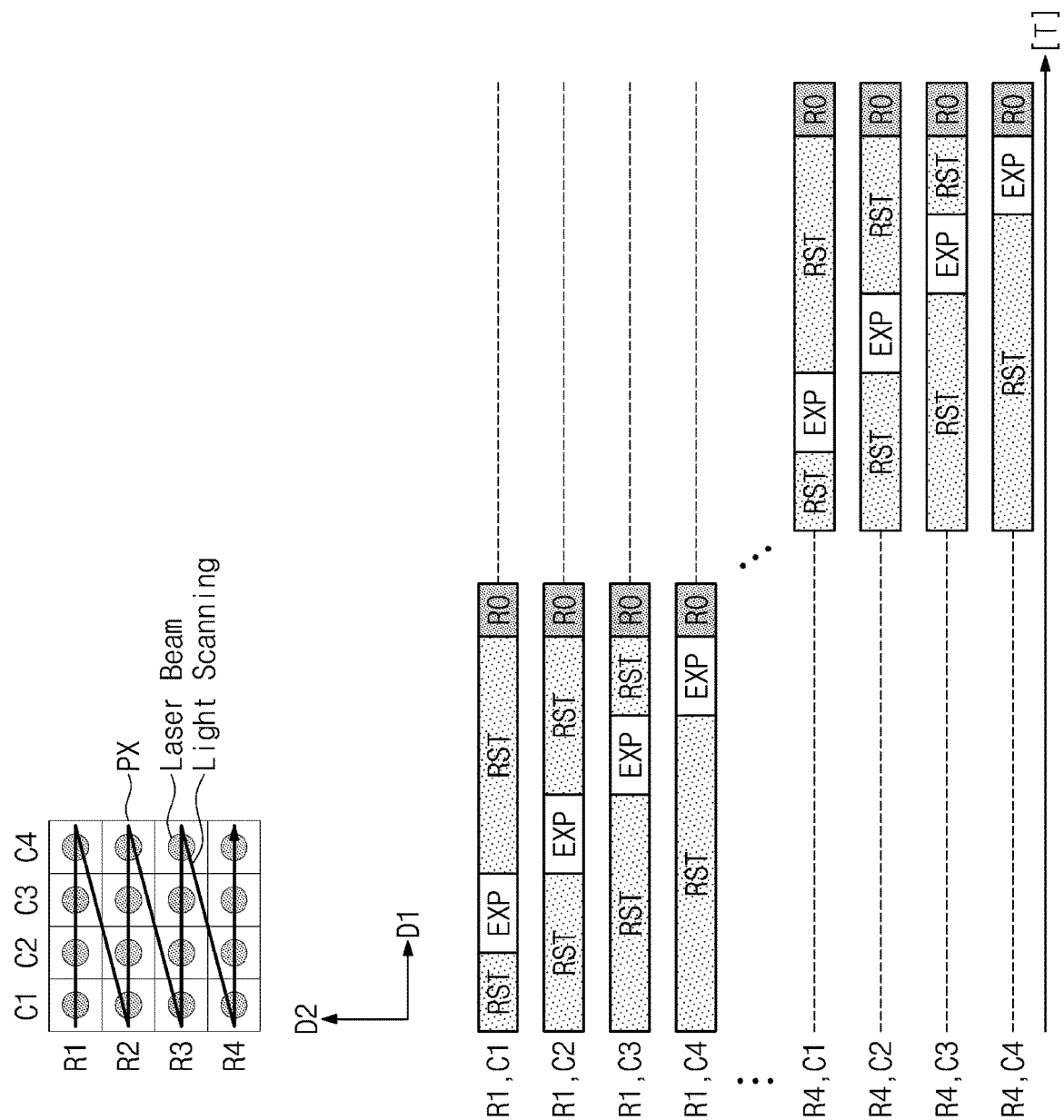
FIGS. 10A, 10B, 10C, 10D, 10E and 10F illustrate examples of two-dimensional light scanning and pixel array scanning in a row direction and a column direction, which are performed by an electronic device of FIG. 1.
Figure 10B:
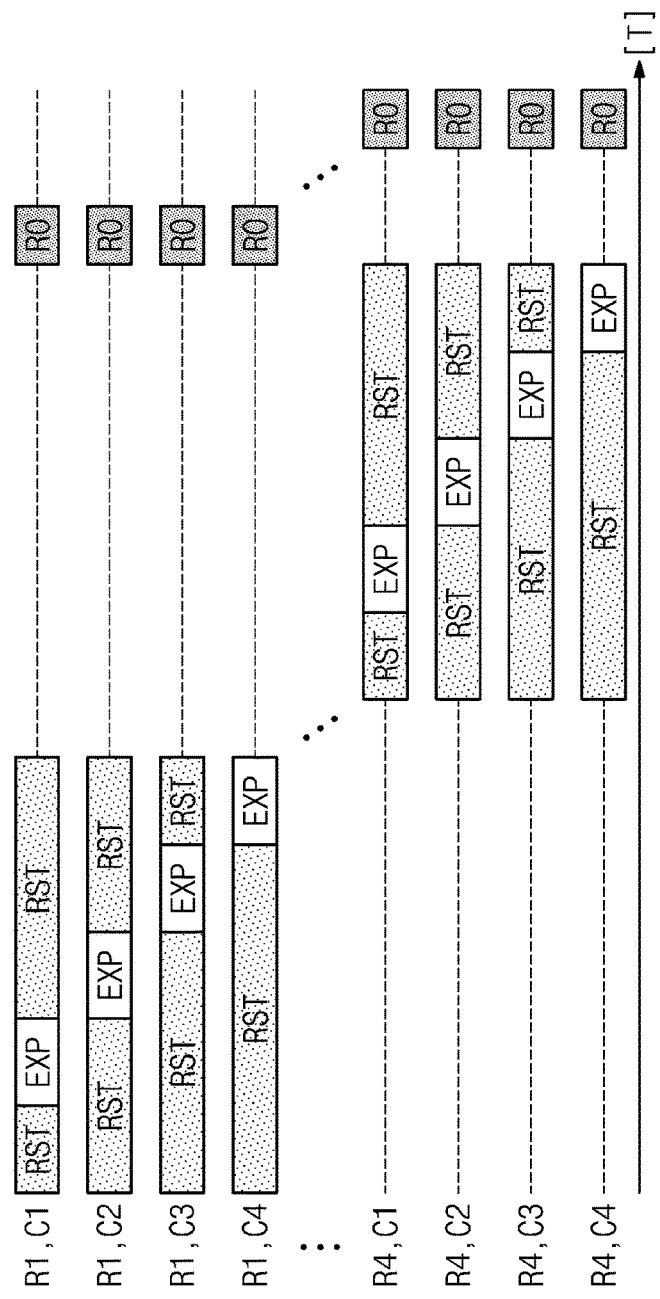
Figure 10C:
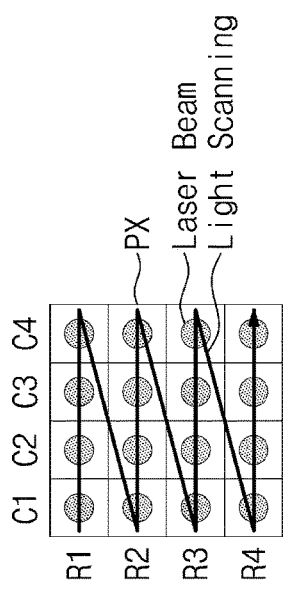
Figure 10C:
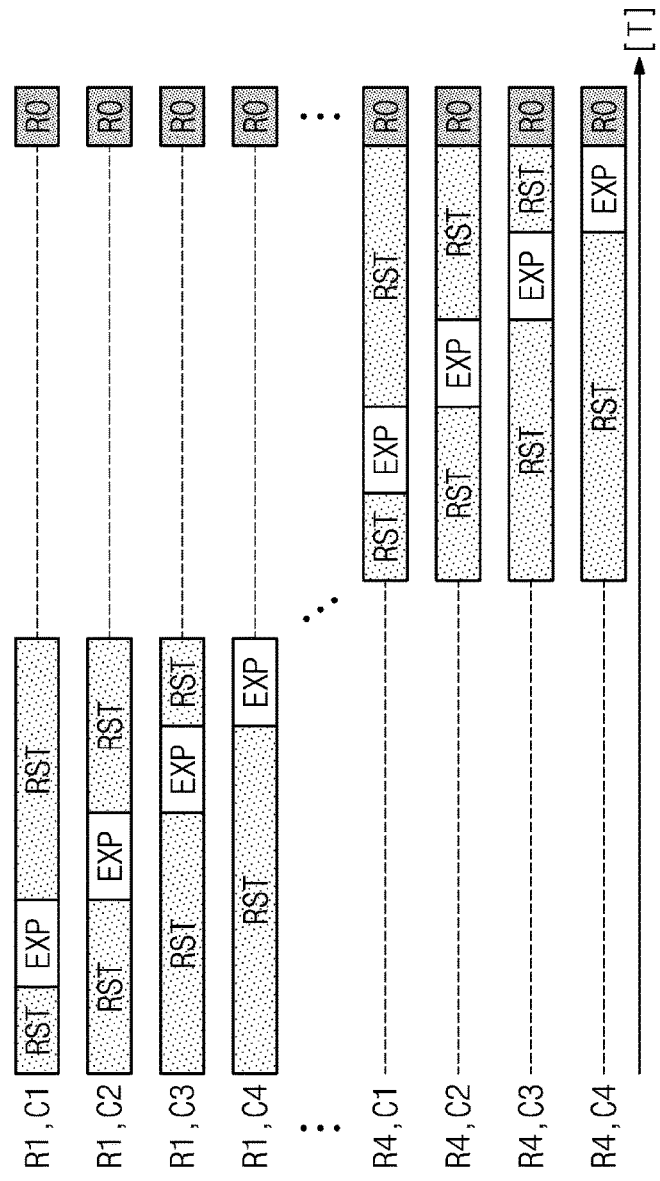
Figure 10D:
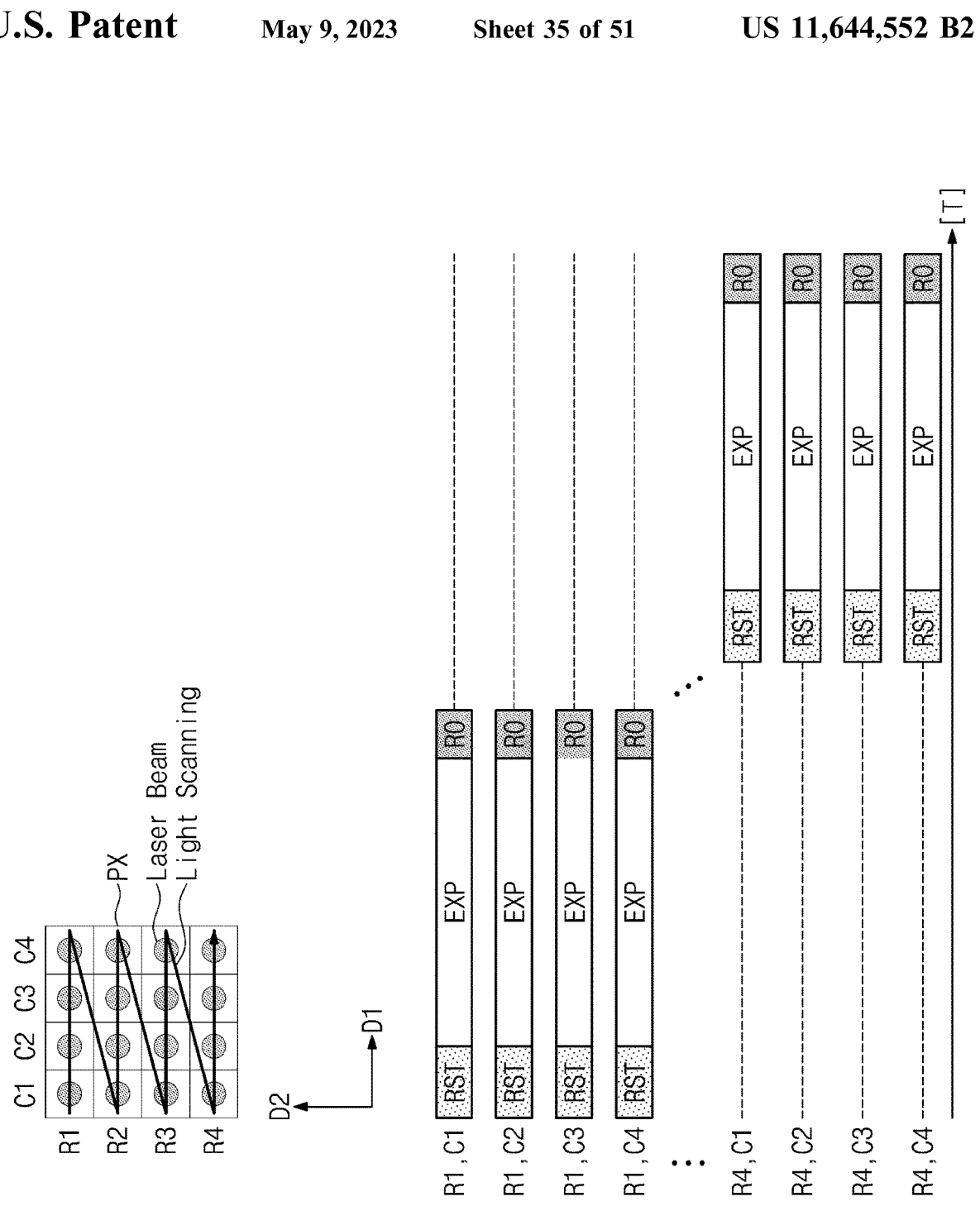
Figure 10E:
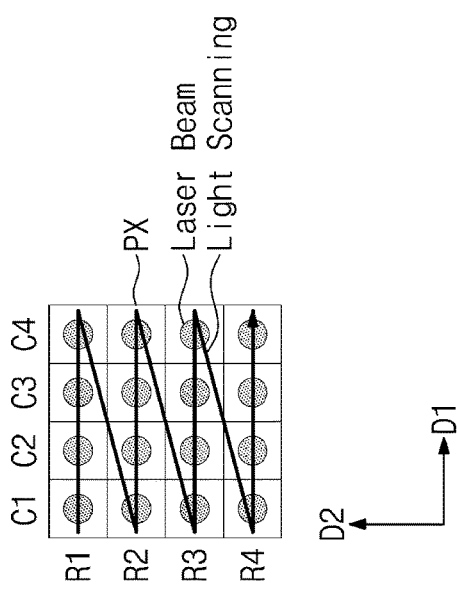
Figure 10E:
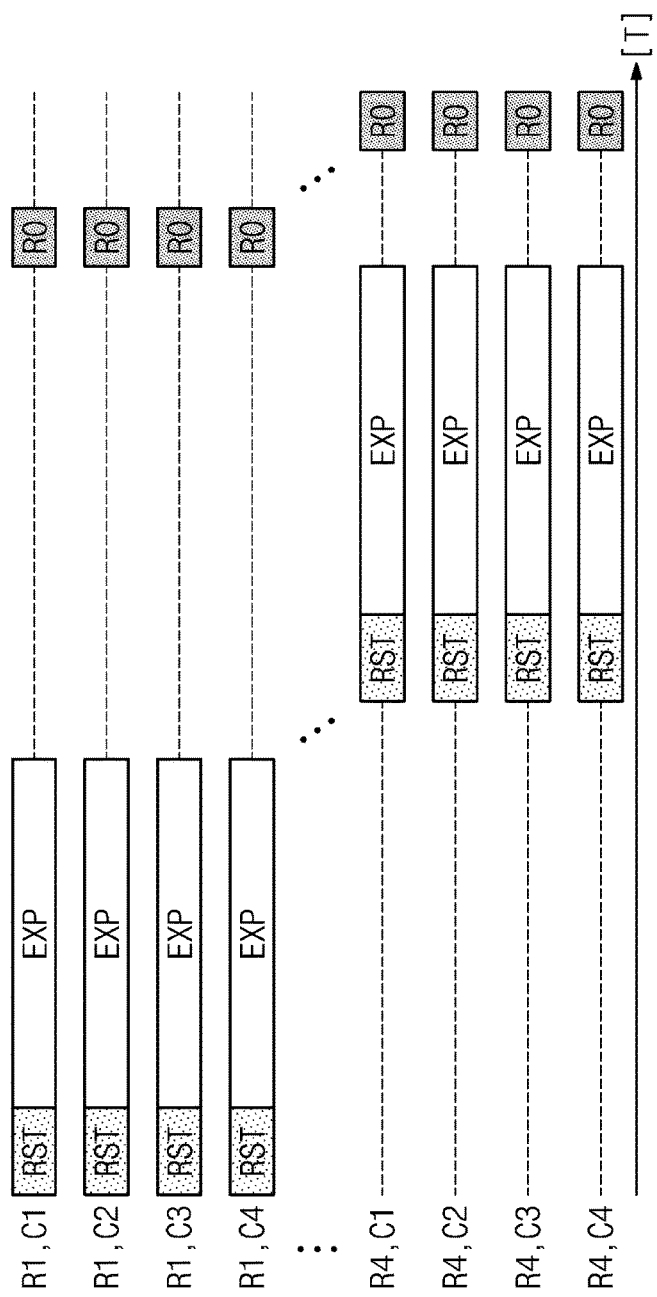
Figure 10F:
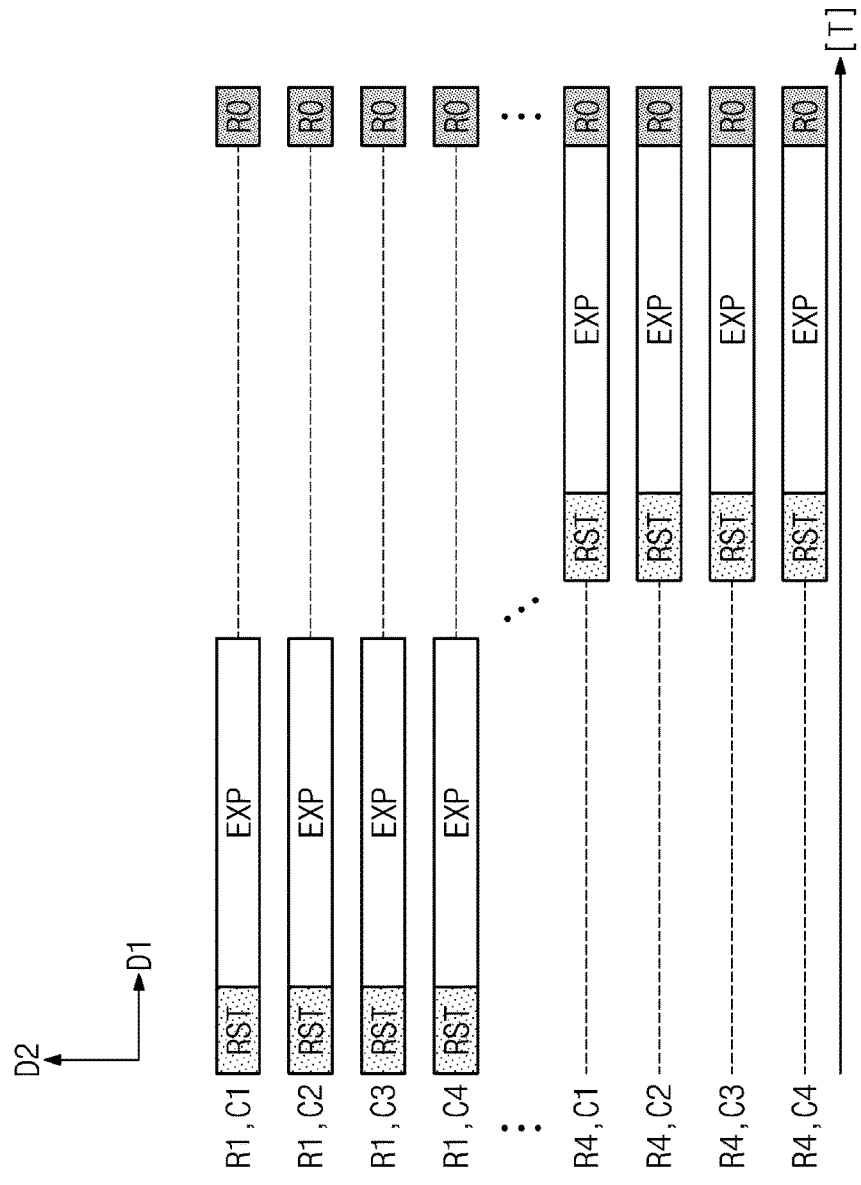

Referring to FIG. 10A, depending on a direction (i.e., a zigzag direction) of light scanning that is performed by the controller 150, the components 142 to 146 may control the pixels PX of the pixel array 141. The pixels PX at the R1-th row and the C1-th column, the R1-th row and the C2-th column, the R1-th row and the C3-th column, and the R1-th row and the C4-th column may be reset during the reset interval RST, may be sequentially exposed to laser beams to integrate charges during the exposure intervals EXP, and may output the output signals OUT1 and OUT2/OUT1 to OUT4 during the readout intervals RO. As in the pixels PX at the R1-th row and the C1-th column, the R1-th row and the C2-th column, the R1-th row and the C3-th column, and the R1-th row and the C4-th column, the remaining pixels PX may perform reset, exposure, and readout operations. Except for the light scanning direction and a direction of controlling the pixels PX, the timing diagrams of FIGS. 10A to 10F may be respectively similar to the timing diagrams of FIGS. 9A to 9F.

FIGS. 11A to 11F illustrate examples of two-dimensional light scanning and pixel array scanning in a row direction and a column direction, which are performed by an electronic device of FIG. 1. In FIGS. 9A to 10F, the size of a laser beam of the light signal RL may correspond to one pixel PX or may be smaller than the size of one pixel PX. In contrast, in FIGS. 11A to 11F, the size of a laser beam may be larger than the size of one pixel PX and may correspond to, for example, 2×2 pixels PX. The size of a laser beam is not limited to the above examples and may correspond to m×n pixels (each of m and n being an integer of 1 or more). Except for the size of a laser beam, as in FIGS. 9A to 9F, the controller 150 may control the light source 110 and the optical device 120 to perform light scanning in two dimensions of the row direction D1 and the column direction D2. Laser beams may be sequentially incident onto the pixels PX at the R1-th and R2-th rows and the C1-th and C2-th columns, the R1-th and R2-th rows and the C3-th and C4-th columns, the R1-th and R2-th rows and the C5-th and C6-th columns, and the R1-th and R2-th rows and the C7-th and C8-th columns, and laser beams may then be sequentially incident onto the pixels PX at the R3-th and R4-th rows and the C7-th and C8-th columns, the R3-th and R4-th rows and the C5-th and C6-th columns, the R3-th and R4-th rows and the C3-th and C4-th columns, and the R3-th and R4-th rows and the C1-th and C2-th columns. As in the above description, laser beams may be sequentially incident onto the remaining pixels PX. For example, the light scanning direction may be a serpentine direction.

Referring to FIG. 11A, depending on a direction (i.e., a serpentine direction) of light scanning that is performed by the controller 150, the components 142 to 146 may control the pixels PX of the pixel array 141. The pixels PX arranged at row R1 to row R2 may be reset during the reset interval RST and may be sequentially exposed to laser beams to integrate charges during the exposure intervals EXP. The pixels PX arranged at row R1 may output the output signals OUT1 and OUT2/OUT1 to OUT4 during the readout intervals RO, and then, the pixels PX arranged at row R2 may output the output signals OUT1 and OUT2/OUT1 to OUT4 during the readout intervals RO. For example, the exposure intervals EXP of the pixels PX arranged at column C1 to column C8 may not overlap each other and may be placed sequentially along the light scanning direction. As another example, unlike the example illustrated in FIG. 11A, in other embodiments the exposure intervals EXP of the pixels PX at the R1-th and R2-th rows and the C1-th and C2-th columns may overlap each other, the exposure intervals EXP of the pixels PX at the R1-th and R2-th rows and the C3-th and C4-th columns may overlap each other, the exposure intervals EXP of the pixels PX at the R1-th and R2-th rows and the C5-th and C6-th columns may overlap each other, and the exposure intervals EXP of the pixels PX at the R1-th and R2-th rows and the C7-th and C8-th columns may overlap each other. In the embodiment as shown in FIG. 11A, the exposure intervals EXP of the pixels PX at the R1-th and R2-th rows and the C1-th and C2-th columns, the exposure intervals EXP of the pixels PX at the R1-th and R2-th rows and the C3-th and C4-th columns, the exposure intervals EXP of the pixels PX at the R1-th and R2-th rows and the C5-th and C6-th columns, and the exposure intervals EXP of the pixels PX at the R1-th and R2-th rows and the C7-th and C8-th columns may not overlap each other. As in the pixels PX arranged at row R1 and row R2, the remaining pixels PX arranged at row R3 and row R4 may perform reset, exposure, and readout operations. The pixels PX arranged at row R7 to row R8 may be reset during the reset intervals RST and may be sequentially exposed to laser beams in an opposite direction to the row direction D1 to integrate charges during the exposure intervals EXP.

Figure 11B:
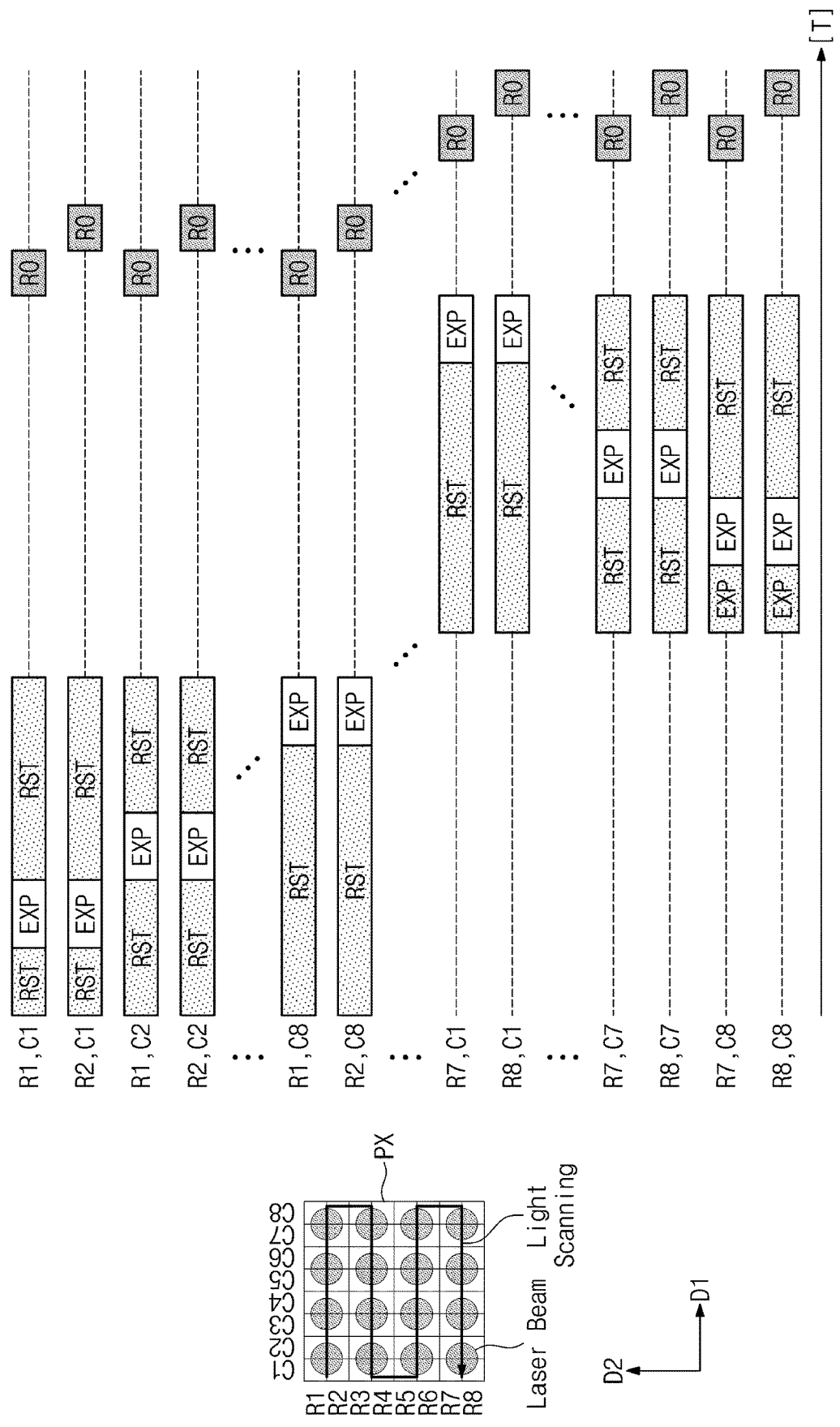

Referring to FIG. 11B, unlike the normal readout operation of FIG. 11A, in other embodiments the pixels PX of the pixel array 141 may perform the rolling readout operation. When the exposure interval of all the pixels PX of the pixel array 141 end, the readout operation of all the pixels PX of the pixel array 141 may be initiated. As in FIG. 7C, the pixels PX arranged at row R1 to row R8 may sequentially output the output signals OUT1 and OUT2/OUT1 to OUT4 during the readout intervals RO.

Figure 11C:
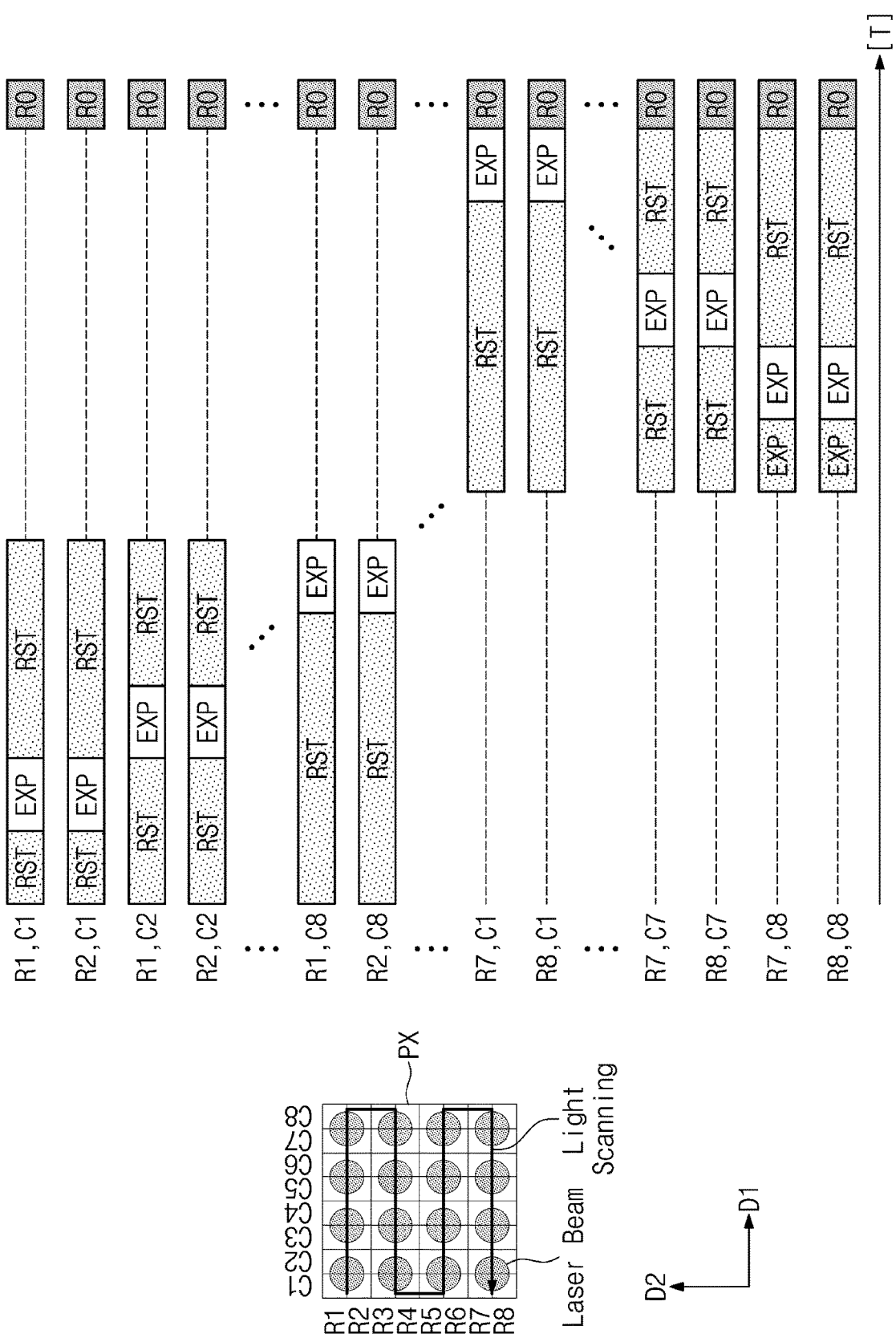

Referring to FIG. 11C, unlike FIG. 11B, in other embodiments the readout intervals RO of the pixels PX arranged at row R1 to row R8 may overlap each other. As in FIG. 7D, the pixels PX of the pixel array 141 may perform the global readout operation. The pixels PX arranged at row R1 to row R8 may simultaneously output the output signals OUT1 and OUT2/OUT1 to OUT4 during the readout intervals RO overlapping each other. As described with reference to FIGS. 9A to 9C, the ToF sensor 140a/140b may further include an overflow gate driver (not shown) that transfers the overflow gate signals OG to the pixel array 141 in direction D2, or the overflow gate driver may be integrated into the photo gate driver 143 of the ToF sensor 140b.

Figure 11D:
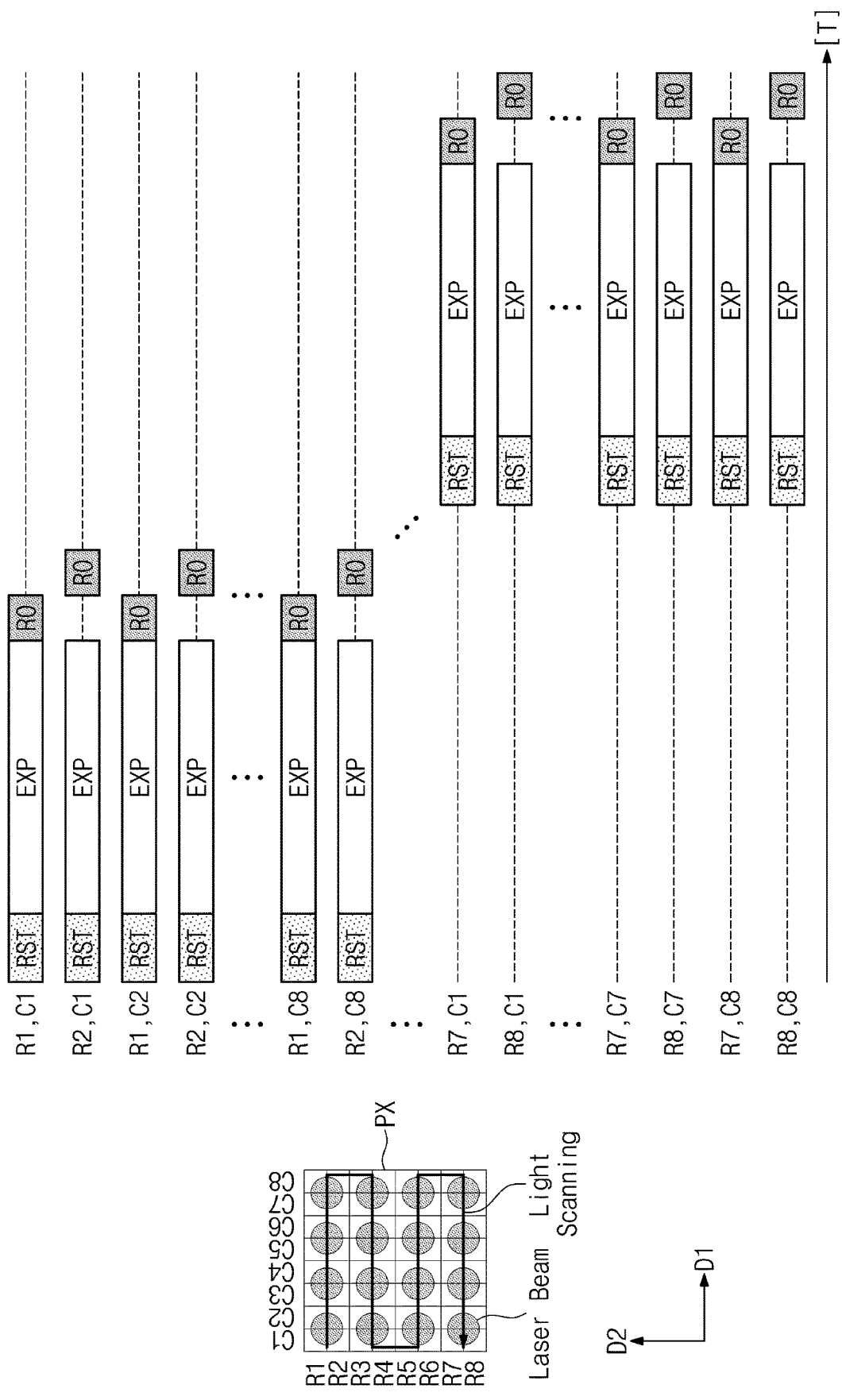
Figure 11E:
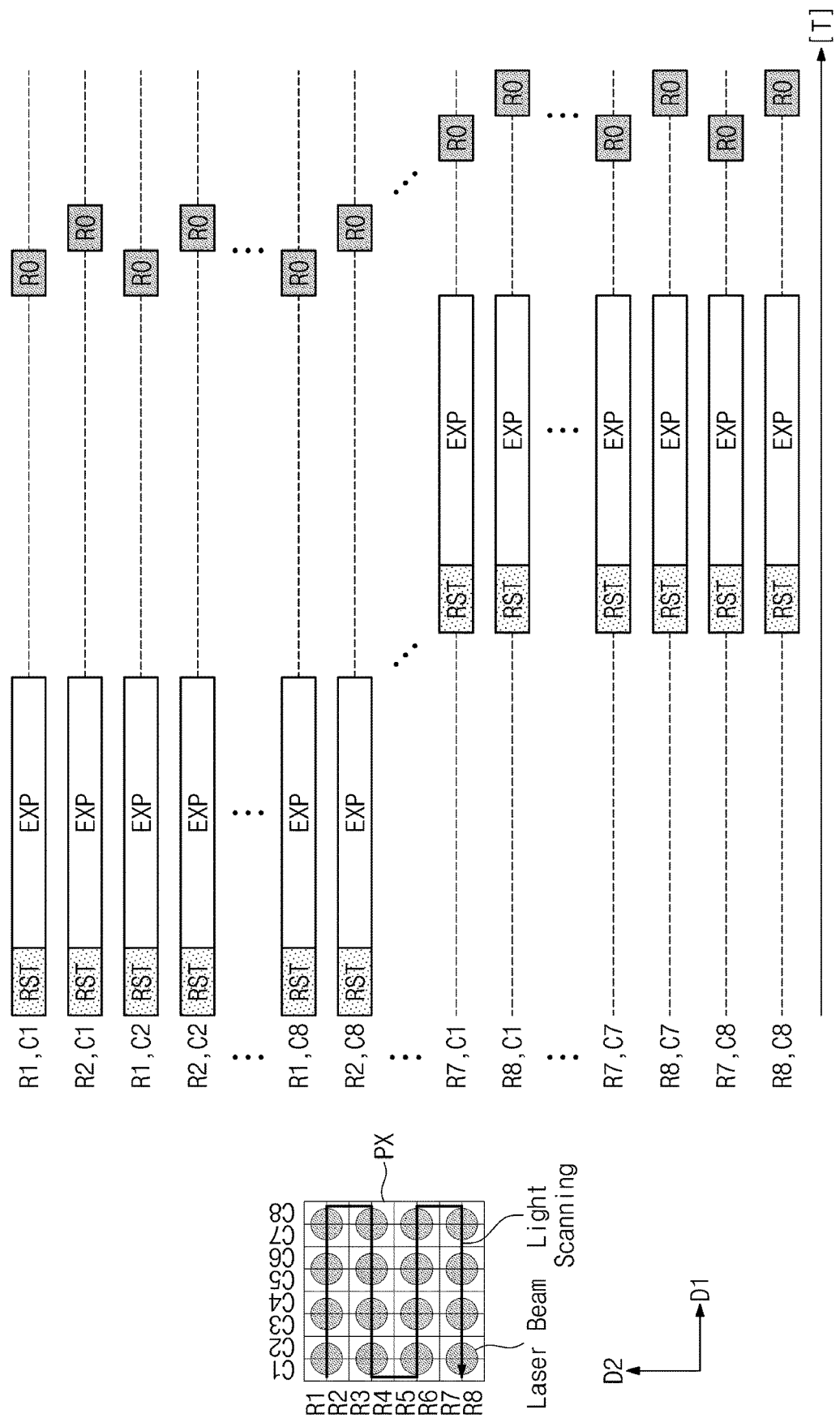
Figure 11F:
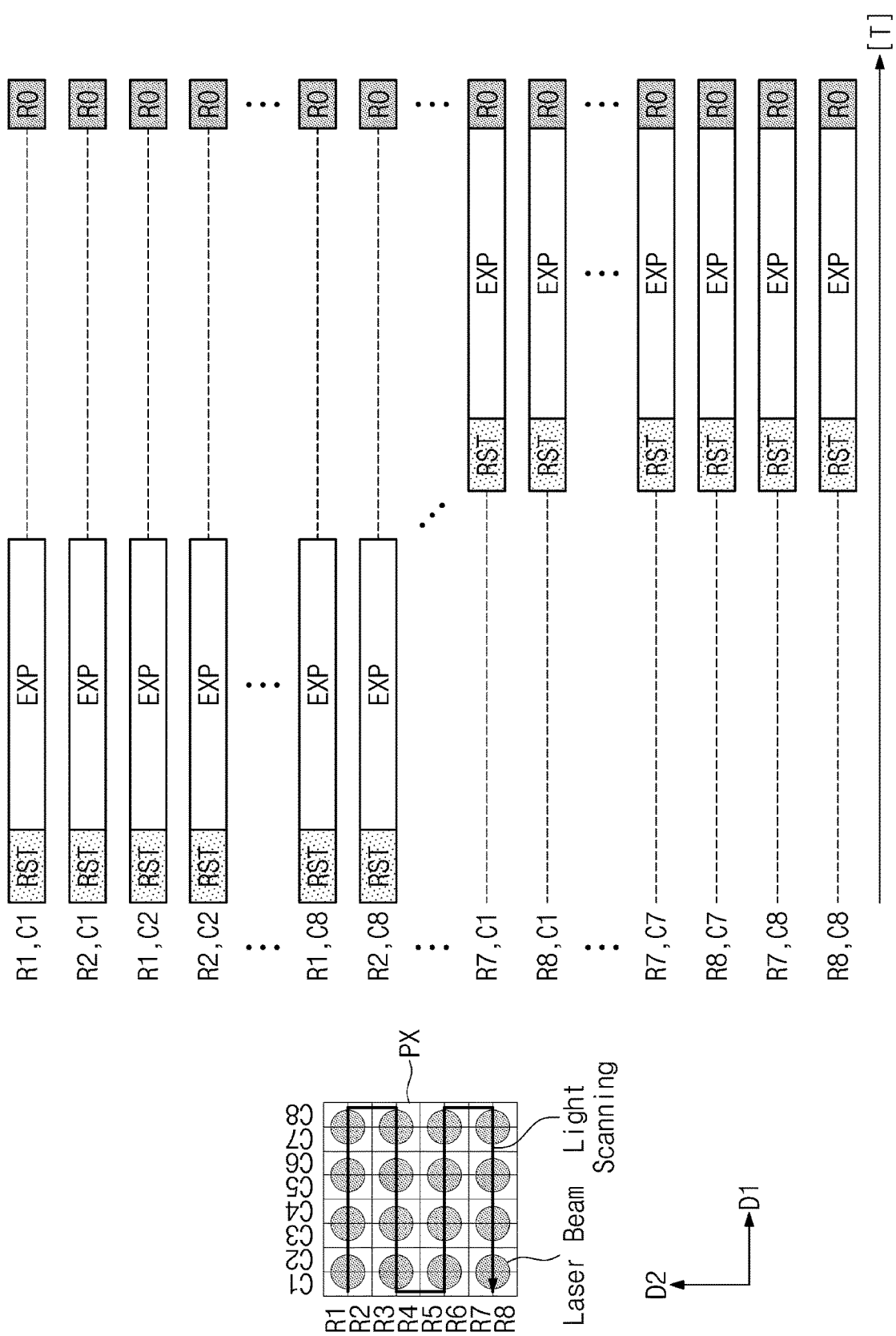

Referring to FIGS. 11D to 11F, exposure intervals of the pixels PX arranged at paired rows (e.g., (R1, R2), (R3, R4), (R5, R6), or (R7, R8)) may overlap each other. Except for the above-described difference, the timing diagrams of FIGS. 11D to 11F may be similar to the timing diagrams of FIGS. 11A to 11C, respectively. As described with reference to FIGS. 9D to 9F, the photo gate driver 142 of the ToF sensor 140a/140b may transfer the overflow gate signals OG to the pixels PX in the row direction R1.

FIGS. 12A to 12F illustrate examples of two-dimensional light scanning and pixel array scanning in a row direction and a column direction, which are performed by an electronic device of FIG. 1. In FIGS. 12A to 12F, the size of a laser beam may be larger than the size of one pixel PX and may correspond to, for example, 2×2 pixels PX. Except for the size of a laser beam, as in FIGS. 10A to 11F, the controller 150 may control the light source 110 and the optical device 120 to perform light scanning in two dimensions of the row direction D1 and the column direction D2. Laser beams may be sequentially incident onto the pixels PX at the R1-th and R2-th rows and the C1-th and C2-th columns, the R1-th and R2-th rows and the C3-th and C4-th columns, the R1-th and R2-th rows and the C5-th and C6-th columns, and the R1-th and R2-th rows and the C7-th and C8-th columns, and laser beams may then be sequentially incident onto the pixels PX at the R3-th and R4-th rows and the C1-th and C2-th columns, the R3-th and R4-th rows and the C3-th and C4-th columns, the R3-th and R4-th rows and the C5-th and C6-th columns, and the R3-th and R4-th rows and the C7-th and C8-th columns. As in the above description, laser beams may be sequentially incident onto the remaining pixels PX. For example, the light scanning direction may be a zigzag direction, not the serpentine direction described with reference to FIGS. 11A to 11F.

Figure 12A:
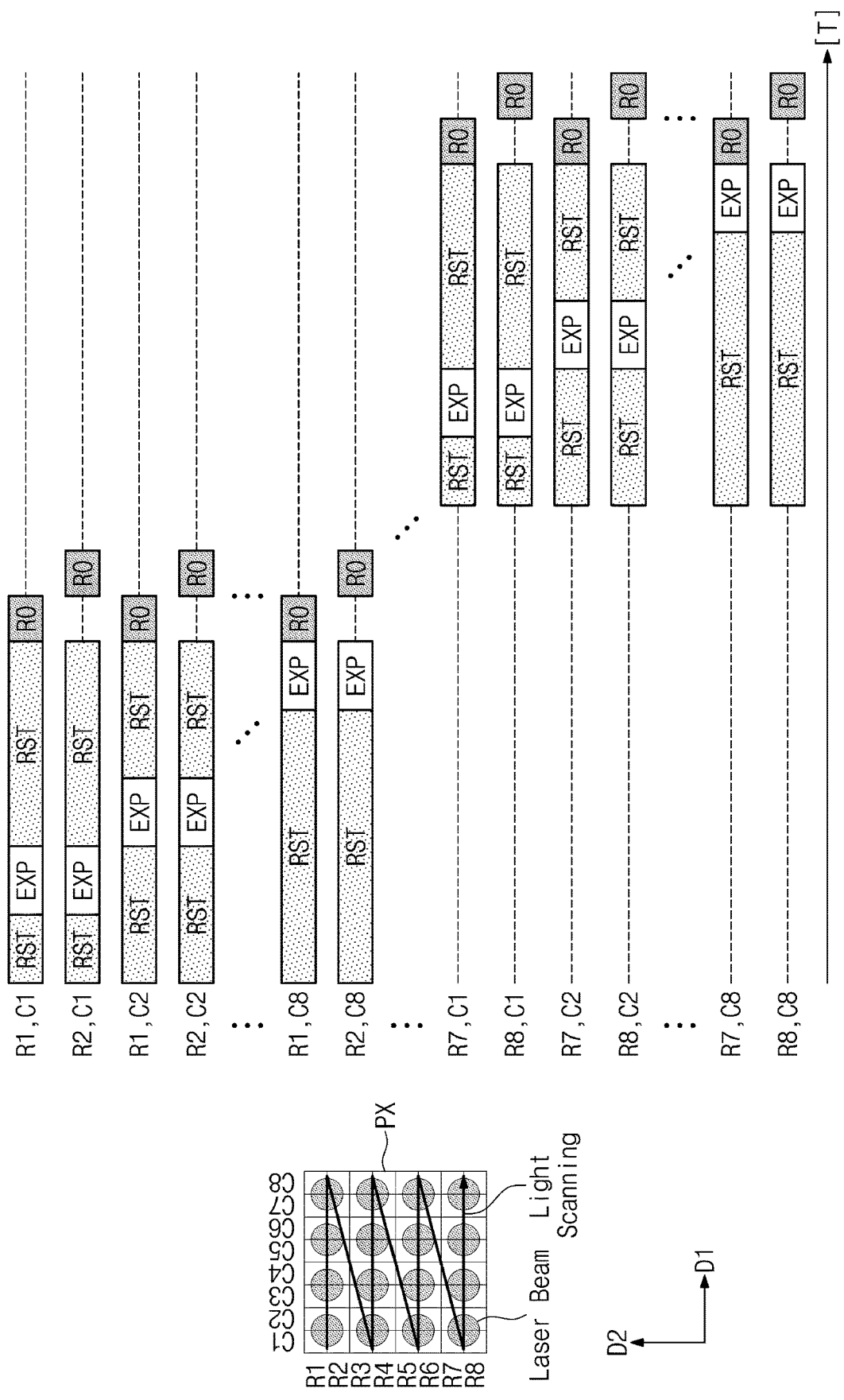
FIGS. 12A, 12B, 12C, 12D, 12E and 12F illustrate examples of two-dimensional light scanning and pixel array scanning in a row direction and a column direction, which are performed by an electronic device of FIG. 1.
Figure 12B:
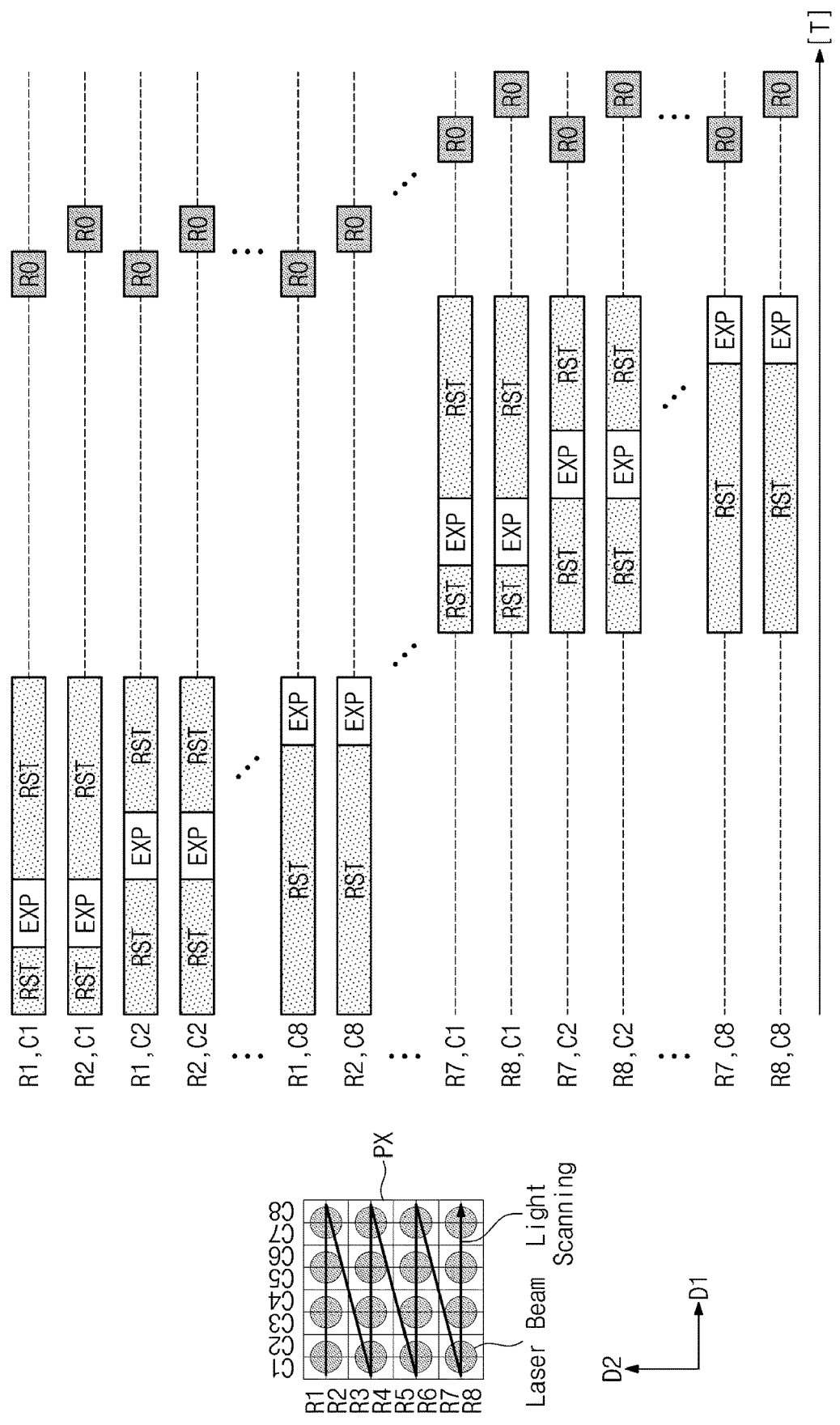
Figure 12C:
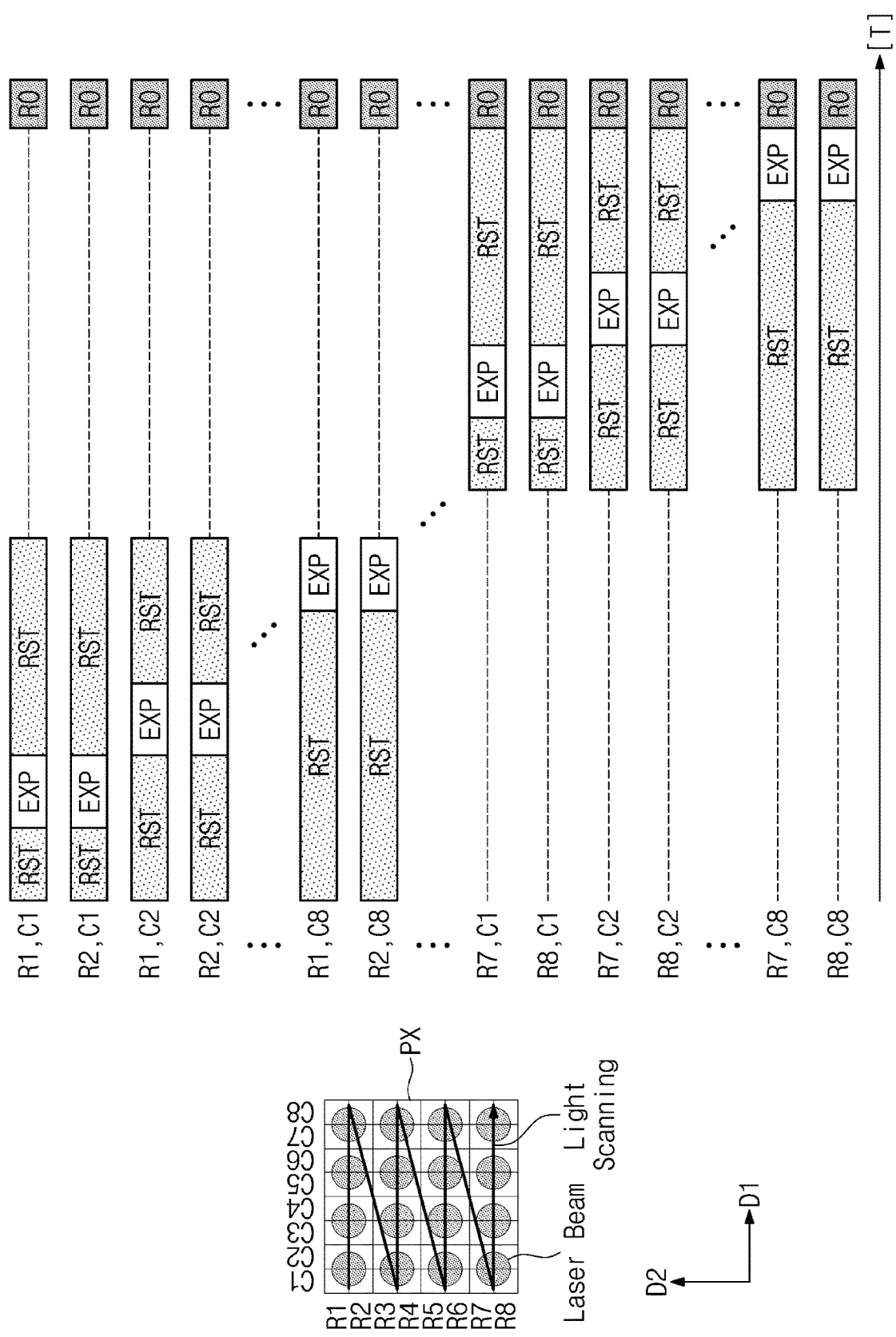
Figure 12D:
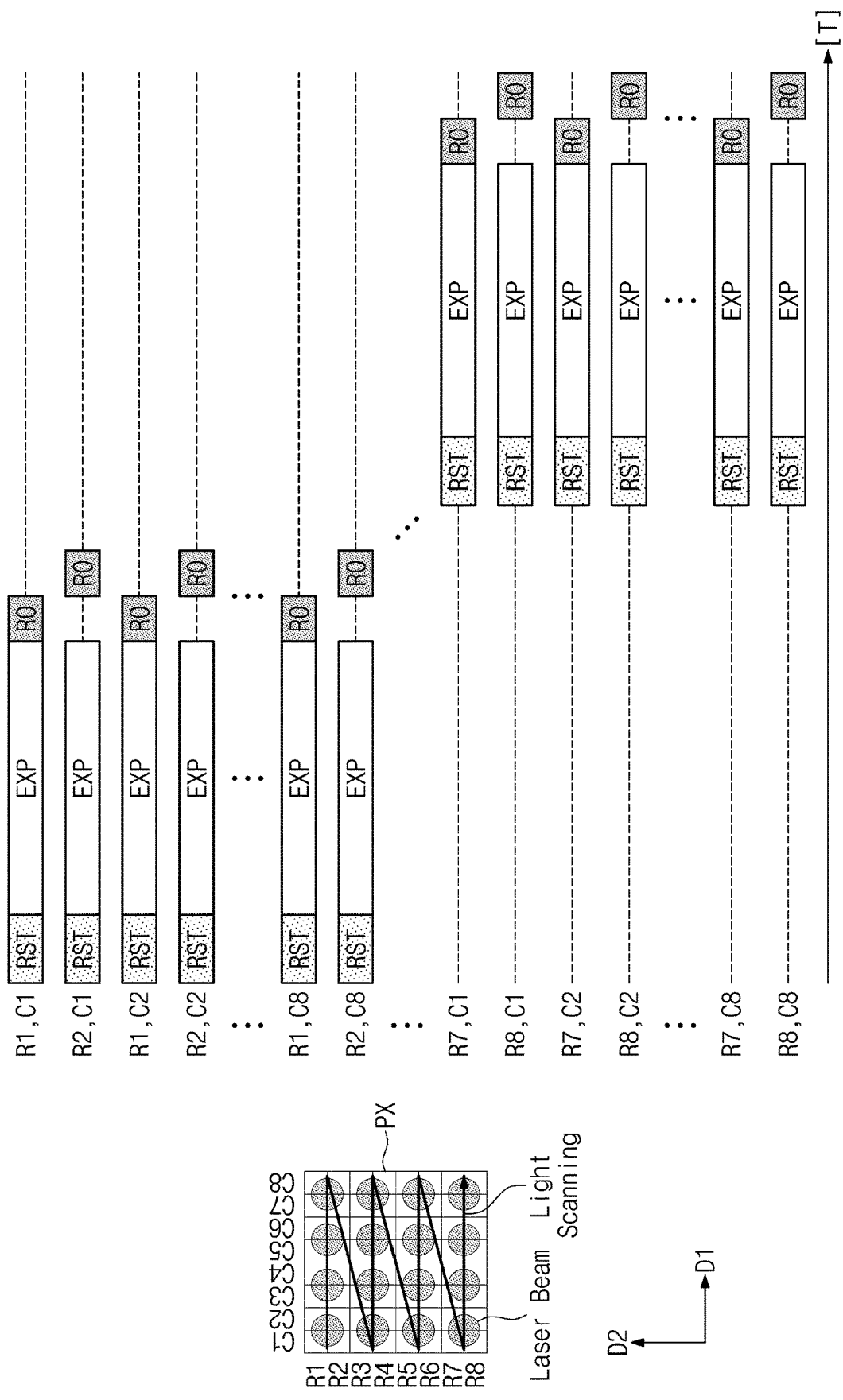
Figure 12E:
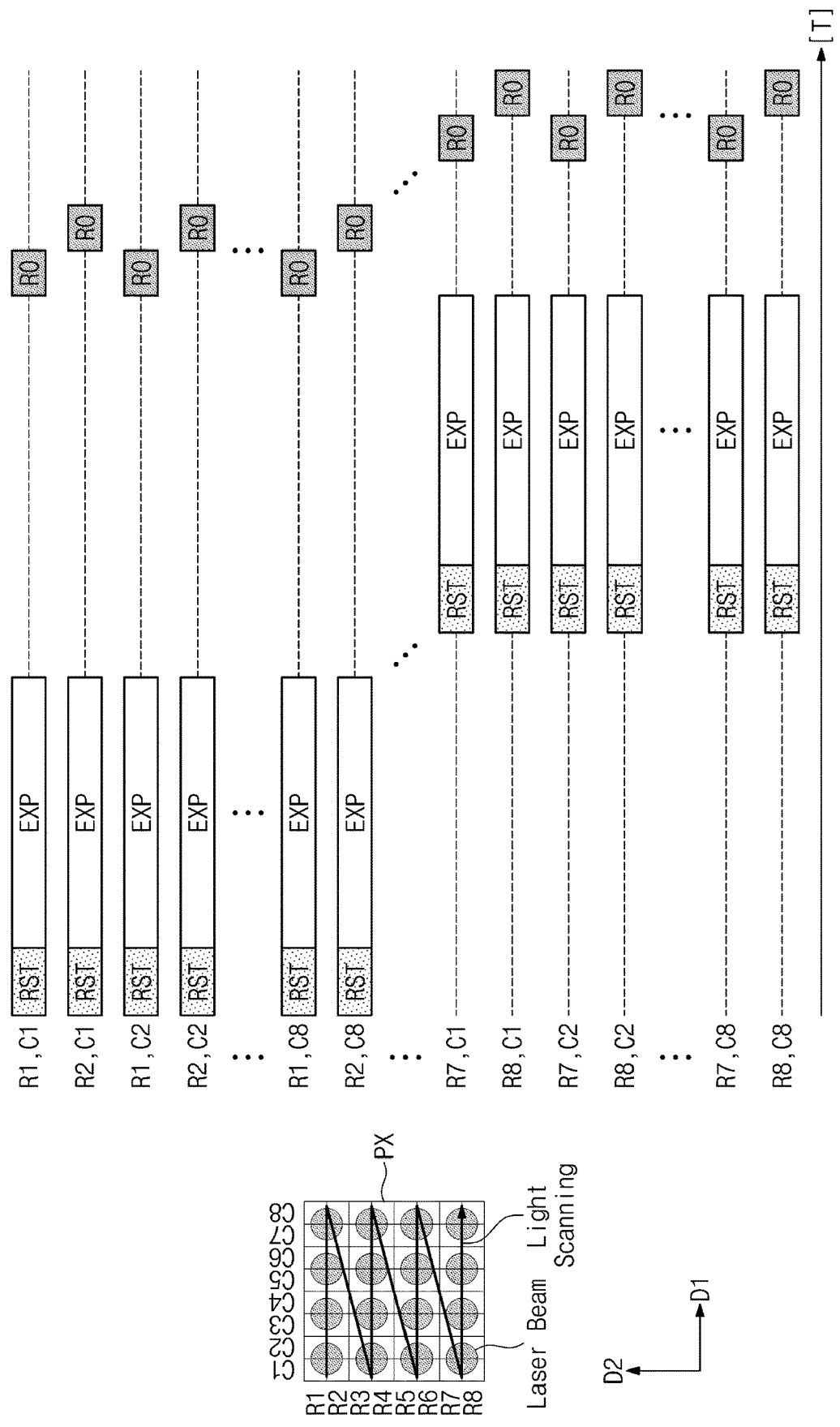
Figure 12F:
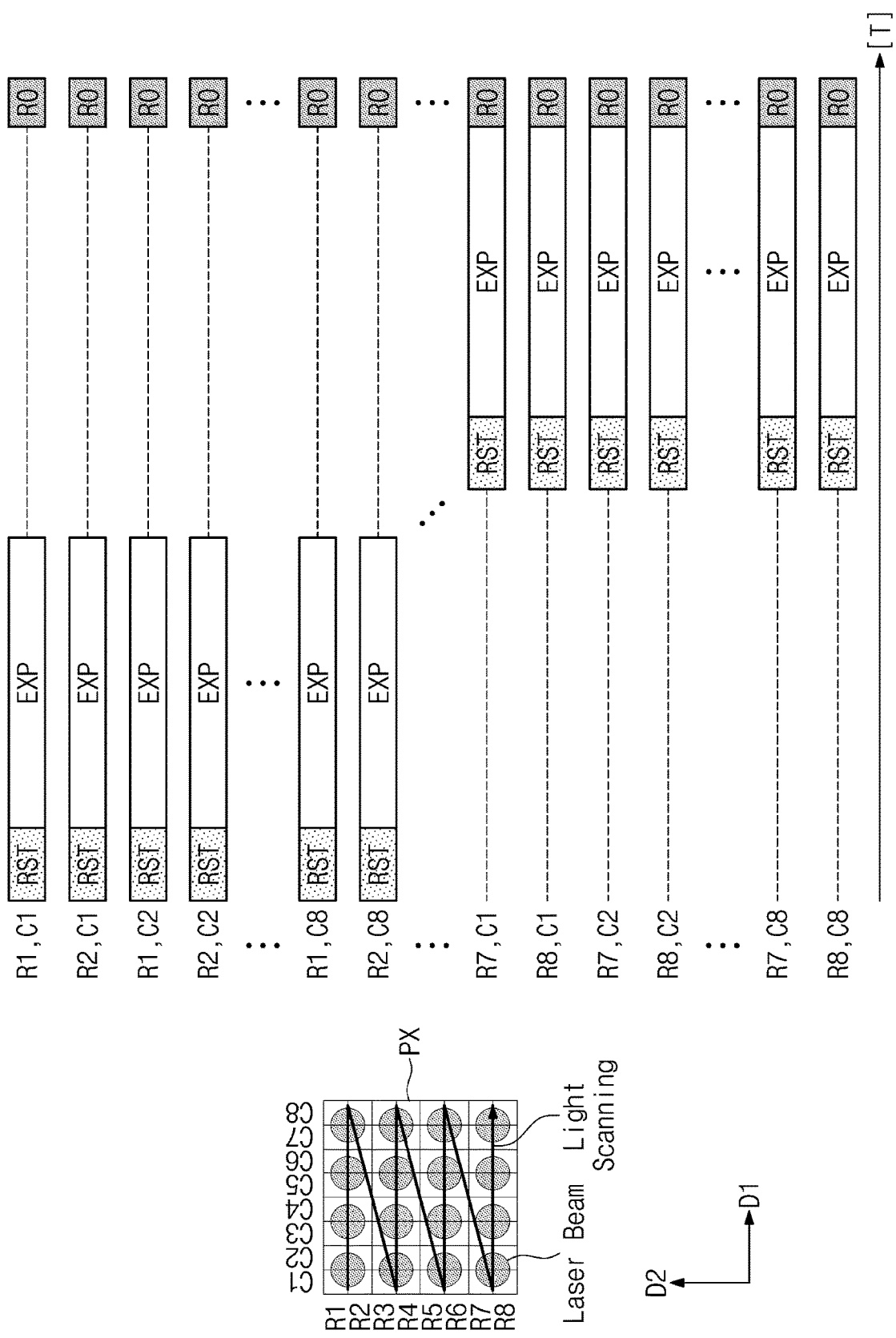

Referring to FIG. 12A, depending on a direction (i.e., a zigzag direction) of light scanning that is performed by the controller 150, the components 142 to 146 may control the pixels PX of the pixel array 141. The pixels PX arranged at row R1 to row R2 may be reset during the reset interval RST and may be sequentially exposed to laser beams to integrate charges during the exposure intervals EXP. The pixels PX arranged at row R1 may output the output signals OUT1 and OUT2/OUT1 to OUT4 during the readout intervals RO, and then, the pixels PX arranged at row R2 may output the output signals OUT1 and OUT2/OUT1 to OUT4 during the readout intervals RO. As in the pixels PX arranged at row R1 and row R2, the remaining pixels PX may perform reset, exposure, and readout operations. Except for the light scanning direction and a direction of controlling the pixels PX, the timing diagrams of FIGS. 12A to 12F may be similar to the respective timing diagrams of FIGS. 11A to 11F.

The operations of the pixel PX in the reset interval RST, the exposure interval EXP, and the readout interval RO illustrated in the timing diagrams of FIGS. 7A to 12F are described with reference to FIGS. 5A to 6B. In the timing diagrams of FIGS. 7A to 12F, during an interval corresponding to a dotted line, the overflow transistor OF of the corresponding pixel PX may be turned on by the activated overflow gate signal OF and may remove charges integrated by the photo transistors PA and PB.

Figure 13:
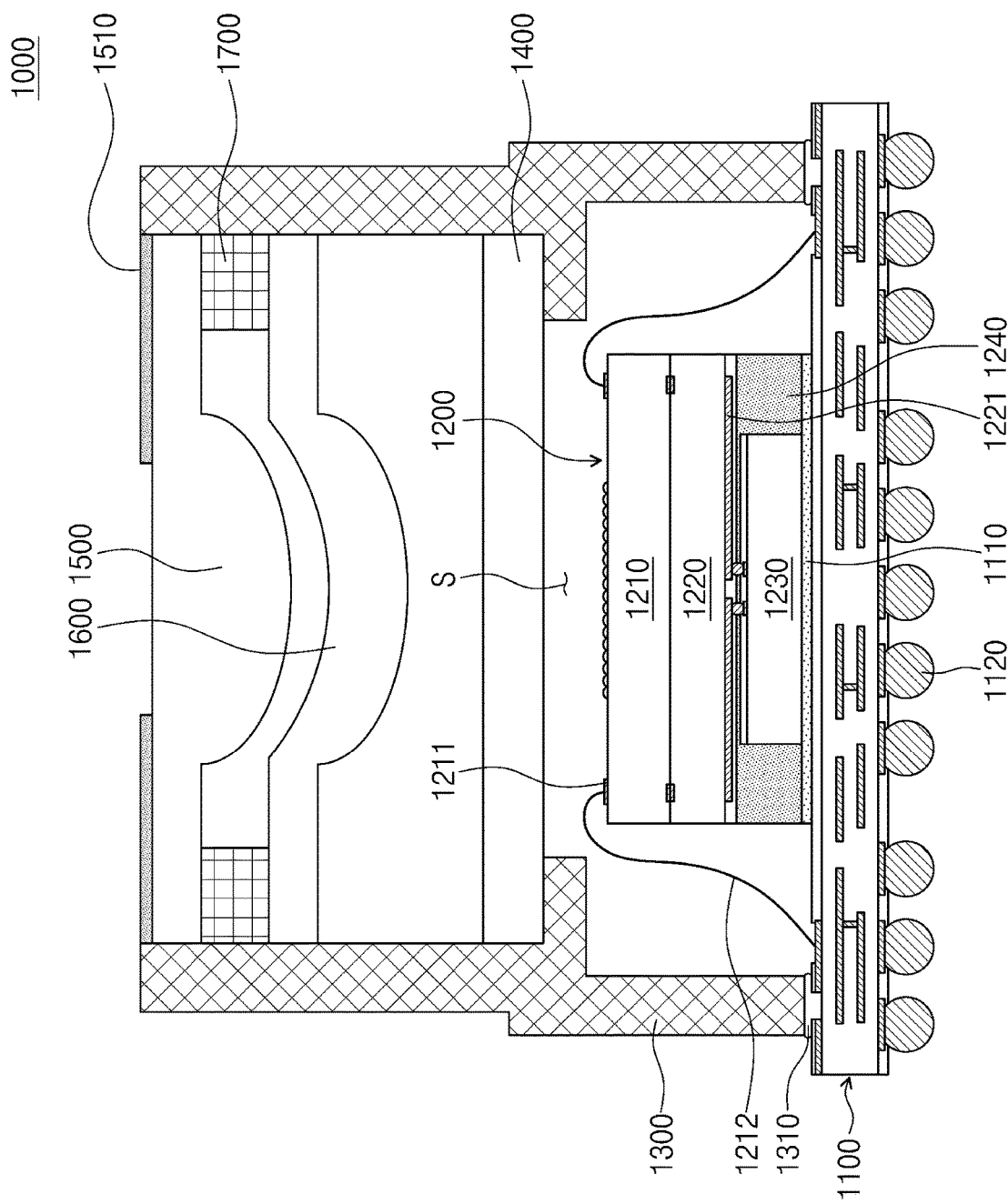
FIG. 13 illustrates a cross-sectional view of a semiconductor package module according to an embodiment of the inventive concepts.

FIG. 13 illustrates a cross-sectional view of a semiconductor package module according to an embodiment of the inventive concepts. In a semiconductor package module 1000, a semiconductor package 1200 may be attached to a package substrate 1100 by an adhesive layer 1110. The semiconductor package 1200 may include a semiconductor chip 1210, a semiconductor chip 1220 mounted under the semiconductor chip 1210, and a semiconductor chip 1230 mounted under the semiconductor chip 1220. The semiconductor chips 1210, 1220, and 1230 may have different functions. The semiconductor chip 1210 and the semiconductor chip 1220 may have the same width. Side walls of the semiconductor chip 1210 and the semiconductor chip 1220 may be vertically aligned. The semiconductor chip 1210 and the semiconductor chip 1220 may contact each other. A rerouting pattern 1221 may be disposed under the semiconductor chip 1220. For example, the semiconductor chip 1210 may be a ToF sensor including the ToF sensor 140 described with reference to FIGS. 1 to 12F. Also for example, the semiconductor chip 1220 may be a logic chip for driving the semiconductor chip 1210. As another example, the semiconductor chip 1210 may include the pixel array 141 of the ToF sensor 140 described with reference to FIGS. 1 to 12F, and the semiconductor chip 1220 may include the remaining components 142 to 146 of the ToF sensor 140. For example, the semiconductor package module 1000 with the semiconductor chips 1210 and 1220 configured to include the ToF sensor may be disposed as part of the electronic device 100 shown in FIG. 1.

With further reference to FIG. 13, a width of the semiconductor chip 1230 may be smaller than a width of the semiconductor chip 1220. A side wall of the semiconductor chip 1230 may not be vertically aligned with a side wall of the semiconductor chip 1220. For example, the semiconductor chip 1230 may be a memory chip for storing data generated from the semiconductor chip 1210 and/or the semiconductor chip 1220. A side wall of the semiconductor chip 1230 may be covered with a molding layer 1240. The logic chip may be bonded to the ToF sensor, and the memory chip may be bonded to the logic chip in a flip-chip bonding scheme. This may provide a fast readout function compared to the case where the memory chip is distant from the ToF sensor. In the case where the memory chip is a dynamic random access memory (DRAM), positions and sizes of input/output terminals may be standardized to reduce costs through the mass production. In this case, the sizes of the logic chip and the DRAM chip may be different, and positions of the input/output terminals may be misaligned. The semiconductor chip 1220 capable of being a logic chip may include the rerouting pattern 1221, thus increasing the freedom of wires for connecting the semiconductor chip 1220 and the semiconductor chip 1230. An upper conductive pad 1211 of the semiconductor chip 1210 and the package substrate 1100 may be connected with a wire 1212.

A holder 1300 as shown in FIG. 13 may be disposed on the package substrate 1100. The holder 1300 may be spaced from the semiconductor package 1200. The holder 1300 may be attached to the package substrate 1100 by using an adhesive layer 1310. The holder 1300 may be in the shape of a closed curve in a plan view. The holder 1300 may be adjacent to and surround an edge of the semiconductor package 1200 and may have a hollow structure. The holder 1300 may be formed of a polymer material such as polyamide. A transparent substrate 1400 may be disposed on the holder 1300. The transparent substrate 1400 may be formed of transparent glass or plastic. The transparent substrate 1400 may be spaced from the semiconductor package 1200 and may provide an empty space "S". A solder bump 1120 may be attached to a lower surface of the package substrate 1100. A plurality of lenses 1500 and 1600 corresponding to the lens part 130, a spacer 1700, and a light shielding layer 1510 may be attached to the holder 1300 to be disposed on the transparent substrate 1400 over the semiconductor package 1200.

Figure 14:
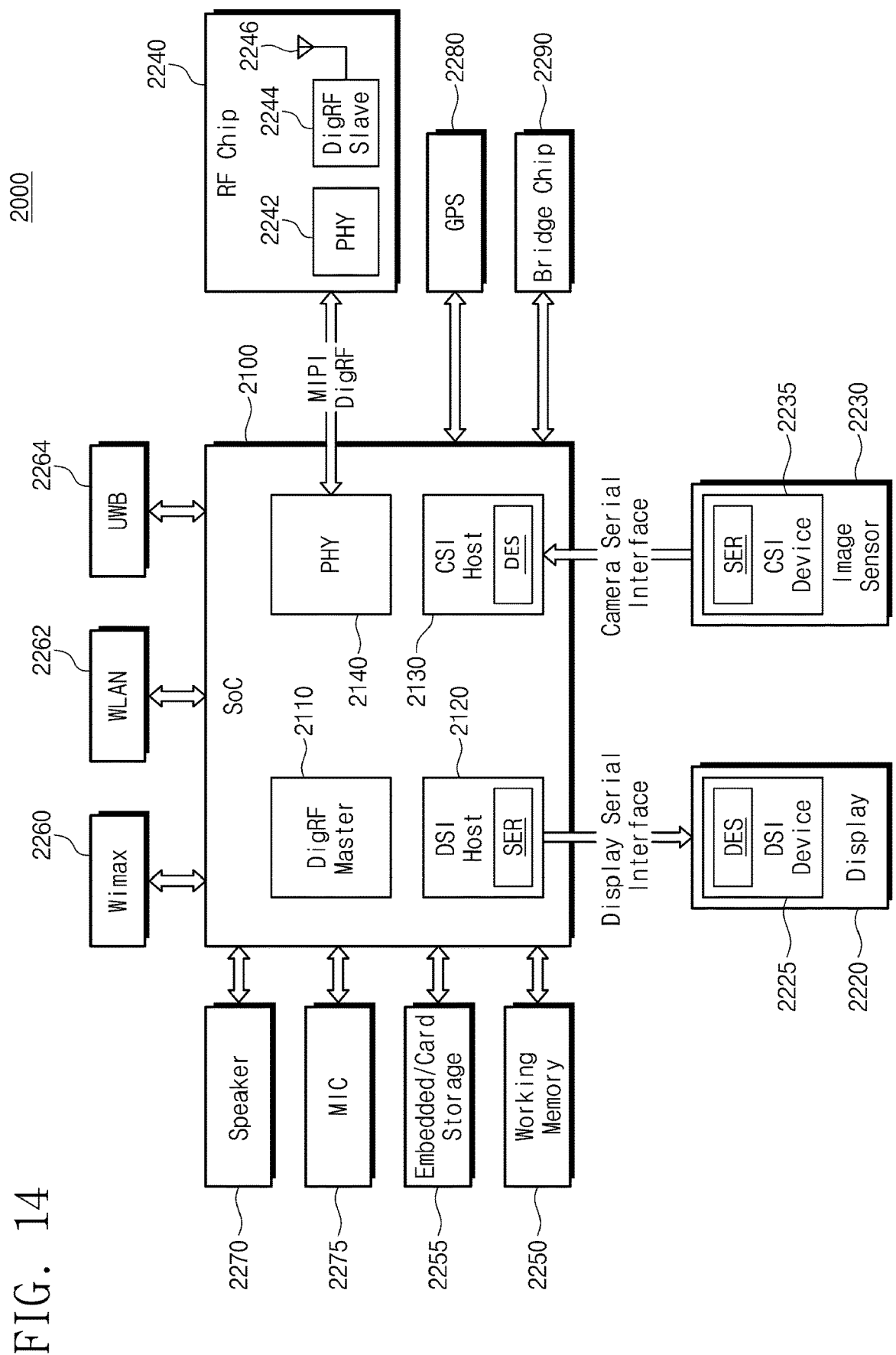
FIG. 14 illustrates an application example of an electronic device of FIG. 1.

FIG. 14 illustrates an application example of an electronic device of FIG. 1. The electronic circuit 100 of FIG. 1 may be implemented with an electronic device 2000 of FIG. 14 or may be applied thereto. The electronic device 2000 may be referred to as a "computing system", a "memory system", an "electronic system", or a "communication system". For example, the electronic device 2000 may be a desktop computer, a laptop computer, a tablet computer, a mobile device, a smartphone, a personal digital assistant (PDA), a portable multimedia player (PMP), a wearable device, a video game console, a workstation, a server, a data processing device capable of using or supporting an interface protocol proposed by the mobile industry processor interface (MIPI®) alliance, home appliances, a black box, a drone, etc.

As shown in FIG. 14, the electronic device 2000 may include a system on chip 2100, a display 2220, and an image sensor 2230. The system on chip 2100 may further include a DigRF$^{SM}$ master 2110, a display serial interface (DSI) host 2120, a camera serial interface (CSI) host 2130, and a physical layer 2140. The DSI host 2120 may communicate with a DSI device 2225 of the display 2220 through the DSI. For example, a serializer SER may be implemented in the DSI host 2120, and a deserializer DES may be implemented in the DSI device 2225. The CSI host 2130 may communicate with a CSI device 2235 of the image sensor 2230 through a CSI. For example, a deserializer DES may be implemented in the CSI host 2130, and a serializer SER may be implemented in the CSI device 2235. The image sensor 2230 may be the ToF sensor 140 described with reference to FIGS. 1 to 12F or the semiconductor package module 1000.

The electronic device 2000 may further include a radio frequency (RF) chip 2240 that communicates with the system on chip 2100. The RF chip 2240 may include a physical layer 2242, a DigRF$^{SM}$ slave 2244, and an antenna 2246. For example, the physical layer 2242 and the physical layer 2140 may exchange data with each other through a DigRF$^{SM}$ interface proposed by the MIPI® alliance. The electronic device 2000 may further include a working memory 2250 and an embedded/card storage device 2255. The working memory 2250 and the embedded/card storage 2255 may store and output data associated with the system on chip 2100. The embedded storage device 2255 may be embedded in the electronic device 2000, and the card storage device 2255 that is a removable device may be mounted on the electronic device 2000. The electronic device 2000 may communicate with an external device/system through a communication module, such as a worldwide interoperability for microwave access (WiMAX) 2260, a wireless local area network (WLAN) 2262, or an ultra-wideband (UWB) 2264. The electronic device 2000 may further include a speaker 2270, a microphone (mic) 2275, a global positioning system (GPS) device 2280, and a bridge chip 2290.

An electronic device according to embodiments of the inventive concepts may sense a relatively distant object with (using) limited power through an object scanning operation using a light source and an optical device and a demodulation operation of a ToF sensor based on a scanning direction, and may also remove a shading phenomenon according to positions of pixels through the object scanning operation and the demodulation operation.

While the inventive concepts have been described with reference to exemplary embodiments thereof, it should be apparent to those of ordinary skill in the art that various changes and modifications may be made thereto without departing from the spirit and scope of the inventive concepts as set forth in the following claims.

What is claimed is:

1. An electronic device comprising:
a time of flight (ToF) sensor including a pixel array;
a light source configured to emit light signals; and
an optical device configured to project the light signals to areas of an object, the areas respectively correspond to a plurality of pixel blocks including pixels of the pixel array,
wherein each of the pixels comprises
a plurality of taps each including a photo transistor, a first transfer transistor connected with the photo transistor, a storage element connected with the first transfer transistor, a second transfer transistor connected with the storage element, a floating diffusion area connected with the second transfer transistor, and a readout circuit connected with the floating diffusion area, and
an overflow transistor disposed adjacent to the photo transistor and connected with a power supply voltage, the overflow transistor configured to remove charges from the photo transistor.

2. The electronic device of claim 1, further comprising a driver configured to transfer a photo gate signal synchronized with the light signals to the photo transistor in a direction from among a first direction that is an arrangement direction of the pixels and a second direction different from the first direction.

3. The electronic device of claim 2, wherein the direction in which the photo gate signal is transferred corresponds to a direction in which the light signals reflected from the object are sequentially incident onto the pixel array.

4. The electronic device of claim 2, wherein the optical device is configured to control projection directions of the light signals to perform one-dimensional light scanning of the object.

5. The electronic device of claim 2, wherein the plurality of pixel blocks comprise:
a first pixel block including first pixels from among the pixels and arranged at at least one first row; and
a second pixel block including second pixels from among the pixels and arranged at at least one second row.

6. The electronic device of claim 5, further comprising a controller configured to control the first pixels to reset during a first reset interval, to integrate charges during a first exposure interval, and to output first output signals during a first readout interval, and
the controller is further configured to control the second pixels to reset during a second reset interval, to integrate charges during a second exposure interval, and to output second output signals during a second readout interval.

7. The electronic device of claim 6, wherein the first readout interval occurs between the first exposure interval and the second exposure interval, and
wherein the second readout interval occurs after the second exposure interval.

8. The electronic device of claim 6, wherein the first readout interval occurs after the second exposure interval, and
wherein the second readout interval occurs after the first readout interval.

9. The electronic device of claim 6, wherein the first readout interval and the second readout interval overlap each other timewise and occur after the second exposure interval.

10. The electronic device of claim 6, wherein the photo gate signal transferred to the photo transistor of each of the first pixels during the first exposure interval has a first frequency and the photo gate signal transferred to the photo transistor of each of the second pixels during the second exposure interval has a second frequency that is different than the first frequency.

11. The electronic device of claim 6, wherein a first time difference between when a first light signal from among the light signals is emitted to the object and the photo gate signal is transferred to the photo transistor of each of the first pixels during the first exposure interval is different from a second time difference between when a second light signal from among the light signals is emitted to the object and the photo gate signal is transferred to the photo transistor of each of the second pixels during the second exposure interval.

12. The electronic device of claim 2, wherein the plurality of pixel blocks include a first pixel block including first pixels from among the pixels and arranged at a first column,
the electronic device further comprising a controller configured to control the first pixels to reset during a first reset interval, to integrate charges during a first exposure interval, and to sequentially output first output signals during a first readout interval.

13. The electronic device of claim 1, wherein the plurality of pixel blocks comprise:
a first pixel block including first pixels from among the pixels and arranged in a first direction; and
a second pixel block including second pixels from among the pixels and arranged in the first direction,
wherein the optical device controls projection directions of the light signals to perform two-dimensional light scanning of the object, and
wherein the light signals reflected from the object are sequentially incident onto the first pixels in the first direction.

14. The electronic device of claim 13, wherein the light signals reflected from the object are sequentially incident onto the second pixels in a direction from among the first direction and a second direction opposite to the first direction.

15. The electronic device of claim 13, further comprising a driver configured to transfer an overflow gate signal to the overflow transistor in a direction from among the first direction and a second direction perpendicular to the first direction.

16. An electronic device comprising:
a time of flight (ToF) sensor including a pixel array;
a light source configured to emit a first light signal and a second light signal; and
an optical device configured to project the first light signal to a first area of an object corresponding to a first pixel block of the pixel array and to project the second light signal to a second area of the object corresponding to a second pixel block of the pixel array,
wherein pixels of the first pixel block are arranged in a first direction, pixels of the second pixel block are arranged in the first direction, and the first and second pixel blocks are arranged in a second direction, and
wherein each of the pixels comprises
a plurality of taps each including a photo transistor, a first transfer transistor connected with the photo transistor, a storage element connected with the first transfer transistor, a second transfer transistor connected with the storage element, a floating diffusion area connected with the second transfer transistor, and a readout circuit connected with the floating diffusion area, and
an overflow transistor disposed adjacent to the photo transistor and connected with a power supply voltage, the overflow transistor configured to remove charges from the photo transistor.

17. The electronic device of claim 16, wherein the optical device comprises one of a micro-electro-mechanical system (MEMS) mirror and a rotating prism.

18. The electronic device of claim 16, wherein the light source comprises a vertical-cavity surface-emitting laser (VCSEL) array, and
wherein the optical device is a projection optical device.

19. A light detection and ranging (LIDAR) system comprising:
a light source configured to emit light signals;
an optical device configured to control projection directions of the light signals and to scan an object with the light signals having the controlled projection directions;
a time of flight (ToF) sensor including a pixel array including a plurality of pixel blocks demodulating the light signals reflected from the object based on a direction of the scanning,
wherein each of pixels of the plurality of pixel blocks comprises
a plurality of taps each including a photo transistor, a first transfer transistor connected with the photo transistor, a storage element connected with the first transfer transistor, a second transfer transistor connected with the storage element, a floating diffusion area connected with the second transfer transistor, and a readout circuit connected with the floating diffusion area, and
an overflow transistor disposed adjacent to the photo transistor and connected with a power supply voltage, the overflow transistor configured to remove charges from the photo transistor.

20. The LIDAR system of claim 19, wherein the pixels of each of the plurality of pixel blocks are arranged at at least one line.

* * * * *